US009790873B2

(12) United States Patent
Tomimatsu et al.

(10) Patent No.: US 9,790,873 B2
(45) Date of Patent: Oct. 17, 2017

(54) AIR-FUEL RATIO CONTROL APPARATUS FOR AN INTERNAL COMBUSTION ENGINE

(75) Inventors: Makoto Tomimatsu, Susono (JP); Ryota Onoe, Susono (JP); Takahiko Fujiwara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1344 days.

(21) Appl. No.: 13/700,248

(22) PCT Filed: May 28, 2010

(86) PCT No.: PCT/JP2010/059486
§ 371 (c)(1),
(2), (4) Date: Nov. 27, 2012

(87) PCT Pub. No.: WO2011/148517
PCT Pub. Date: Dec. 1, 2011

(65) Prior Publication Data
US 2013/0110380 A1 May 2, 2013

(51) Int. Cl.
*G06F 7/00* (2006.01)
*G06F 17/00* (2006.01)
(Continued)

(52) U.S. Cl.
CPC ......... *F02D 41/00* (2013.01); *F02D 41/1441* (2013.01); *F02D 41/1479* (2013.01);
(Continued)

(58) Field of Classification Search
CPC .. F02D 41/00; F02D 41/1479; F02D 41/1482; F02D 41/1483; F02D 41/2454;
(Continued)

(56) References Cited

U.S. PATENT DOCUMENTS 4,561,400 A * 12/1985 Hattori .................... F02D 41/18 123/480
4,655,188 A * 4/1987 Tomisawa ........... F02D 41/2454 123/674
(Continued)

FOREIGN PATENT DOCUMENTS

JP A-5-149172 6/1993
JP A-8-158917 6/1996
(Continued)

*Primary Examiner* — David Hamaoui
(74) *Attorney, Agent, or Firm* — Oliff PLC

(57) ABSTRACT

An air-fuel ratio control controls an air-fuel ratio (air-fuel ratio of an engine) of a mixture supplied to the engine, based on an output value of the downstream-side air-fuel ratio sensor disposed downstream of a catalyst. That is, the air-fuel ratio control apparatus sets the air-fuel ratio of the engine at a rich air-fuel ratio when the output Voxs is smaller than a reference value VREF (when a rich request is occurring). The air-fuel ratio control apparatus sets the air-fuel ratio of the engine at a lean air-fuel ratio when the output Voxs is larger than a reference value VREF (when a lean request is occurring). The air-fuel ratio control apparatus makes the target value VREF gradually come closer to a reference value VF (stoichiometric air-fuel ratio corresponding value) from a certain value, when the output value Voxs deviates greatly from the reference value Vf (points P1-P3).

15 Claims, 27 Drawing Sheets

(51) Int. Cl.

| | |
|---|---|
| ***F02D 41/00*** | (2006.01) |
| ***F02D 41/14*** | (2006.01) |
| ***F02D 41/30*** | (2006.01) |
| ***F02D 41/24*** | (2006.01) |

(52) U.S. Cl.
CPC ..... *F02D 41/1482* (2013.01); *F02D 41/1483* (2013.01); *F02D 41/2454* (2013.01); *F02D 41/30* (2013.01); *F02D 41/1456* (2013.01)

(58) Field of Classification Search
CPC ... F02D 41/30; F02D 41/1441; F02D 41/1456
See application file for complete search history.

(56) References Cited

U.S. PATENT DOCUMENTS

| | | | | | |
|---|---|---|---|---|---|
| 4,854,287 | A * | 8/1989 | Tomisawa | F02D 41/2445 123/675 |
| 5,099,817 | A * | 3/1992 | Nakaniwa | F02D 41/2477 123/674 |
| 5,148,369 | A * | 9/1992 | Uchinami | F02D 41/1479 123/480 |
| 5,282,360 | A * | 2/1994 | Hamburg | F02D 41/1441 123/694 |
| 5,797,370 | A * | 8/1998 | Kimura | F02D 41/008 123/478 |
| 5,924,281 | A | 7/1999 | Yasui et al. | |
| 6,292,739 | B1 | 9/2001 | Yasui et al. | |
| 6,349,540 | B1 * | 2/2002 | Nakayama | F01N 11/007 60/274 |
| 6,467,254 | B1 * | 10/2002 | Cullen | F01N 11/007 60/274 |
| 6,494,038 | B2 * | 12/2002 | Kobayashi | F02D 41/0295 60/274 |
| 7,127,344 | B2 * | 10/2006 | Katoh | F02D 41/061 123/687 |
| 7,181,331 | B2 * | 2/2007 | Katoh | F02D 41/1489 123/687 |
| 8,074,441 | B2 * | 12/2011 | Fujiwara | F01N 11/007 60/276 |
| 2002/0038177 | A1 | 3/2002 | Ishikawa et al. | |
| 2007/0240403 | A1 | 10/2007 | Miyasako et al. | |

FOREIGN PATENT DOCUMENTS

| | | | |
|---|---|---|---|
| JP | A-8-177576 | 7/1996 | |
| JP | A-9-273438 | 10/1997 | |
| JP | A-10-68343 | 3/1998 | |
| JP | A-2000-234550 | 8/2000 | |
| JP | A-2001-304018 | 10/2001 | |
| JP | A-2005-171982 | 6/2005 | |
| JP | 2006029112 A * | 2/2006 | F02D 41/14 |
| JP | A-2007-285218 | 11/2007 | |
| JP | A-2009-250163 | 10/2009 | |

* cited by examiner

AIR-FUEL RATIO CONTROL APPARATUS FOR AN INTERNAL COMBUSTION ENGINE

TECHNICAL FIELD

The present invention relates to an air-fuel ratio control apparatus for an internal combustion engine having a catalyst.

BACKGROUND ART

Conventionally, a three way catalyst (catalytic unit for exhaust gas purification) is provided to an exhaust passage of an internal combustion engine in order to purify an emission discharged from the engine. As is well known, the three way catalyst has an "oxygen storage function" to store oxygen flowing into the three way catalyst, and discharge the stored oxygen. The three way catalyst is hereinafter simply referred to as a "catalyst."

One of the conventional air-fuel ratio control apparatuses (hereinafter, referred to as a "conventional apparatus") includes a downstream-side air-fuel ratio sensor disposed in the exhaust passage of the engine and downstream of the catalyst. The conventional apparatus determines a "base fuel injection amount to have an air-fuel ratio of a mixture supplied to the engine coincide with the stoichiometric air-fuel ratio" based on an amount of air introduced into cylinders, and corrects the base fuel injection amount based on at least an output value of the downstream-side air-fuel ratio sensor.

Hereinafter, an exhaust gas flowing into the catalyst is referred to as a "catalyst inflow gas", and an exhaust gas flowing out from the catalyst is referred to as a "catalyst outflow gas." Further, an air-fuel ratio which is smaller than the stoichiometric air-fuel ratio is referred to as a "rich air-fuel ratio", and an air-fuel ratio which is larger than the stoichiometric air-fuel ratio is referred to as a "lean air-fuel ratio." The air-fuel ratio of the mixture supplied to the engine is referred to as an "air-fuel ratio of the engine."

The downstream-side air-fuel ratio sensor used for the conventional apparatus is typically a concentration-cell-type oxygen sensor utilizing a stabilized zirconia. As shown by a curve line C1 in FIG. 3, the output value Voxs of the downstream-side air-fuel ratio sensor coincides with a value close to a maximum output value Max when a state continues in which an air-fuel ratio of the catalyst outflow gas is smaller than the stoichiometric air-fuel ratio. The output value Voxs of the downstream-side air-fuel ratio sensor coincides with a value close to a minimum output value Min when a state continues in which the air-fuel ratio of the catalyst outflow gas is larger than the stoichiometric air-fuel ratio. Further, the output value Voxs of the downstream-side air-fuel ratio sensor rapidly changes from the value close to the maximum output value Max to the value close to the minimum output value Min, when the air-fuel ratio of the catalyst outflow gas changes from the rich air-fuel ratio to the lean air-fuel ratio. The output value Voxs of the downstream-side air-fuel ratio sensor rapidly changes from the value close to the minimum output value Min to the value close to the maximum output value Max, when the air-fuel ratio of the catalyst outflow gas changes from the lean air-fuel ratio to the rich air-fuel ratio.

In this manner, the output value Voxs becomes the value close to the minimum output value Min, when the air-fuel ratio of the catalyst outflow gas is the lean air-fuel ratio, and thus, the catalyst outflow gas includes an excessive amount of oxygen. The output value Voxs becomes the value close to the maximum output value Max, when the air-fuel ratio of the catalyst outflow gas is the rich air-fuel ratio, and thus, the catalyst outflow gas does not include an excessive amount of oxygen. Accordingly, it is inferred that the air-fuel ratio of the catalyst outflow gas is equal to the stoichiometric air-fuel ratio, when the output value Voxs coincides with a mid value Mid (i.e., the mid value Vmid=(Max+Min)/2) which is a middle value of the maximum output value Max and the minimum output value Min."

The conventional apparatus calculates, based on a proportional-integral control (PI control), an air-fuel ratio feedback-control-amount, in such a manner that the output value Voxs of the downstream-side air-fuel ratio sensor becomes equal to a "target value VREF which is set to (at) a value (i.e., the mid value Vmid) corresponding to the stoichiometric air-fuel ratio." The air-fuel ratio feedback-control-amount is also referred to as a "sub feedback amount", for convenience. The conventional apparatus performs the feedback control of the air-fuel ratio of the mixture supplied to the engine by correcting the base fuel injection amount with the sub feedback control amount (refer to, for example, Japanese Patent Application Laid-Open (kokai) No. 2005-171982).

FIG. 28 is a timing-chart showing an aspect of the air-fuel ratio feedback control performed by such a conventional apparatus. The conventional apparatus maintains the target value VREF at a constant value (reference value Vf close to the mid value Vmid), and determines whether the air-fuel ratio of the catalyst outflow gas is the rich air-fuel ratio or the lean air-fuel ratio. In other words, the conventional apparatus determines, based on the "output value Voxs and reference value Vf", an "air-fuel ratio of the engine (required air-fuel ratio) which is required to purify the exhaust gas more efficiently with the catalyst."

More specifically, when the output value Voxs is larger than the reference value Vf (e.g., time t1 to time t2, time t3 to time t4, and time t5 to time t6), the conventional apparatus determines that the air-fuel ratio of the catalyst outflow gas is the rich air-fuel ratio, and thus the requested air-fuel ratio is the lean air-fuel ratio (that is, the lean request has been occurring). When the lean request is occurring, the conventional apparatus controls/adjusts the air-fuel ratio of the engine to (at) the lean air-fuel ratio.

Consequently, the air-fuel ratio of the catalyst outflow gas changes to the lean air-fuel ratio, and thus, the output value Voxs decreases and becomes smaller than the reference value Vf. When the output value Voxs is smaller than the reference value Vf (e.g., time t2 to time t3, and time t4 to time t5), the conventional apparatus determines that the air-fuel ratio of the catalyst outflow gas is the lean air-fuel ratio, and thus the requested air-fuel ratio is the rich air-fuel ratio (that is, the rich request has been occurring). When the rich request is occurring, the conventional apparatus controls/adjusts the air-fuel ratio of the engine to (at) the rich air-fuel ratio. Consequently, the air-fuel ratio of the catalyst outflow gas changes to the rich air-fuel ratio, and thus, the output value Voxs increases and becomes larger than the reference value Vf.

SUMMARY OF THE INVENTION

When such a feedback control is preformed, however, the air-fuel ratio of the engine may become excessively large or excessively small, and therefore, a case may arise in which nitrogen oxides (NOx) or unburnt substances (CO, and HC, etc.) is not completely/sufficiently purified by the catalyst, and thus, is discharged from the engine to the outside of the engine. For example, in the example shown in FIG. 28, an amount of nitrogen oxides increases at points in time close to time t2, time t4, and time t6.

The reason for the above is inferred as follows. For example, when the output value Voxs increases up to the value close to the maximum output value Max (e.g., refer to time immediately after time t1), the air-fuel ratio of the catalyst outflow gas is the “rich air-fuel ratio having a large absolute value of a difference between the rich air-fuel ratio and the stoichiometric air-fuel ratio.” In this case, an amount of oxygen stored in the catalyst (hereinafter, referred to as an “oxygen storage amount OSA”) is substantially equal to “0.” Accordingly, the conventional apparatus sets the air-fuel ratio of the engine to (at) the lean air-fuel ratio because it determines that the lean request has occurred.

Consequently, an excessive amount of oxygen is included in the catalyst inflow gas, and therefore, the oxygen storage amount OSA increases. While the oxygen storage amount OSA is relatively small, the catalyst can efficiently store oxygen. Accordingly, immediately after time t1, most of the excessive oxygen included in the catalyst inflow gas is stored in the catalyst.

Thereafter, when the oxygen storage amount OSA becomes large, the catalyst can no longer store oxygen efficiently. Accordingly, oxygen starts to be included in the catalyst outflow gas. Consequently, when a certain time period has passed from time t1, the output value Voxs of the downstream-side air-fuel ratio sensor starts to decrease from the maximum output value Max to the minimum output value Min.

Meanwhile, the output value Voxs of the downstream-side air-fuel ratio sensor changes with a delay with respect to a change in an oxygen partial pressure of the catalyst outflow gas. The reason for this is inferred as follows.

(1) It takes a fair amount of time for the catalyst outflow gas to reach an element of the downstream-side air-fuel ratio sensor, because of a distance between the catalyst and the downstream-side air-fuel ratio sensor.

(2) Typically, the downstream-side air-fuel ratio sensor is provided with a protective cover, and therefore, it takes a fair amount of time for the catalyst outflow gas to reach the element of the downstream-side air-fuel ratio sensor.

(3) The element of the downstream-side air-fuel ratio sensor is covered with a “layer (e.g., diffusion resistance layer) to have an oxygen equilibrium gas reach the element”, and therefore, a change in an oxygen partial pressure of the gas which reaches the element delays. The delay becomes prominent when oxygen or unburnt substance that has been accumulated remains/exists around the element of the downstream-side air-fuel ratio sensor.

The output value Voxs continues to be larger than the reference value Vf up to time t2 due to the delay of the change in the output value Voxs, and therefore, the conventional apparatus continues to determine that the lean request is occurring up to time t2. Accordingly, the air-fuel ratio of the engine continues to be set to (at) the lean air-fuel ratio. Consequently, the oxygen storage amount OSA continues to increase, and reaches a value close to a “maximum oxygen storage amount Cmax, which is a maximum value of the oxygen storage amount OSA of the catalyst” at time t2 or immediately before time t2.

At this point in time, a large amount of NOx (nitrogen oxides) is included in the catalyst inflow gas, since the air-fuel ratio of the engine is the lean air-fuel ratio. However, the catalyst can not purify NOx sufficiently, since the oxygen storage amount OSA has reached the value close to the maximum oxygen storage amount Cmax. As a result, a considerably large amount of NOx is discharged downstream of the catalyst in a period in the neighborhood of time t2.

Similarly, the conventional apparatus determines that the rich request is occurring, even when the oxygen storage amount OSA becomes close to “0” (e.g., immediately before time t1, immediately before time t3, and immediately before time t1). Consequently, excessive unburnt substances flow into the catalyst, and therefore, a case may arise in which the unburnt substances are not completely/sufficiently purified, and thus, are discharged downstream of the catalyst.

As described above, there may arise a case in which the air-fuel ratio of the engine is set to (at) an “air-fuel ratio which is not desirable/appropriate for the emission purification operation of the catalyst”, according to the conventional apparatus.

The present invention is made to cope with the problems described above. That is, one of objects of the present invention is to provide an air-fuel ratio control apparatus which can control the air-fuel ratio of the engine in such a manner that the air-fuel ratio of the catalyst inflow gas coincides with an “air-fuel ratio which is desirable/appropriate for the emission purification operation of the catalyst” as closely as possible.

One of aspects of the air-fuel ratio control apparatus for an internal combustion engine according to the present invention, comprises a catalyst disposed in the exhaust passage of the internal combustion engine, and the downstream-side air-fuel ratio sensor disposed in the exhaust passage and downstream of the catalyst, and an air-fuel ratio control section.

The downstream-side air-fuel ratio sensor includes an element to detect an air-fuel ratio. The element outputs an output value which varies depending on (according to) an oxygen partial pressure of a gas reaching the element (hereinafter, also referred to as an “element reaching gas”). The downstream-side air-fuel ratio sensor may preferably be the concentration-cell-type oxygen sensor ($O_2$ sensor). When the downstream-side air-fuel ratio sensor is the concentration-cell-type oxygen sensor, the output value of the downstream-side air-fuel ratio sensor becomes larger as an “air-fuel ratio of the element reaching gas” becomes smaller (richer). It should be noted that the downstream-side air-fuel ratio sensor may be a wide range air-fuel ratio sensor of a limiting current type, or the like. When the downstream-side air-fuel ratio sensor is the wide range air-fuel ratio sensor of a limiting current type, the output value of the downstream-side air-fuel ratio sensor becomes smaller as the “air-fuel ratio of the element reaching gas” becomes smaller (richer). Further, the downstream-side air-fuel ratio sensor may be a sensor using a zirconia element or a titania element.

The air-fuel ratio control section increases the air-fuel ratio of the engine in a period in which a lean request is occurring to require the air-fuel ratio of the engine to be increased so as to have the output value of the downstream-side air-fuel ratio sensor come closer to a predetermined target value. In this case, the air-fuel ratio of the engine may gradually be increased, or be set to (at) a predetermined (either constant or varying) lean air-fuel ratio.

Further, the air-fuel ratio control section decreases the air-fuel ratio of the engine in a period in which a rich request is occurring to require the air-fuel ratio of the engine to be decreased so as to have the output value of the downstream-side air-fuel ratio sensor come closer to the target value. In this case, the air-fuel ratio of the engine may gradually be decreased, or be set to (at) a predetermined (either constant or varying) rich air-fuel ratio.

This air-fuel ratio control is referred to as a "feedback control (air-fuel ratio feedback control, or a sub feedback control)."

For example, in a case in which the downstream-side air-fuel ratio sensor is the concentration-cell-type oxygen sensor, and when the output value of the downstream-side air-fuel ratio sensor is larger than the target value, the air-fuel ratio of the catalyst outflow gas is the rich air-fuel ratio, and thus, the lean request is occurring. Accordingly, the air-fuel ratio of the engine is controlled to be the lean air-fuel ratio. In addition, in the case in which the downstream-side air-fuel ratio sensor is the concentration-cell-type oxygen sensor, and when the output value of the downstream-side air-fuel ratio sensor is smaller than the target value, the air-fuel ratio of the catalyst outflow gas is the lean air-fuel ratio, and thus, the rich request is occurring. Accordingly, the air-fuel ratio of the engine is controlled to be the rich air-fuel ratio.

For example, in a case in which the downstream-side air-fuel ratio sensor is the wide range air-fuel ratio sensor of a limiting current type, and when the output value of the downstream-side air-fuel ratio sensor is larger than the target value, the air-fuel ratio of the catalyst outflow gas is the lean air-fuel ratio, and thus, the rich request is occurring. Accordingly, the air-fuel ratio of the engine is controlled to be the rich air-fuel ratio. In addition, in the case in which the downstream-side air-fuel ratio sensor is the wide range air-fuel ratio sensor of a limiting current type, and when the output value of the downstream-side air-fuel ratio sensor is smaller than the target value, the air-fuel ratio of the catalyst outflow gas is the rich air-fuel ratio, and thus, the lean request is occurring. Accordingly, the air-fuel ratio of the engine is controlled to be the lean air-fuel ratio.

Furthermore, the air-fuel ratio control section comprises a target value changing section.

The target value changing section has/makes the target value used in the feedback control gradually come closer to (approach) a predetermined reference value with time, from a certain/predetermined value within either one of ranges of "a range at larger side with respect to the reference value and a range at smaller side with respect to the reference value" and in which the output value of the downstream-side air-fuel ratio sensor is present (found).

The predetermined reference value is a value within a "predetermined/certain range" that includes an "output value (hereinafter, referred to as a "stoichiometric air-fuel ratio corresponding value") of the downstream-side air-fuel ratio sensor", when an oxygen partial pressure of the "gas reaching the element of the downstream-side air-fuel ratio sensor (element reaching gas)" is equal to an oxygen partial pressure obtained when the air-fuel ratio of the element reaching gas is equal to the stoichiometric air-fuel ratio.

That is, for example, when the stoichiometric air-fuel ratio corresponding value is Vmid, the predetermined range is "equal to or larger than ($Vmid-\Delta v2$) and is equal to or smaller than ($Vmid+\Delta v1$)" (wherein, $\Delta v1>0$, $\Delta v2>0$). For example, as shown in FIG. 3, in the case in which the downstream-side air-fuel ratio sensor is the concentration-cell-type oxygen sensor, the predetermined range is a range referred to as a "high sensitivity range" in which a change amount in the output value is extremely large with respect to a change amount in the air-fuel ratio of the element reaching gas.

The target value changing section may be any sections that change the target value in such a manner that a temporal average of the target value approaches (comes closer to) the reference value. That is, the target value may be changed/varied in such a manner that the temporal average of the target value approaches (comes closer to) the reference value, with repeat of increase and decrease alternately. As a matter of course, the target value may be changed/varied in such a manner that an absolute value of a difference between the target value and the reference value gradually decreases with time (i.e., monotonously decreases with respect to time).

According to the target value changing section, as shown in FIG. 6, for example, the target value may be changed to the reference value Vf via a point P2 and a point P3 from a point P1. The target value indicated by the point P1 shown in FIG. 6 is the certain/predetermined value within either one of ranges of "the range at larger side with respect to the reference value Vf and the range at smaller side with respect to the reference value Vf" and in which the output value of the downstream-side air-fuel ratio sensor is present (found) (in this example, the range is the range at larger side with respect to the reference value Vf). Similarly, according to the target value changing section, as shown in FIG. 7, for example, the target value may be changed to the reference value Vf via a point P2 and a point P3 from a point P1. The target value indicated by the point P1 shown in FIG. 7 is the certain/predetermined value within either one of ranges of "the range at larger side with respect to the reference value Vf and the range at smaller side with respect to the reference value Vf" and in which the output value of the downstream-side air-fuel ratio sensor is present (found) (in this example, the range is the range at smaller side with respect to the reference value Vf).

Accordingly, a point in time comes earlier at which the output value of the downstream-side air-fuel ratio sensor crosses (cuts across) the target value compared to a case in which the target value is fixed to (at) the reference value Vf. In other words, it is possible to detect a change in the air-fuel request from the lean request to the rich request (or vice versa) much earlier (for example, refer to time t2' compared to time t2, shown in FIG. 28).

Consequently, the one of the aspects of the air-fuel ratio control apparatus for an internal combustion engine according to the present invention can have/make the output value of the downstream-side air-fuel ratio sensor come closer to the reference value while controlling the output value of the downstream-side air-fuel ratio sensor in such a manner that the output value becomes neither excessively large nor excessively small (i.e, without allowing the oxygen storage amount OSA to coincide with a value close to "0" or a value close to the maximum oxygen storage amount Cmax). In other words, the one of the aspects of the air-fuel ratio control apparatus for an internal combustion engine according to the present invention can control the "air-fuel ratio of the engine" in such a manner that oxygen and unburnt substances that are excessive for the efficient purification of the emission by the catalyst are not flowed into the catalyst. Accordingly, the one of the aspects of the air-fuel ratio control apparatus can maintain the emission at an excellent level.

The air-fuel ratio control section may include an extreme value obtaining section, for example.

The extreme value obtaining section, (1) obtains, as a first extreme value, the output value of the downstream-side air-fuel ratio sensor when a state in which the output value deviates more greatly from the reference value changes to a state in which the output value comes closer to (approaches) the reference value, and (2) obtains, as a second extreme value, the output value of the downstream-side air-fuel ratio sensor when a state in which the output value comes closer to (approaches) the reference value changes to a state in which the output value deviates more greatly from the reference value.

It should be noted that a state in which the output value deviates more greatly from the reference value is the same as a state in which an absolute value of a difference between the output value and the reference value increases. Further, it should be noted that a state in which the output value comes closer to the reference value is the same as a state in which the absolute value of the difference between the output value and the reference value decreases.

By means of the extreme value obtaining section, for example, when the output value deviates more greatly from the reference value, and thereafter, comes closer to the reference value in a state in which the output value of the downstream-side air-fuel ratio sensor is larger than the reference value, the output value (i.e., local maximum value Vmax) at a point in time when the output value starts to come closer to the reference value is obtained as the first extreme value. In contrast, when the output value deviates more greatly from the reference value, and thereafter, comes closer to the reference value in a state in which the output value of the downstream-side air-fuel ratio sensor is smaller than the reference value, the output value (i.e., local minimum value Vmin) at a point in time when the output value starts to come closer to the reference value is obtained as the second extreme value.

Further, by means of the extreme value obtaining section, when the output value comes closer to the reference value, and thereafter, deviates more greatly from the reference value in a state in which the output value of the downstream-side air-fuel ratio sensor is smaller than the reference value, the output value (i.e., local maximum value Vmax) at a point in time when the output value starts to deviates more greatly from the reference value is obtained as the second extreme value. In contrast, when the output value comes closer to the reference value, and thereafter, deviates more greatly from the reference value in a state in which the output value of the downstream-side air-fuel ratio sensor is larger than the reference value, the output value (i.e., local minimum value Vmin) at a point in time when the output value starts to deviates more greatly from the reference value is obtained as the second extreme value.

In addition, the target value changing section may be configured so as to realize/perform the following functions.

(1) When the first extreme value is obtained by the extreme value obtaining section, the target value changing section determines, as the "target value", a value (i.e., first value) between the "obtained first extreme value (k1(1))" and the "reference value." The first value is a value between the output value of the downstream-side air-fuel ratio sensor at the present point in time and the reference value (the value including the output value of the downstream-side air-fuel ratio sensor at the present point in time).

(2) Thereafter, when the second extreme value is obtained by the extreme value obtaining section, the target value changing section determines, as the "target value", a value (i.e., second value) between the "obtained second extreme value (k2(1))" and the "first extreme value (k1(1)) obtained by the extreme value obtaining section."

For example, it is assumed that the downstream-side air-fuel ratio sensor is the concentration-cell-type oxygen sensor, for ease of explanation. Under the assumption, a period in which the output value of the downstream-side air-fuel ratio sensor is larger than the target value is a period in which the lean request occurs (period in which the air-fuel ratio of the engine is increased), and a period in which the output value of the downstream-side air-fuel ratio sensor is smaller than the target value is a period in which the rich request occurs (period in which the air-fuel ratio of the engine is decreased).

When the first extreme value (k1(1), e.g., local maximum value Vmax(1) shown in FIG. 6) is obtained during the period in which the lean request is occurring, the target value is set to (at) the "first value between the first extreme value (k1(1)=Vmax(1)) and the reference value (Vf) (refer to point P1 shown in FIG. 6). Accordingly, when the output value of the downstream-side air-fuel ratio sensor changes from a state in which the output value is larger than the "target value which has been set at the first value" to a state in which the output value is smaller than the target value (first point in time, refer to time t2 shown in FIG. 6), the air-fuel ratio request changes from the lean request to the rich request. Consequently, the air-fuel ratio of the engine is decreased.

Since the first value is the "value between the first extreme value (k1(1)) and the reference value (Vf)", the output value of the downstream-side air-fuel ratio sensor reaches the first value at a point in time (first point in time) before it reaches the reference value (Vf). Accordingly, the air-fuel ratio of the engine is changed (switched over) to an air-fuel ratio (rich air-fuel ratio) which decreases the oxygen storage amount OSA before the excessive oxygen is flowed into the catalyst (i.e., before the oxygen storage amount OSA becomes excessively large).

Thereafter, the second extreme value (k2(1), e.g., local minimum value Vmin(1) shown in FIG. 6) is obtained during the period in which the rich request is occurring. In this case, the target value is set to (at) the "second value between the second extreme value (k2(1)=Vmin(1)) and the first extreme value (k1(1)=Vmax(1)) (refer to point P2 shown in FIG. 6). When the output value of the downstream-side air-fuel ratio sensor changes from a state in which the output value is smaller than the "target value which has been set at the second value" to a state in which the output value is larger than the target value (second point in time, refer to time t4 shown in FIG. 6), the air-fuel ratio request changes from the rich request to the lean request. Consequently, the air-fuel ratio of the engine is changed (switched over) to an air-fuel ratio (lean air-fuel ratio) which increases the oxygen storage amount OSA before the excessive unburnt substance is flowed into the catalyst (i.e., before the oxygen storage amount OSA becomes excessively small).

Similarly, when the first extreme value (k1(1), e.g., local minimum value Vmin(1) shown in FIG. 7) is obtained during the period in which the rich request is occurring, the target value is set to (at) the "first value between the first extreme value (k1(1)=Vmin(1)) and the reference value (Vf) (refer to point P1 shown in FIG. 7). Accordingly, when the output value of the downstream-side air-fuel ratio sensor changes from a state in which the output value is smaller than the "target value which has been set at the first value" to a state in which the output value is larger than the target value (first point in time, refer to time t2 shown in FIG. 7), the air-fuel ratio request changes from the rich request to the lean request. Consequently, the air-fuel ratio of the engine is increased.

Since the first value is the "value between the first extreme value (k1(1)) and the reference value (Vf)", the output value of the downstream-side air-fuel ratio sensor reaches the first value at a point in time (first point in time) before it reaches the reference value (Vf). Accordingly, the air-fuel ratio of the engine is changed (switched over) to an air-fuel ratio (lean air-fuel ratio) which increases the oxygen storage amount OSA before the excessive unburnt substance is flowed into the catalyst (i.e., before the oxygen storage amount OSA becomes excessively small).

Thereafter, the second extreme value (k2(1), e.g., local maximum value Vmax(1) shown in FIG. 7) is obtained during the period in which the lean request is occurring. In this case, the target value is set to (at) the "second value between the second extreme value (k2(1)=Vmax(1)) and the first extreme value (k1(1)=Vmin(1)) (refer to point P2 shown in FIG. 7). When the output value of the downstream-side air-fuel ratio sensor changes from a state in which the output value is larger than the "target value which has been set at the second value" to a state in which the output value is smaller than the target value (second point in time, refer to time t4 shown in FIG. 7), the air-fuel ratio request changes from the lean request to the rich request. Consequently, the air-fuel ratio of the engine is changed (switched over) to an air-fuel ratio (rich air-fuel ratio) which decreases the oxygen storage amount OSA before the excessive oxygen is flowed into the catalyst (i.e., before the oxygen storage amount OSA becomes excessively large).

As described above, by means of the air-fuel ratio control section, the switch over from the increase to the decrease of the air-fuel ratio of the engine, and the switch over from the decrease to the increase of the air-fuel ratio of the engine are carried out earlier compared to the conventional apparatus. Further, the output value is controlled so as to come closer to the target value, and the target value gradually comes closer to the reference value.

Consequently, the one of the aspects of the air-fuel ratio control apparatus for an internal combustion engine according to the present invention can have the output value of the downstream-side air-fuel ratio sensor come closer to the reference value while controlling the output value of the downstream-side air-fuel ratio sensor in such a manner that the output value becomes neither excessively large nor excessively small. In other words, the apparatus can control the air-fuel ratio of the engine in such a manner that oxygen and unburnt substances that are excessive for the efficient purification of the emission by the catalyst are not flowed into the catalyst. Accordingly, the apparatus can maintain the emission at an excellent level.

In addition, it is preferable that the target value changing section be configured so as to set the second value to (at) a value between the obtained second extreme value (k2(1)) and the first value.

According to the configuration described above, the second value is set to (at) a "value between the first value which was set as the target value immediately before the second value is set to (at) the target value and the second extreme value (k2(1)) which was obtained immediately before the second value is set to (at) the target value." Consequently, an absolute value of a difference between the target value and the reference value can be decreased with time (it is possible to have the target value come closer to the reference value certainly).

Moreover, it is preferable the target value changing section be configured so as to set the second value in such a manner that an absolute value of a difference between the first extreme value k1(2) obtained after a second extreme value obtaining time which is a point in time at which the second extreme value is obtained and the reference value is smaller than an absolute value of a difference between the first extreme value k1(1) obtained before the second extreme value obtaining time and the reference value.

According to the configuration described above, an absolute value of a difference between the first extreme value and the reference value Vf becomes smaller every time the first extreme value is obtained (i.e., |k1(1)−Vf|>|k1(2)−Vf|). Consequently, it is possible to have the output value of the downstream-side air-fuel ratio sensor come closer to the reference value without fail.

The target value changing section in a specific aspect of the air-fuel ratio control apparatus may be configured in such a manner that, when the first extreme value (k1(1)) is obtained by the extreme value obtaining section:

the target value changing section sets the first value as the target value if an absolute value of a difference between the obtained first extreme value (k1(1)) and the reference value is larger than a positive first threshold; and the target value changing section sets the reference value as the target value if the absolute value of the difference between the obtained first extreme value (k1(1)) and the reference value is equal to or smaller than the first threshold.

If the output value of the downstream-side air-fuel ratio sensor fluctuates in the vicinity of (around) the reference value, it is inferred that the catalyst is appropriately purifying the substances to be purified. Accordingly, when the output value of the downstream-side air-fuel ratio sensor fluctuates in the vicinity of (around) the reference value, it is not necessary to set the target value to (at) a value different from the reference value (i.e., value between the output value of the downstream-side air-fuel ratio sensor at the present point in time and the reference value). In contrast, the absolute value of the difference between the output value of the downstream-side air-fuel ratio sensor and the reference value is large, it is inferred that the an excessively large amount of oxygen or an excessively large amount of unburnt substance has been reaching the downstream-side air-fuel ratio sensor. In this case, a point in time of the change in the output value of the downstream-side air-fuel ratio sensor delays more greatly with respect to a point in time of the change in the air-fuel ratio of the catalyst outflow gas. It is inferred that the reason for the above delay is that a large amount of oxygen and a large amount of unburnt substances, that reached in the past, are still remaining in the vicinity of the downstream-side air-fuel ratio sensor.

According to the configuration described above, the target value is changed from the value different from the reference value to the reference value, only when the absolute value of the difference between the output value of the downstream-side air-fuel ratio sensor and the reference value becomes larger than the first threshold. Therefore, it can be avoided that the emission becomes rather worse due to changing the target value toward the reference value, and accordingly, the emission can be kept at a good level.

Furthermore, specifically, it is preferable that the target value changing section be configured so as to set a value (X1) which is closer to the reference value by a positive first change value (A) than (or compared to) the first extreme value (k1(1)) as the first value, and set a value (X2) which is more away from the reference value by a positive second change value (B) than (or compared to) the second extreme value (k2(1)) as the second value, wherein the first change value (A) is equal to or smaller than the first threshold; and the second change value (B) is smaller than the first change value (A).

It should be noted that, in the example shown in FIG. 6, the first change value (A) is A1, and the second change value (B) is B1. It should also be noted that, in the example shown in FIG. 7, the first change value (A) is A2, and the second change value (B) is B2.

For example, when the first extreme value (k1(1)) is larger than the reference value Vf, the first value (X1) is a value (k1(1)−A). When the first extreme value (k1(1)) is smaller than the reference value Vf, the first value (X1) is a value (k1(1)+A).

Further, when the second extreme value (k2(1)) is larger than the reference value Vf, the second value (X2) is a value (k2(1)+B). When the second extreme value (k2(1)) is smaller than the reference value Vf, the second value (X2) is a value (k2(1)−B).

Other objects, features, and advantages of the apparatus of the present invention will be readily understood from the following description of each of embodiments of the apparatus according to the present invention with reference to the accompanying drawings.

DESCRIPTION OF EMBODIMENTS

Each of embodiments of an air-fuel ratio control apparatus for an internal combustion engine according to the present invention will next be described with reference to the drawings.

First Embodiment (Structure)

Figure 1:
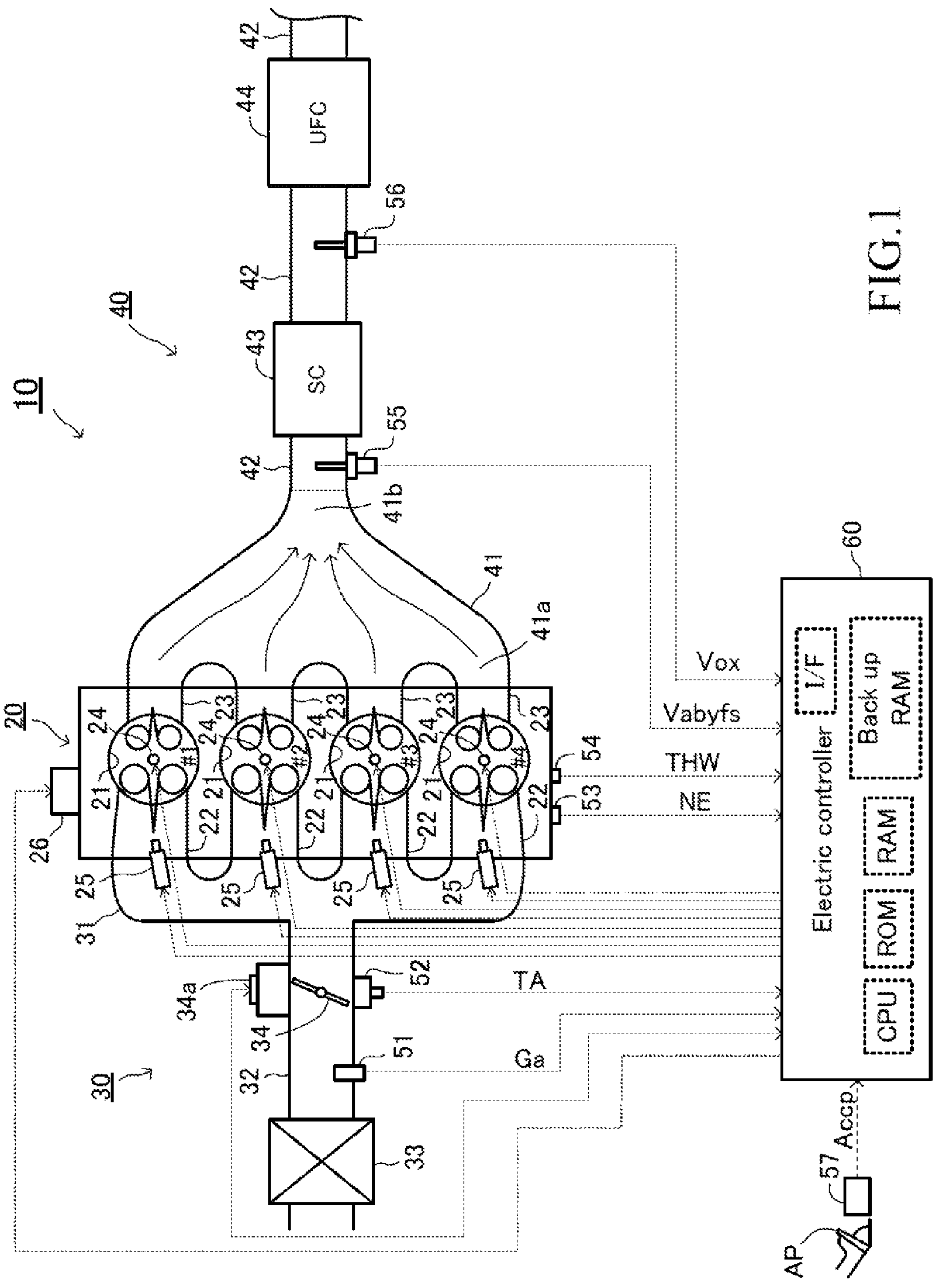
FIG. 1 is a schematic view of an internal combustion engine to which an air-fuel ratio control apparatus (first control apparatus) for an internal combustion engine according to a first embodiment of the present invention is applied.

FIG. 1 schematically shows a configuration of an internal combustion engine 10, to which an air-fuel ratio control apparatus (hereinafter, referred to as a "first control apparatus") according to a first embodiment of the present invention is applied. The engine 10 is a 4 cycle, spark-ignition, multi-cylinder (4 cylinder in the present example), gasoline fuel engine. The engine 10 comprises a main body section 20, an intake air system 30, and an exhaust system 40.

The main body 20 comprises a cylinder block section and a cylinder head section. The main body 20 comprises a plurality of (four of) combustion chambers (first cylinder #1 to fourth cylinder #4) 21, each is formed/defined by a top surface of a piston, a cylinder wall surface, and a lower surface of the cylinder head section.

A plurality of intake ports 22 and a plurality of exhaust ports 23 are formed/provided in the cylinder head section. Each of the intake ports 22 is communicated with each of the combustion chambers 21 (cylinders) so as to supply a "mixture of an air and a fuel" to each of the combustion chambers 21. The intake port 22 is opened/closed by an unillustrated intake valve. Each of the exhaust ports 23 is communicated with each of the combustion chambers 21 so as to discharge an exhaust gas (burnt gas) from each of the combustion chambers 21. The exhaust port 23 is opened/closed by an unillustrated exhaust valve.

A plurality (four) of spark plugs 24 are fixed in the cylinder head section. Each of the spark plugs 24 is disposed in such a manner that a spark generation portion of the plug 24 is exposed in the vicinity of the lower surface of the cylinder head section and at a central position of each of the combustion chambers 21. Each of the spark plugs 24 is configured so as to generate spark for ignition from the spark generation portion in response to an ignition signal.

A plurality (four) of fuel injection valves (injectors) 25 are further fixed to the cylinder head section. Each of the intake ports 22 is provided with the fuel injection valve 25, in such a manner that there is a single (one) fuel injection valve 25 for each of the intake ports 22 (i.e., one injection valve per one cylinder). The injection valve 25 is configured so as to inject a fuel into the corresponding intake port 22 in response to an injection instruction signal by an instructed fuel injection amount Fi contained in the injection instruction signal.

Further, a variable intake timing control unit 26 is provided to the cylinder head section. The variable intake timing control unit 26 comprises a well know mechanism to adjust/control a relative rotational angle (phase angle) between an unillustrated camshaft and an unillustrated intake cam using a hydraulic pressure. The variable intake timing control unit 26 is configured so as to operate in response to an instruction signal (driving signal) to change an opening timing of the intake valve (intake valve opening timing).

The intake system 30 comprises an intake manifold 31, an intake pipe 32, an air filter 33, a throttle valve 34, and a throttle valve actuator 34*a*.

The intake manifold 31 comprises: a plurality of branch portions each of which communicates with each of the intake ports 22; and a surge tank portion to which the branch portions are aggregated. The intake pipe 32 is connected with the surge tank portion. The intake manifold 31, the intake pipe 32, and a plurality of the intake ports 22 forms an intake passage. The air filter 33 is disposed at an end of the intake pipe 32. The throttle valve 34 are rotatably supported/disposed in the intake pipe 32 at a position between the air filter 33 and the intake manifold 31. The throttle valve 34 is configured so as to change an opening cross sectional area of the intake passage formed by the intake pipe 32 with rotating. The throttle valve actuator 34*a* comprises a DC motor, and is configured so as to rotate the throttle valve 34 in response to an instruction signal (driving signal).

The exhaust system 40 comprises an exhaust manifold 41, an exhaust pipe 42, an upstream-side catalyst 43, and a downstream-side catalyst 44.

The exhaust manifold 41 includes: a plurality of branch portions 41*a* each of which communicates with each of the exhaust ports 23; and a merging portion (exhaust-gas-aggregated-portion) 41*b* to which all of the branch portions 41*a* aggregate. The exhaust pipe 42 is connected to the merging portion 41*b* of the exhaust manifold 41. The exhaust manifold 41, the exhaust pipe 42, and a plurality of the exhaust ports 23 form a passage through which the exhaust gas passes. It should be noted that, in the present specification, a passage formed by the merging portion 41*b* of the exhaust manifold 41 and the exhaust pipe 42 is referred to as an "exhaust passage", for convenience.

The upstream-side catalyst (catalytic unit for emission-purification) 43 is a three-way catalyst which supports "noble (precious) metals serving as catalytic substances" and "ceria ($CeO_2$) serving as a substance for storing oxygen" on the support body including ceramic, and has an oxygen storage/release function (oxygen storage function). The upstream-side catalyst 43 is disposed (intervened) in the exhaust pipe. When a temperature of the upstream-side catalyst 43 reaches a predetermined activating temperature, it exerts a "catalytic function to purify the unburnt substances (HC, CO, $H_2$, and the like) and the nitrogen oxides (NOx) simultaneously" and the "oxygen storage function." The upstream-side catalyst 43 is also referred to as a "start-catalytic-converter (SC) or first catalyst."

The downstream-side catalyst 44 is a three way catalyst which is the same as the upstream-side catalyst 43. The downstream-side catalyst 44 is disposed (intervened) in the exhaust pipe and at a position downstream of the upstream-side catalyst 43. The downstream-side catalyst 44 is disposed below a floor of a vehicle, and thus, is also referred to as an "under-floor-catalytic-converter (UFC) or a second catalyst." It should be noted that, in the present specification, a simple expression of "catalyst" means the upstream-side catalyst 43.

The first control apparatus comprises a hot-wire air flowmeter 51, a throttle position sensor 52, an engine rotational speed sensor 53, a water temperature sensor 54, an upstream-side air-fuel ratio sensor 55, a downstream-side air-fuel ratio sensor 56, and an accelerator opening sensor 57.

The air flowmeter 51 detects a mass flow rate of an intake air flowing in the intake pipe 32, and outputs a signal indicative of the mass flow rate (intake air amount of the engine 10 per unit time) Ga.

The throttle position sensor 52 detects the opening of the throttle valve 34, and outputs a signal indicative of the throttle valve opening TA.

The engine rotational speed sensor 53 outputs a signal which includes a narrow pulse generated every time the intake camshaft rotates 5 degrees and a wide pulse generated every time the intake camshaft rotates 360 degrees. The signal output from the engine rotational speed sensor 53 is converted into a signal indicative of an engine rotational speed NE by an electric controller 60, which will be described later. Further, the electric controller 60 obtains, based on the signals from the engine rotational speed sensor 53 and an unillustrated cam position sensor, a crank angle (absolute crank angle) of the engine.

The water temperature sensor 54 detects a temperature of cooling water of the engine 10, and outputs a signal indicative of the cooling water temperature THW.

The upstream-side air-fuel ratio sensor 55 is disposed at a position between the merging portion 41*b* of the exhaust manifold 41 and the upstream-side catalyst 43 and in either one of "the exhaust manifold 41 and the exhaust pipe 42 (that is, in the exhaust passage)." The upstream-side air-fuel ratio sensor 55 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
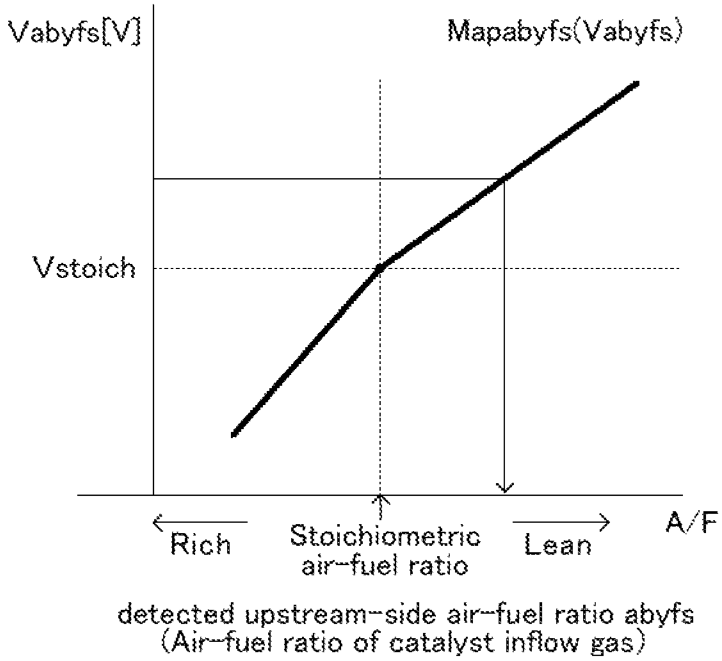
FIG. 2 is a graph showing a relationship between an output value of the upstream-side air-fuel ratio sensor shown in FIG. 1 and an air-fuel ratio.

As shown in FIG. 2, the upstream-side air-fuel ratio sensor 55 outputs an output value Vabyfs in accordance with an air-fuel ratio of an exhaust gas flowing at the position at which the upstream-side air-fuel ratio sensor 55 is disposed. The exhaust gas flowing at the position at which the upstream-side air-fuel ratio sensor 55 is disposed is a gas flowing into the catalyst 43, and thus, is also referred to as a "catalyst inflow gas." An air-fuel ratio of the catalyst inflow gas is also referred to as a "detected upstream-side air-fuel ratio abyfs." The output value Vabyfs becomes larger as the air-fuel ratio of the catalyst inflow gas becomes larger (i.e., the air-fuel ratio of the catalyst inflow gas becomes leaner).

The electric controller 60 stores an air-fuel ratio conversion table (map) Mapabyfs shown in FIG. 2. The electric controller 60 detects an actual upstream-side air-fuel ratio abyfs (that is, obtains the detected upstream-side air-fuel ratio abyfs) by applying the output value Vabyfs to the air-fuel ratio conversion table Mapabyfs.

Referring back to FIG. 1 again, the downstream-side air-fuel ratio sensor 56 is disposed in the exhaust pipe 42 (i.e., in the exhaust passage) and at a position between the upstream-side catalyst 43 and the downstream-side catalyst 44. The downstream-side air-fuel ratio sensor 56 is a well known "concentration-cell-type oxygen sensor ($O_2$ sensor)."

The downstream-side air-fuel ratio sensor 56 comprises, for example, a solid electrolyte layer (element for generating an output corresponding to an oxygen partial pressure) including zirconia, an exhaust gas side electrode layer formed on outer side of the solid electrolyte layer, an atmosphere side electrode layer which is exposed in an atmosphere chamber (inside of the solid electrolyte layer) and is formed on inner side of the solid electrolyte layer so as to face the exhaust gas side electrode layer through the solid electrolyte layer, and a diffusion resistance layer which covers the exhaust gas side electrode layer and with which the exhaust gas contacts (i.e., which is disposed so as to be exposed in the exhaust gas). The solid electrolyte layer may be test-tube like, or plate-like. Further, the downstream-side air-fuel ratio sensor 56 comprises a protective cover which covers an element section including the solid electrolyte layer, the exhaust gas side electrode layer, the atmosphere side electrode layer, and the diffusion resistance layer. The protective cover is made of a metal and has a plurality of through holes. The exhaust gas which has reached outer portion of the protective cover reaches an outer portion of the element portion through the through holes. The diffusion resistance layer changes the gas which has reached the outer portion of the downstream-side air-fuel ratio sensor 56 into an oxygen-equilibrium-gas (the gas after unburnt substances are combined with oxygen, and the gas including only an excessive unburnt substances or an excessive oxygen).

The downstream-side air-fuel ratio sensor 56 outputs an output value Voxs corresponding to an air-fuel ratio (downstream side air-fuel ratio afdown) of an exhaust gas flowing at the position at which the downstream-side air-fuel ratio sensor 56 is disposed.

Figure 3:
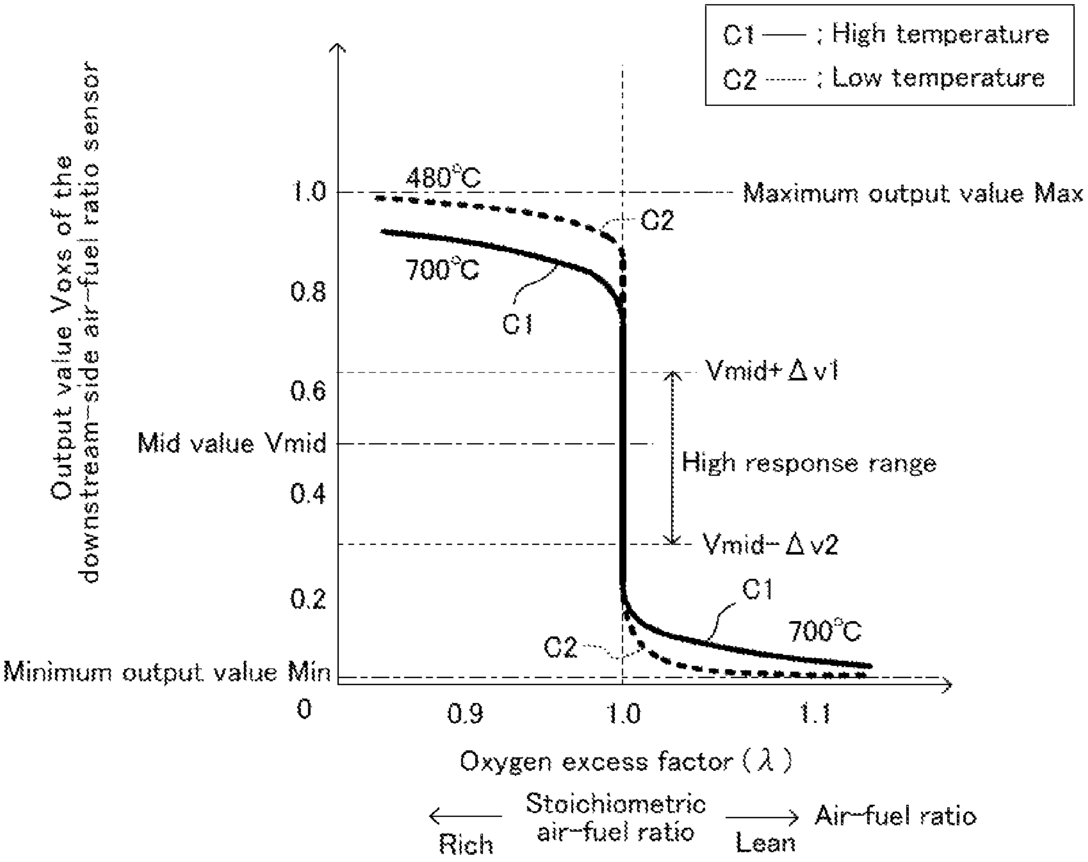
FIG. 3 is a graph showing a relationship between an output value of the downstream-side air-fuel ratio sensor shown in FIG. 1 and an air-fuel ratio.

As shown in FIG. 3, the output value Voxs of the downstream-side air-fuel ratio sensor 56 reaches/indicates a value in the vicinity of a maximum output value Max (e.g., about 0.9 V or 1.0 V) when the air-fuel ratio of the gas (element reaching gas) which has reached the element of the downstream-side air-fuel ratio sensor (actually, which has reached the exhaust gas side electrode layer) is richer than the stoichiometric air-fuel ratio, and therefore, when the oxygen partial pressure of the oxygen-equilibrium-gas of the gas which has reached the downstream-side air-fuel ratio sensor 56 is small. That is, the downstream-side air-fuel ratio sensor 56 outputs the maximum value Max when a state in which no excessive oxygen is included in the catalyst outflow gas continues over a certain time period.

Further, the output value Voxs reaches/indicates a value in the vicinity of a minimum output value Min (e.g., about 0.1 V or 0 V) when the air-fuel ratio of the element reaching gas is leaner than the stoichiometric air-fuel ratio, and therefore, when the oxygen partial pressure of the oxygen-equilibrium-gas of the gas which has reached the downstream-side air-fuel ratio sensor 56 is large. That is, the downstream-side air-fuel ratio sensor 56 outputs the minimum value Ming when a state in which a large amount of excessive oxygen is included in the catalyst outflow gas continues over a certain time period.

The output value Voxs rapidly decreases from a value in the vicinity of the maximum output value Max to a value in the vicinity of the minimum output value Min, when the air-fuel ratio of the catalyst outflow gas changes from an air-fuel ratio richer than the stoichiometric air-fuel ratio to an air-fuel ratio leaner than the stoichiometric air-fuel ratio. In contrast, the output value Voxs rapidly increases from a value in the vicinity of the minimum output value Min to a value in the vicinity of the maximum output value Max, when the air-fuel ratio of the catalyst outflow gas changes from an air-fuel ratio leaner than the stoichiometric air-fuel ratio to an air-fuel ratio richer than the stoichiometric air-fuel ratio. The output value Voxs substantially coincides with a mid value Mid (the mid value Vmid=(Max+Min)/2) which is a middle value of the maximum output value Max and the minimum output value Min), when an oxygen partial pressure of the element reaching gas coincides with an oxygen partial pressure obtained when the air-fuel ratio of the element reaching gas is equal to the stoichiometric air-fuel ratio.

The accelerator opening sensor 57 shown in FIG. 1 detects an operation amount of an accelerator pedal AP operated by a driver to output a signal indicative of the operation amount Accp of the accelerator pedal AP.

The electric controller 60 is an electric circuit including a "well-known microcomputer", which includes "a CPU, a ROM, a RAM, a backup RAM, and an interface which includes an AD converter, and so on."

The backup RAM included in the electric controller 60 is configured in such a manner that it is supplied with an electric power from a battery mounted on a vehicle on which the engine 10 is mounted regardless of a position (any one of an off-position, a start-position, an on-position, and the like) of an unillustrated ignition key switch of the vehicle. The backup RAM stores data (data is written into the backup RAM) in accordance with an instruction from the CPU, and retains (stores) the stored data in such a manner that the data can be read out, while it is supplied with the electric power from the battery. The backup RAM can not retain the data, while supply of the electric power from the battery is stopped, such as when the battery is taken out from the vehicle. Accordingly, the data that have been stored is eliminated (destroyed).

The interface of the electric controller 60 is connected to the sensors 51 to 57 to supply signals from the sensors 51 to 57 to the CPU. Further, the interface sends instruction signals (drive signals) or the like, in response to instructions from the CPU, to each of the ignition plugs 24 of each of the cylinders, each of the injection valves 25 of each of the cylinders, the variable intake timing control unit 26, and the throttle valve actuator 34*a*, etc. It should be noted that the electric controller 60 sends the instruction signal to the throttle valve actuator 34*a*, in such a manner that the throttle valve opening angle TA is increased as the obtained accelerator pedal operation amount Accp becomes larger.

(An Outline of an Air-Fuel Ratio Control by the First Control Apparatus)

An outline of a feedback control of an air-fuel ratio by the first control apparatus will next be described. The first control apparatus determines a target value VREF, makes a determination regarding an air-fuel ratio according to a <determination method> described later, and determines, based on the determination on the air-fuel ratio, which air-fuel ratio request is occurring, "a lean request or a rich request."

It should be noted that a reference value Vf used in the <determination method> described later is an ultimate target value VREF for the output value Voxs of the downstream-side air-fuel ratio sensor. The reference value Vf is set at (to) the mid value Vmid or a value in the vicinity of (close to) the mid value Vmid. That is, the reference value Vf is set to a value within a range (high sensitivity range shown in FIG. 3) in which a change amount in the output value Voxs is largest with respect to a change amount in the air-fuel ratio. In other words, the reference value Vf is a value within a certain/predetermined range (Vmid−Δv2 to Vmid+Δv1) which includes a value (e.g., mid value Vmid) which is equal to the output value Voxs of the downstream-side air-fuel ratio sensor when an oxygen partial pressure of a gas (element reaching gas) reaching the element (the solid electrolyte layer, in actuality, the exhaust-gas-side electrode layer) of the downstream-side air-fuel ratio sensor 56 is equal to an oxygen partial pressure obtained when the air-fuel ratio of the element reaching gas is equal to the stoichiometric air-fuel ratio.

The determination on (regarding) the air-fuel ratio is a determination made based on a comparison between the output value Voxs of the downstream-side air-fuel ratio sensor and the target value VREF, as described later.

When the determination on the air-fuel ratio indicates the rich air-fuel ratio, a state of the catalyst 43 is a state in which oxygen is short (oxygen storage amount OSA is smaller than a predetermined value OSAmin). Accordingly, when the determination on the air-fuel ratio indicates the rich air-fuel ratio, it is necessary to set the air-fuel ratio of the catalyst inflow gas (and therefore, the air-fuel ratio of the engine) to (at) the lean air-fuel ratio in order for the catalyst 43 to purify "substances to be purified" with high purifying efficiency. In view of the above, the first control apparatus determines that the lean request is occurring when the determination on the air-fuel ratio indicates the rich air-fuel ratio. When the lean request is occurring, the air-fuel ratio of the engine is increased. That is, the air-fuel ratio of the engine is controlled so as to be the "lean air-fuel ratio" which is an air-fuel ratio larger than the stoichiometric air-fuel ratio.

When the determination on the air-fuel ratio indicates the lean air-fuel ratio, the state of the catalyst 43 is a state in which oxygen is excessive (oxygen storage amount OSA is larger than a different predetermined value OSAmax larger than the predetermined value OSAmin). Accordingly, when the determination on the air-fuel ratio indicates the lean air-fuel ratio, it is necessary to set the air-fuel ratio of the catalyst inflow gas (and therefore, the air-fuel ratio of the engine) to (at) the rich air-fuel ratio in order for the catalyst 43 to purify "substances to be purified" with high purifying efficiency. In view of the above, the first control apparatus determines that the rich request is occurring when the determination on the air-fuel ratio indicates the lean air-fuel ratio. When the rich request is occurring, the air-fuel ratio of the engine is decreased. That is, the air-fuel ratio of the engine is controlled so as to be the "rich air-fuel ratio" which is an air-fuel ratio smaller than the stoichiometric air-fuel ratio.

<Determination Method>

The first control apparatus determines that the air-fuel ratio is "rich" when the output value Voxs is larger than the target value VREF. Accordingly, the first control apparatus determines that the lean request is occurring when the output value Voxs is larger than the target value VREF. The first control apparatus determines that the air-fuel ratio is "lean" when the output value Voxs is smaller than the target value VREF. Accordingly, the first control apparatus determines that the rich request is occurring when the output value Voxs is smaller than the target value VREF.

The first control apparatus obtains "a local maximum value Vmax and a local minimum value Vmin" of the output value Voxs. The first control apparatus determines the target value VREF (determination threshold VREF) as indicated in the following table 1, based on whether the lean request is occurring at present (that is, the air-fuel ratio of the engine is set to (at) the lean air-fuel ratio) or the rich request is occurring at present (that is, the air-fuel ratio of the engine is set to (at) the rich air-fuel ratio).

TABLE 1

| condition | | target value VREF | reference drawing |
|---|---|---|---|
| Determinaion on air-fuel ratio is rich (Lean request) | Vmax < Vf | Vmax − B2 | FIG. 4(C) |
| | Vmax − A1 > Vf | Vmax − A1 | FIG. 4(A) |
| | Vmax − A1 ≤ Vf | Vf | FIG. 4(B) |
| Determinaion on air-fuel ratio is lean (Rich request) | Vmin > Vf | Vmin + B1 | FIG. 5(C) |
| | Vmin + A2 < Vf | Vmin + A2 | FIG. 5(A) |
| | Vmin + A2 ≥ Vf | Vf | FIG. 5(B) |

Hereinafter, the table 1 above will be described.

(1) In a case in which it is determined that the present air-fuel ratio is "rich", and thus, the lean request is occurring (the air-fuel ratio of the engine has been increased)

When the output value Voxs of the downstream-side air-fuel ratio sensor changes from a value smaller than the target value VREF to a value larger than the target value VREF, it is determined the air-fuel ratio has changed to the rich air-fuel ratio (lean request has occurred). When the lean request is occurring, the air-fuel ratio of the engine is increased so that the air-fuel ratio of the catalyst inflow gas is increased, and therefore, a large amount of oxygen flows into the catalyst 43. Accordingly, when the lean request continues over a predetermined/certain time period, oxygen starts to be flowed out to the downstream of the catalyst 43. Consequently, the output value Voxs of the downstream-side air-fuel ratio sensor increases, and thereafter, starts to decrease, during a period in which the lean request is occurring. The first control apparatus obtains the local maximum value Vmax of the output value Voxs.

Figure 4:
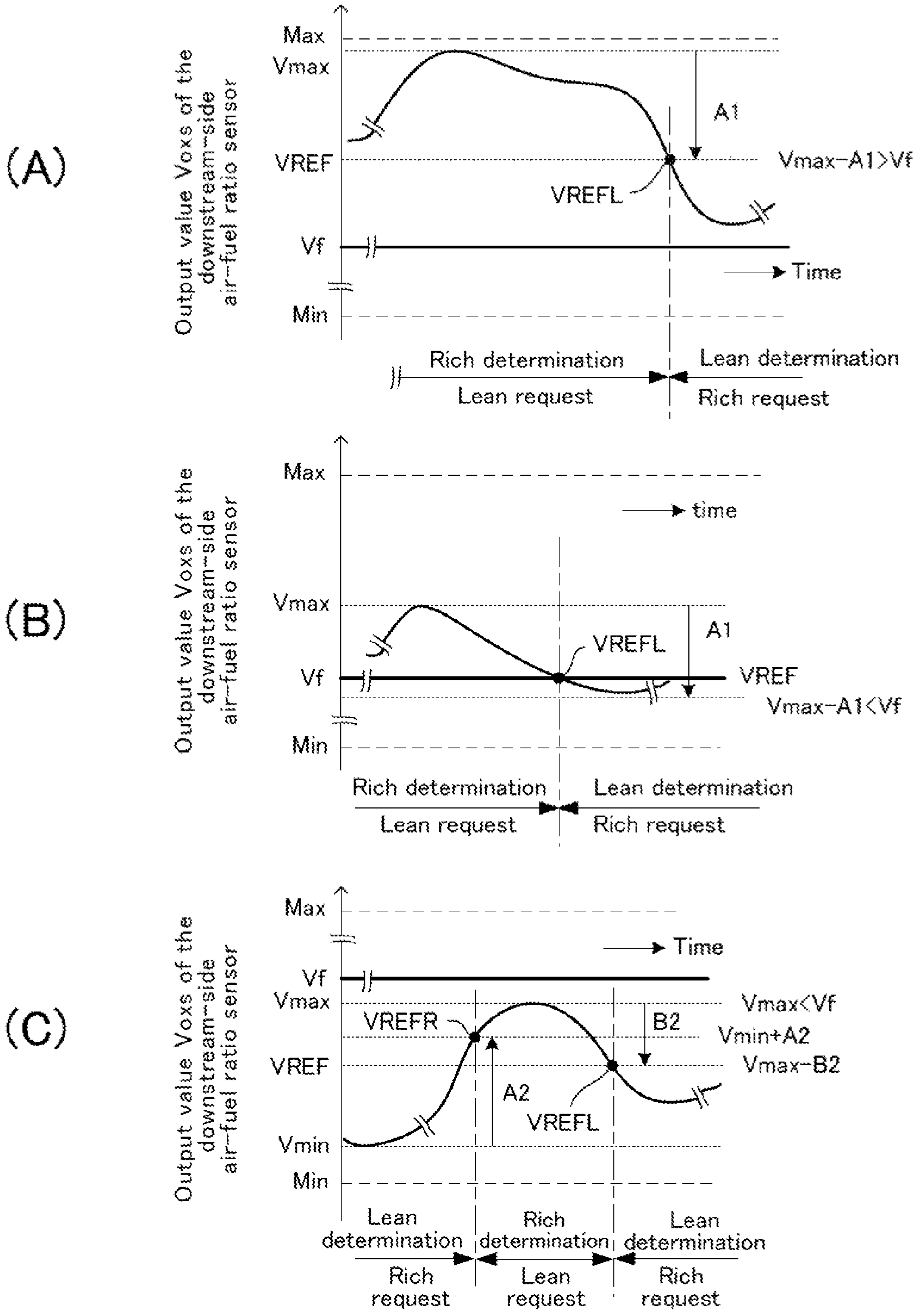
FIG. 4 includes (A) to (C), each being a drawing to explain a "method for setting a target value and determining a requested air-fuel ratio" adopted by the first control apparatus.

(1-1) When the local maximum value Vmax is larger than the reference value Vf (1-1a) When a "value (Vmax−A1) obtained by subtracting a positive constant value A1 (positive first threshold) from the local maximum value Vmax" is larger than the reference value Vf, the first control apparatus sets, as the target value VREF, a "value (Vmax−A1)" (refer to (A) of FIG. 4). The value A1 which is subtracted from the local maximum value Vmax is also referred to as a "first change value."

(1-1b) When the "value obtained by subtracting the positive constant value A1 (positive first threshold) from the local maximum value Vmax" is smaller than the reference value Vf, the first control apparatus sets, as the target value VREF, the reference value Vf (refer to (B) of FIG. 4).

(1-2) When the local maximum value Vmax is smaller than the reference value Vf

The first control apparatus sets, as the target value VREF, a "value (Vmax−B2) obtained by subtracting a positive constant value B2 from the local maximum value Vmax" (refer to (C) of FIG. 4). The value B2 is also referred to as a "second change value."

It should be noted that the target value VREF which is set for determining whether or not the air-fuel request changes to the rich request while the lean request is occurring (i.e., the target value VREF which is set for determining whether or not the air-fuel ratio changes to the lean air-fuel ratio while it is determined that the air-fuel ratio is rich) is also referred to as "a target value for lean determination VREFL, or a threshold for lean determination VREFL."

(2) In a case in which it is determined that the present air-fuel ratio is "lean", and thus, the rich request is occurring (the air-fuel ratio of the engine has been decreased)

When the output value Voxs of the downstream-side air-fuel ratio sensor changes from a value larger than the target value VREF to a value smaller than the target value VREF, it is determined the air-fuel ratio has changed to the lean air-fuel ratio (rich request has occurred). When the rich request is occurring, the air-fuel ratio of the engine is decreased so that the air-fuel ratio of the catalyst inflow gas is decreased, and therefore, a large amount of unburnt substance flows into the catalyst 43. Accordingly, when the rich request continues over a predetermined/certain time period, unburnt substance starts to be flowed out to the downstream of the catalyst 43, and little oxygen flows out. Consequently, the output value Voxs of the downstream-side air-fuel ratio sensor decreases, and thereafter, starts to increase, during a period in which the rich request is occurring. The first control apparatus obtains the local minimum value Vmin of the output value Voxs.

Figure 5:
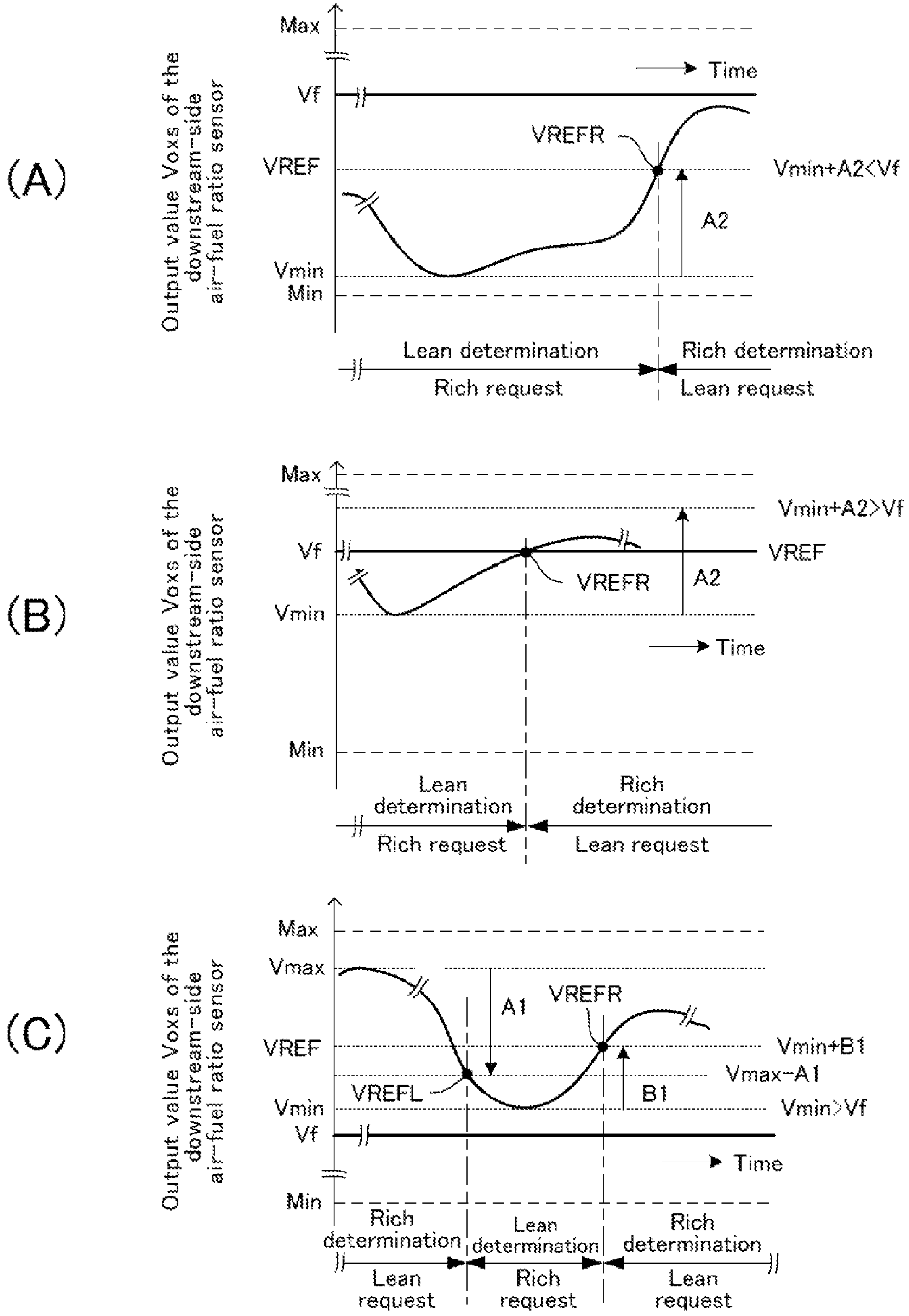
FIG. 5 includes (A) to (C), each being a drawing to explain the "method for setting a target value and determining a requested air-fuel ratio" adopted by the first control apparatus.

(2-1) When the local minimum value Vmin is smaller than the reference value Vf (2-1a) When a "value (Vmin+A2) obtained by adding a positive constant value A2 (positive first threshold) to the local minimum value Vmin" is smaller than the reference value Vf, the first control apparatus sets, as the target value VREF, a "value (Vmin+A2)" (refer to (A) of FIG. 5). The value A2 which is added to the local minimum value Vmin is also referred to as a "first change value."

(2-1b) When the "value (Vmin+A2) obtained by adding the positive constant value A2 (positive first threshold) to the local minimum value Vmin" is larger than the reference value Vf, the first control apparatus sets, as the target value VREF, the reference value Vf (refer to (B) of FIG. 5).

(2-2) When the local minimum value Vmin is larger than the reference value Vf

The first control apparatus sets, as the target value VREF, a "value (Vmin+B1) obtained by adding a positive constant value B1 to the local minimum value Vmin" (refer to (C) of FIG. 5). The value B1 is also referred to as a "second change value."

It should be noted that the target value VREF which is set for determining whether or not the air-fuel request changes to the lean request while the rich request is occurring (i.e., the target value VREF which is set for determining whether or not the air-fuel ratio changes to the rich air-fuel ratio while it is determined that the air-fuel ratio is lean) is also referred to as "a target value for rich determination VREFR, or a threshold for rich determination VREFR."

Relationships among A1, A2, B1, and B2 are as follows.

The value A1 is larger than the value B1 by a positive predetermined value or more (A1>B1>0, refer to (C) of FIG. 5). It should be noted that the value A1 is smaller than an absolute value of a difference between the maximum output value Max and the reference value Vf by a positive predetermined value e1. As described before, the value A1 is also referred to as the first change value, and the value B1 is also referred to as the second change value.

The value A2 is larger than the value B2 by a positive predetermined value or more (A2>B2>0, refer to (C) of FIG. 4). It should be noted that the value A2 is smaller than an absolute value of a difference between the minimum output value Min and the reference value Vf by a positive predetermined value e2. As described before, the value A2 is also referred to as the first change value, and the value B2 is also referred to as the second change value.

The value A1 and the value A2 may be equal to each other, and be a value A.

The value B1 and the value B2 may be equal to each other, and be a value B.

<Statuses of the Air-Fuel Ratio Control>

Figure 6:
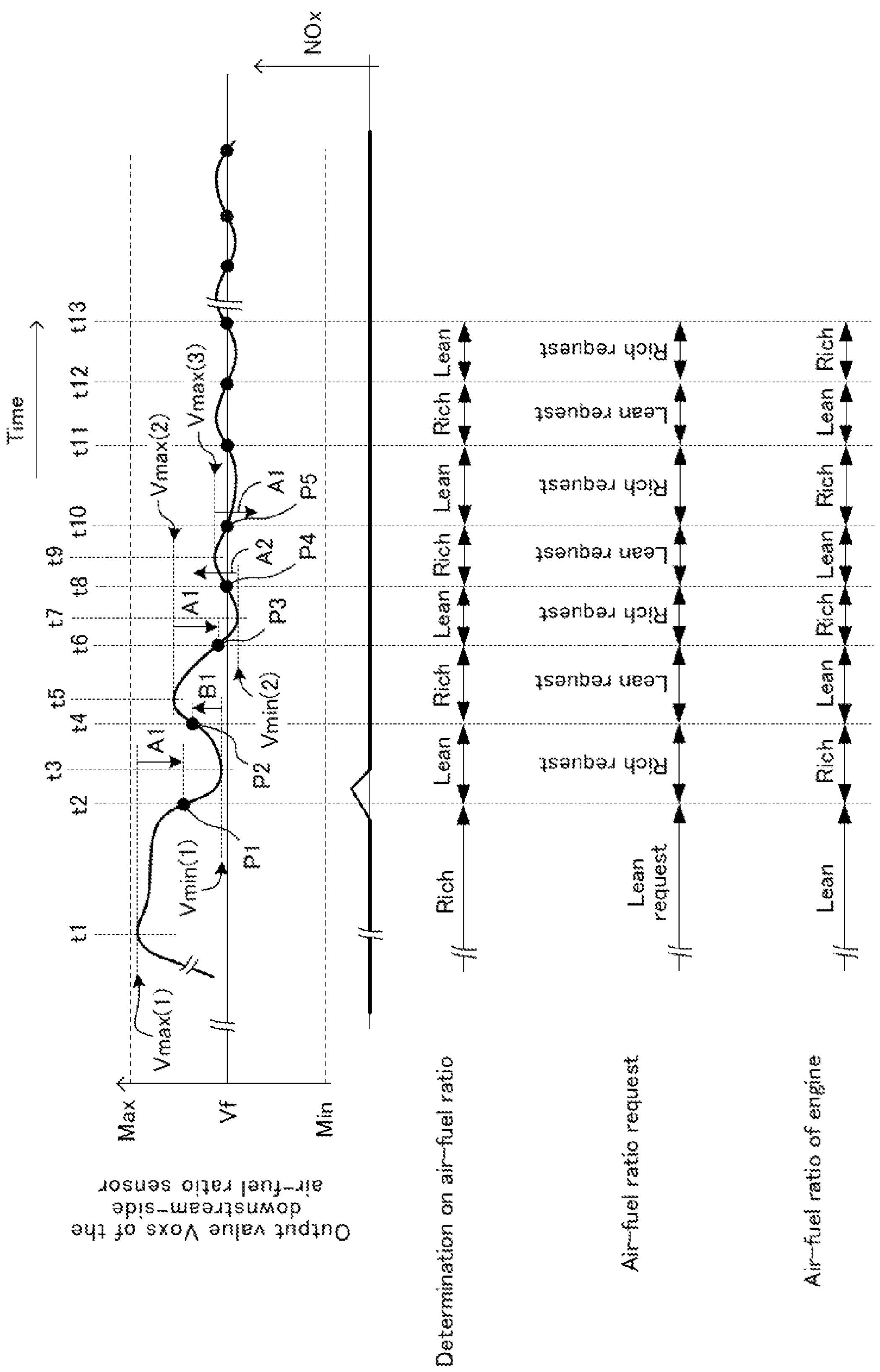
FIG. 6 is a timing chart showing an air-fuel ratio control by the first control apparatus.

Statuses of the air-fuel ratio control based on the determination method described above will next be described. FIG. 6 shows changes in the output value Voxs, the requested air-fuel ratio (air-fuel ratio request), and the like, in a case in which, before time t1, the oxygen storage amount OSA of the catalyst 43 becomes small, and consequently, the output value Voxs of the downstream-side air-fuel ratio sensor becomes larger than the reference value Vf by a considerably large amount.

More specifically, in the example shown in FIG. 6, it has been determined that the air-fuel ratio is "rich" before time t1, and thus, it has been determined that the lean request has been occurring. Accordingly, the air-fuel ratio of the engine is increased. This allows the oxygen storage amount OSA to gradually increases, and oxygen starts to flow out from the catalyst 43 after time t1. Consequently, the output value Voxs reaches/shows the local maximum value Vmax (=Vmax(1)) at time t1, and thereafter, decreases.

The first control apparatus obtains the local maximum value Vmax (=Vmax(1)). The local maximum value Vmax (=Vmax(1)) is a value close to (in the vicinity of) the maximum output value Max. Accordingly, a value (Vmax (1)−A1) obtained by subtracting the value A1 from the local maximum value Vmax (=Vmax(1)) is larger than the reference value Vf. Consequently, based on the determination method described above, the value (Vmax−A1=Vmax(1)−A1) is set as the target value VREF (target value for lean determination VREFL) (refer to point P1).

Thereafter, at time t2, the output value Voxs becomes smaller than the "target value VREF (=Vmax(1)−A1)." Accordingly, the first control apparatus determines that the air-fuel ratio is "lean", and the "rich request" has occurred. Thus, the air-fuel ratio of the engine starts to be decreased after time t2.

Consequently, the excessive unburnt substances flow into the catalyst 43. Accordingly, when a certain time period passes from time t2, an amount of the unburnt substances that flow out from the catalyst 43 starts to increase. Thus, the output value Voxs reaches the local minimum value Vmin (=Vmin(1)) at time t3, and thereafter, increases.

The first control apparatus obtains the local minimum value Vmin (=Vmin(1)). In the example shown in FIG. 6, the local minimum value Vmin (=Vmin(1)) is larger than the reference value Vf. Accordingly, based on the determination method described above, the "value (Vmin(1)+B1) obtained by adding the value B1 to the local minimum value Vmin (=Vmin(1))" is set as the "target value VREF (target value for rich determination VREFR)" (refer to point P2).

Thereafter, at time t4, the output value Voxs becomes larger than the "target value VREF (=Vmin(1)+B1)." Accordingly, the first control apparatus determines that the air-fuel ratio is "rich", and the "lean request" has occurred. Thus, the air-fuel ratio of the engine starts to be increased after time t4.

Consequently, the excessive oxygen flows into the catalyst 43. Accordingly, when a certain time period passes from time t4, an amount of oxygen that flows out from the catalyst 43 starts to increase. Thus, the output value Voxs reaches the local maximum value Vmax (=Vmax(2)) at time t5, and thereafter, decreases.

The first control apparatus obtains the local maximum value Vmax (=Vmax(2)). In the example shown in FIG. 6, a value (Vmax(2)−A1) obtained by subtracting the value A1 from the local maximum value Vmax (=Vmax(2)) is larger than the reference value Vf. Accordingly, based on the determination method described above, the value (Vmax−A1=Vmax(2)−A1) is set as the target value VREF (target value for lean determination VREFL) (refer to point P3).

Thereafter, at time t6, the output value Voxs becomes smaller than the "target value VREF (=Vmax(2)−A1)." Accordingly, the first control apparatus determines that the air-fuel ratio is "lean", and the "rich request" has occurred. Thus, the air-fuel ratio of the engine starts to be decreased after time t6.

Consequently, the excessive unburnt substances flow into the catalyst 43. Accordingly, when a certain time period passes from time t6, an amount of the unburnt substances that flow out from the catalyst 43 starts to increase. Thus, the output value Voxs reaches the local minimum value Vmin (=Vmin(2)) at time t7, and thereafter, increases.

The first control apparatus obtains the local minimum value Vmin (=Vmin(2)). In the example shown in FIG. 6, the local minimum value Vmin (=Vmin(2)) is smaller than the reference value Vf, and a "value (Vmin(2)+A2) obtained by adding the value A2 to the local minimum value Vmin (=Vmin(2))" is larger than the reference value Vf. Accordingly, based on the determination method described above, the reference value Vf is set as the "target value VREF (target value for rich determination VREFR)" (refer to point P4).

Thereafter, at time t8, the output value Voxs becomes larger than the "target value VREF (=Vf)." Accordingly, the first control apparatus determines that the air-fuel ratio is "rich", and the "lean request" has occurred. Thus, the air-fuel ratio of the engine starts to be increased after time t8.

Consequently, the excessive oxygen flows into the catalyst 43. Accordingly, when a certain time period passes from time t8, an amount of oxygen that flows out from the catalyst 43 starts to increase. Thus, the output value Voxs reaches the local maximum value Vmax (=Vmax(3)) at time t9, and thereafter, decreases.

The first control apparatus obtains the local maximum value Vmax (=Vmax(3)). In the example shown in FIG. 6, the local maximum value Vmax (=Vmax(3)) is larger than the reference value Vf, but a "value (Vmax(3)−A1) obtained by subtracting the value A1 from the local maximum value Vmax (=Vmax(3))" is smaller than the reference value Vf. Accordingly, based on the determination method described above, the reference value Vf is set as the target value VREF (target value for lean determination VREFL) (refer to point P5).

Thereafter, at time t10, the output value Voxs becomes smaller than the "target value VREF (=Vf)." Accordingly, the first control apparatus determines that the air-fuel ratio is "lean", and the "rich request" has occurred. Thus, the air-fuel ratio of the engine starts to be decreased after time t10.

Consequently, the excessive unburnt substances flow into the catalyst 43. Accordingly, when a certain time period passes from time t10, an amount of the unburnt substances that flow out from the catalyst 43 starts to increase. Thus, the output value Voxs again increases, and becomes larger than the "target value VREF which is set at (to) the reference value Vf" at time t11. After this point in time, the reference value Vf continues to be set as the target value VREF, similarly to time t8-time t11.

As described above, the first control apparatus has/makes the target value VREF come closer to (approach) the reference value Vf when the output value Voxs of the downstream-side air-fuel ratio sensor reaches the value in the vicinity of the maximum output value Max, so that the first control apparatus can make the output value Voxs come closer to the reference value Vf with maintaining a magnitude of fluctuation of the output value Voxs at a small level. When the magnitude of fluctuation of the output value Voxs is maintained at a small level, it means that neither a large amount of oxygen nor a large amount of unburnt substance flows out from the catalyst 43. In other words, the first control apparatus can have the output value Voxs move/change to a value in the vicinity of the reference value Vf, while/with purifying the unburnt substances and Nox by the catalyst 43, even when the output value Voxs reaches the value in the vicinity of the maximum output value Max.

Figure 7:
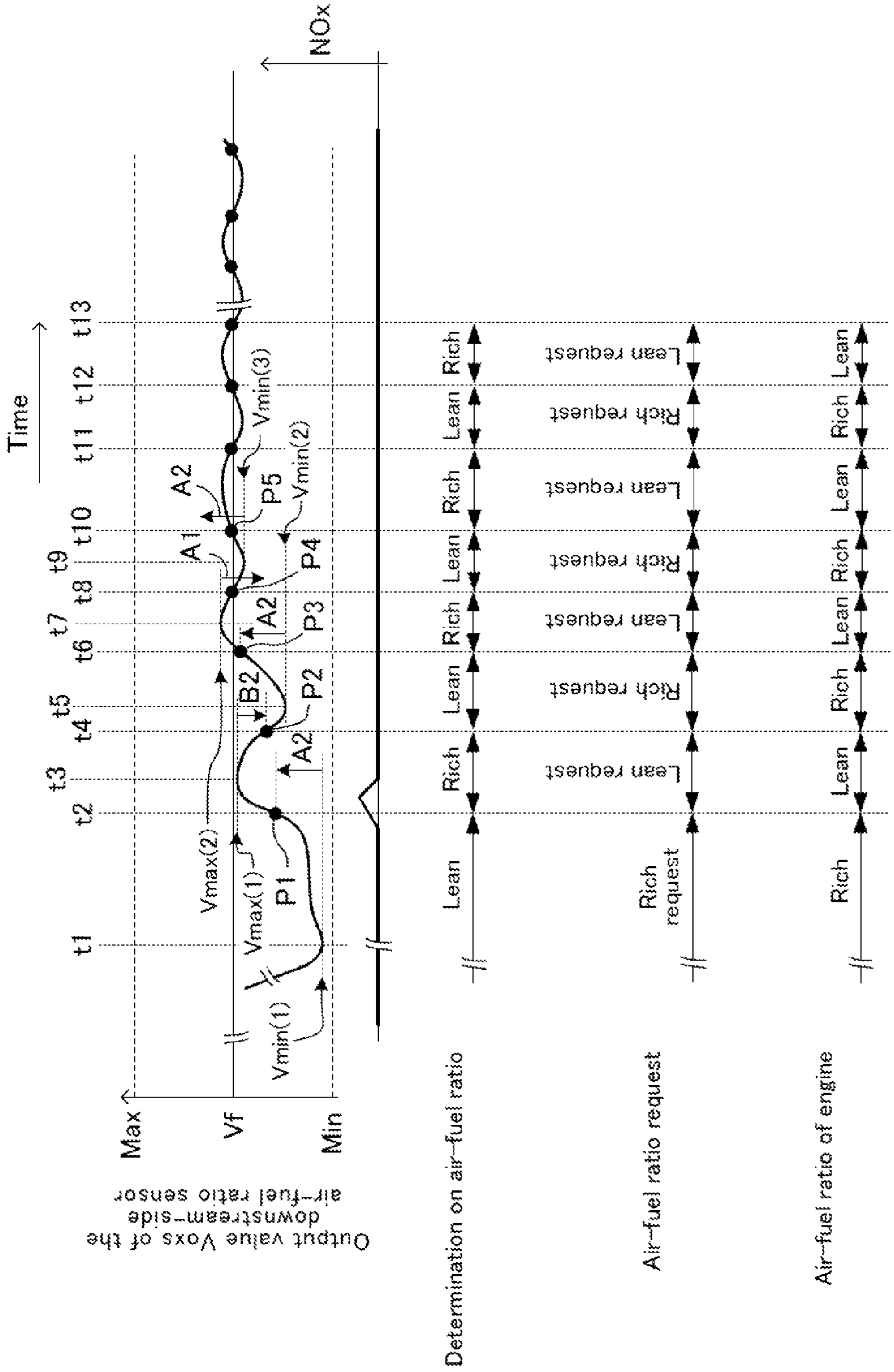
FIG. 7 is a timing chart showing an air-fuel ratio control by the first control apparatus.

Although a detailed description is omitted, as shown in FIG. 7, the first control apparatus has/makes the target value VREF come closer to (approach) the reference value Vf in a case in which the output value Voxs reaches the value in the vicinity of the minimum output value Min. Accordingly, similarly to the case shown in FIG. 6, the first control apparatus can make the output value Voxs come closer to the reference value Vf with maintaining a magnitude of fluctuation of the output value Voxs at a small level.

(Actual Operations)

Actual operations of the first control apparatus will next be described. Hereinafter, for ease of explanation, an expression of "MapX(a1,a2 . . . )" means a "table whose arguments are a1, a2, . . . " and a "table to obtain a value X."

<Fuel Injection Control>

Figure 8:
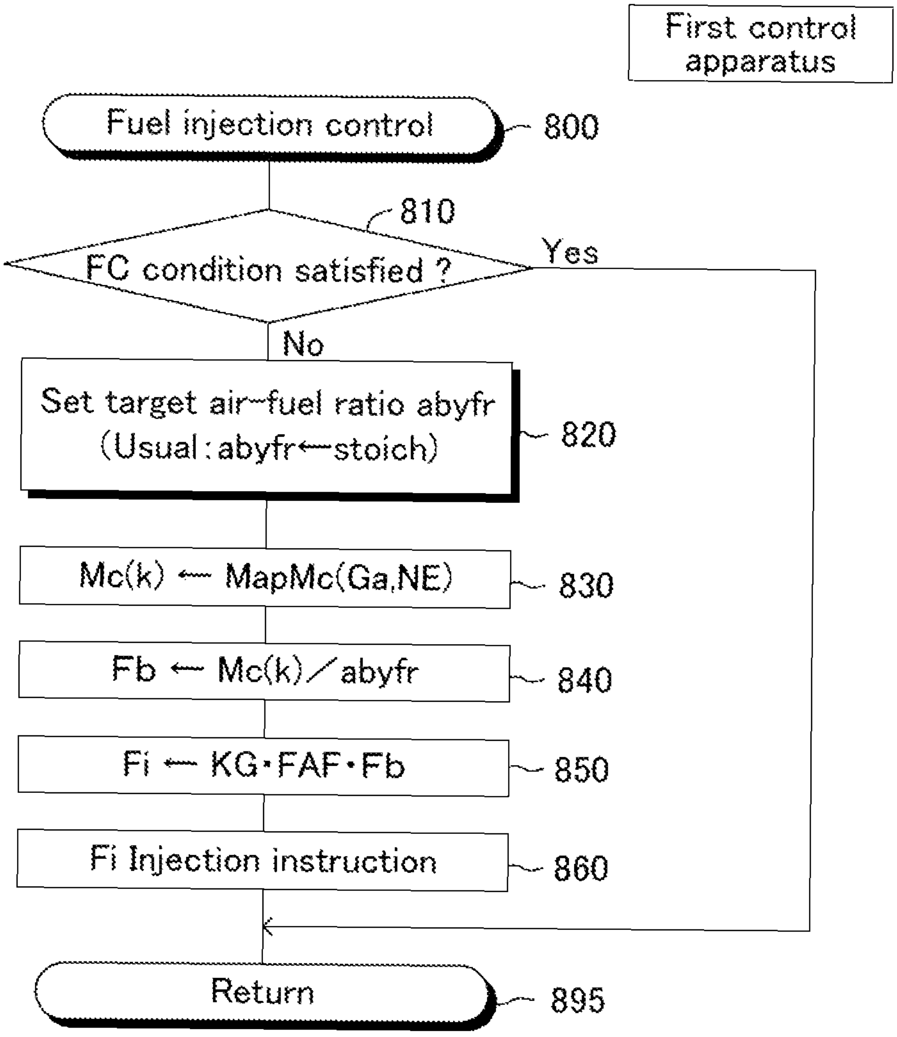
FIG. 8 is a flowchart showing a routine executed by a CPU of the first control apparatus.

The CPU of the first control apparatus repeatedly executes a fuel injection control routine shown in FIG. 8, every time the crank angle of any one of the cylinders reaches a predetermined crank angle before its intake top dead center, for that cylinder. The predetermined crank angle is, for example, BTDC 90° CA (90° crank angle before the intake top dead center). The cylinder whose crank angle coincides with the predetermined crank angle is also referred to as a "fuel injection cylinder." The CPU calculates an instructed fuel injection amount (final fuel injection amount) Fi and instruct an fuel injection, according to the injection control routine.

When the crank angle of any one of the cylinders coincides with the predetermined crank angle, the CPU starts processes from step 800, and determines whether or not a fuel cut condition (hereinafter, expressed as a "FC condition") is satisfied at step 810.

It is assumed that the FC condition is not satisfied. Under this assumption, the CPU makes a "No" determination at step 810 to perform processes from step 820 to step 860 described below in order. Thereafter, the CPU proceeds to step 895 to end the present routine tentatively.

Step 820: The CPU determines, based on the operating condition of the engine 10, a target air-fuel ratio abyfr (target upstream-side air-fuel ratio abyfr). In the present example, the target air-fuel ratio abyfr is set to (at) the stoichiometric air-fuel ratio stoich (e.g., 14.6).

Step 830: The CPU obtains an "amount of air introduced into the fuel injection cylinder (i.e., cylinder intake air amount Mc(k))", based on "the intake air flow rate Ga measured by the air-flow meter 51, the engine rotational speed NE obtained based on the signal from the engine rotational speed sensor 53, and a look-up table MapMc(Ga, NE)." The cylinder intake air amount Mc(k) is stored in the RAM, while being related to the intake stroke of each cylinder. The cylinder intake air amount Mc(k) may be calculated based on a well-known air model (model constructed according to laws of physics describing and simulating a behavior of an air in the intake).

Step 840: The CPU obtains a base fuel injection amount Fb through dividing the cylinder intake air amount Mc(k) by the target air-fuel ratio abyfr. The base fuel injection amount Fb is a feedforward amount of the fuel injection amount required to realize the target air-fuel ratio abyfr (stoichiometric air-fuel ratio, in the present example). The step 840 constitutes feedforward control section to have the air-fuel ratio of the mixture supplied to the engine (air-fuel ratio of the engine) become equal to the target air-fuel ratio abyfr.

Step 850: The CPU corrects the base fuel injection amount Fb with a main feedback learning value (main FB learning value) KG and a main feedback coefficient FAF. More specifically, the CPU calculates the instructed fuel injection amount Fi by multiplying the base fuel injection amount Fb by a "product of the main FB learning value KG and the main feedback coefficient FAF." That is, a formula of Fi=KG·FAF·Fb is used to obtain the instructed fuel injection amount Fi. The main FB learning value KG and the main feedback coefficient FAF are obtained by a routine shown in FIG. 9 and described later. The main FB learning value KG is stored in the backup RAM.

Step 860: The CPU sends the fuel injection instruction signal to the "fuel injection valve 25 disposed so as to correspond to the fuel injection cylinder" in order to have the fuel injection valve 25 inject a "fuel of the instructed fuel injection amount Fi."

Consequently, the fuel whose amount is required to have the air-fuel ratio of the engine coincide with the target air-fuel ratio abyfr (stoichiometric air-fuel ratio) is injected from the fuel injection valve 25 of the fuel injection cylinder. That is, the steps from 820 to 860 constitute an instructed fuel injection amount control section for controlling the instructed fuel injection amount Fi in such a manner that the air-fuel ratio of the engine becomes equal to the target air-fuel ratio abyfr.

To the contrary, if the FC condition is satisfied when the CPU executes the process of the step 810, the CPU makes a "Yes" determination at step 810 to directly proceed to step 895 at which CPU ends the present routine tentatively. In this case, the fuel injection by the process of the step 860 is not carried out, and thus, a fuel cut control (fuel supply stopping control) is performed.

<Main Feedback Control>

Figure 9:
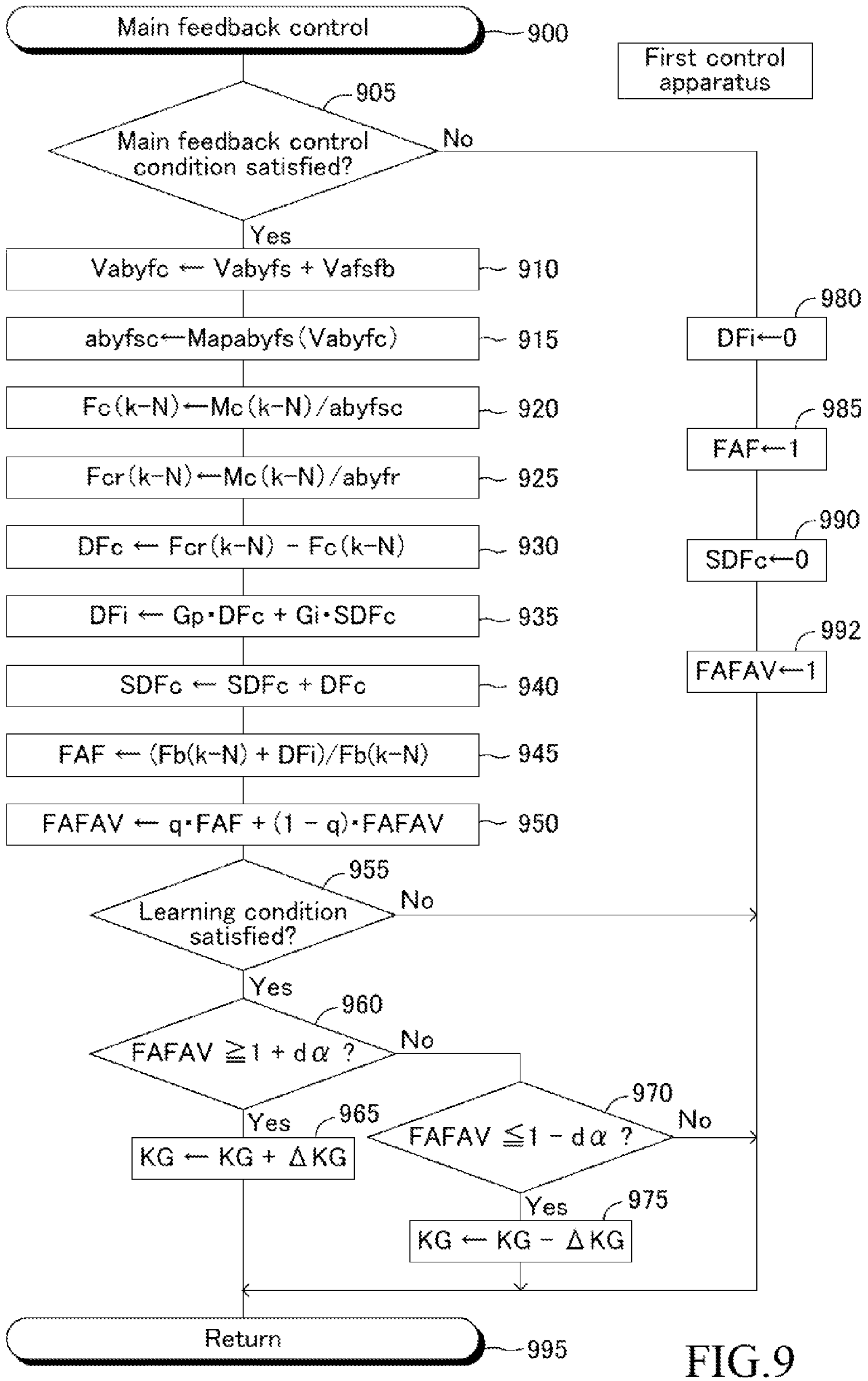
FIG. 9 is a flowchart showing a routine executed by the CPU of the first control apparatus.

The CPU repeatedly executes a "main feedback control routine" shown by a flowchart in FIG. 9, every time a predetermined time period ta elapses. Accordingly, at an appropriate point in time, the CPU starts processes from step 900 to proceed to step 905 at which CPU determines whether or not a "main feedback control condition (upstream-side air-fuel ratio feedback control condition)" is satisfied.

The main feedback control condition is satisfied when all of the following conditions are satisfied.

(A1) The upstream-side air-fuel ratio sensor 55 has been activated.

(A2) The load KL of the engine is smaller than or equal to a threshold KLth.

(A3) The fuel cut control is not being performed.

It should be noted that the load rate KL is a load rate which is obtained based on the following formula (1). The accelerator pedal operation amount Accp can be used in place of the load rate KL. In the formula (1), Mc is the cylinder intake air amount, ρ is an air density (unit is (g/l), L is a displacement of the engine 10 (unit is (l)), and "4" is the number of cylinders of the engine 10.

$$KL=(Mc/(\rho \cdot L/4))\cdot 100\% \quad (1)$$

The description continues assuming that the main feedback control condition is satisfied. Under this assumption, the CPU makes a "Yes" determination at step 905 to execute processes from steps 910 to 950 described below in order to obtain a main feedback control amount DFi, the main feedback coefficient FAF, and the like.

Step 910: The CPU obtains an output value Vabyfc for a feedback control, according to a formula (2) described below. In the formula (2), Vabyfs is the output value of the upstream-side air-fuel ratio sensor 55, and Vafsfb is a sub feedback control amount calculated based on the output value Voxs of the downstream-side air-fuel ratio sensor 55. The sub feedback control amount Vafsfb is calculated by a routine shown in FIG. 10 and described later.

$$Vabyfc=Vabyfs+Vafsfb \quad (2)$$

Step 915: The CPU obtains an air-fuel ratio abyfsc for a feedback control by applying the output value Vabyfc for a feedback control to the table Mapabyfs shown in FIG. 2, as shown by a formula (3) described below.

$$abyfsc=Mapabyfs(Vabyfsc) \quad (3)$$

Step 920: According to a formula (4) described below, the CPU obtains a "cylinder fuel supply amount Fc(k−N)" which is an "amount of the fuel actually supplied to the combustion chamber 21 for a cycle at a timing N cycles before the present time." That is, the CPU obtains the cylinder fuel supply amount Fc(k−N) through dividing the "cylinder intake air amount Mc(k−N) which is the cylinder intake air amount for the cycle the N cycles (i.e., N·7200 crank angle) before the present time" by the "air-fuel ratio abyfsc for a feedback control."

$$Fc(k-N)=Mc(k-N)/abyfsc \quad (4)$$

The reason why the cylinder intake air amount Mc(k−N) for the cycle N cycles before the present time is divided by the air-fuel ratio abyfsc for a feedback control in order to obtain the cylinder fuel supply amount Fc(k−N) is that the "exhaust gas generated by the combustion of the mixture in the combustion chamber 21" requires "time corresponding to the N cycles" to reach the upstream-side air-fuel ratio sensor 55.

Step 925: The CPU obtains a "target cylinder fuel supply amount Fcr(k−N)" which is a "fuel amount supposed to be supplied to the combustion chamber 22 for the cycle the N cycles before the present time", according to a formula (5) described below. That is, the CPU obtains the target cylinder fuel supply amount Fcr(k−N) through dividing the cylinder intake air amount Mc(k−N) for the cycle the N cycles before the present time by the target air-fuel ratio abyfr.

$$Fcr(k-N)=Mc(k-N)/abyfr \quad (5)$$

Step 930: The CPU obtains an "error DFc of the cylinder fuel supply amount", according to a formula (6) described below. That is, the CPU obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc=Fcr(k-N)-Fc(k-N) \quad (6)$$

Step 935: The CPU obtains the main feedback control amount DFi, according to a formula (7) described below. In the formula (7) below, Gp is a predetermined proportion gain, and Gi is a predetermined integration gain. Further, a "value SDFc" in the formula (7) is an "integrated value of the error DFc of the cylinder fuel supply amount." That is, the CPU calculates the "main feedback control amount DFi" based on a proportional-integral control to have the air-fuel ratio abyfsc for a feedback control coincide with the target air-fuel ratio abyfr.

$$DFi=Gp\cdot DFc+Gi\cdot SDFc \quad (7)$$

Step 940: The CPU obtains a new integrated value SDFc of the error DFc of the cylinder fuel supply amount by adding the error DFc of the cylinder fuel supply amount obtained at the step 930 to the current integrated value SDFc of the error DFc of the cylinder fuel supply amount.

Step 945: The CPU calculates the main feedback coefficient FAF by applying the main feedback control amount DFi and the base fuel injection amount Fb(k−N) to a formula (8) described below. That is, the main feedback coefficient FAF is obtained through dividing a "value obtained by adding the main feedback control amount DFi to the base fuel injection amount Fb(k−N) the N cycle before the present time" by the "base fuel injection amount Fb(k−N)." In this manner described above, the main feedback control amount DFi is obtained based on the proportional-integral control, and the main feedback control amount DFi is converted into the main feedback coefficient FAF.

$$FAF=(Fb(k-N)+DFi)/Fb(k-N) \quad (8)$$

Step 950: The CPU obtains, as a main feedback coefficient average FAFAV, a weighted average of the main feedback coefficient FAF, according to a formula (9) described below. The main feedback coefficient average FAFAV is also referred to as a "correction coefficient average FAFAV." The main feedback coefficient average FAFAV is a value correlated with an average of the main feedback control amount DFi.

In the formula (9) described below, the FAFAVnew is a updated (renewed) correction coefficient average FAFAV, and is stored as a new correction coefficient average FAFAV. In the formula (9), the value q is a constant which is larger than 0 and smaller than 1. The main feedback coefficient average FAFAV may be an average of the main feedback coefficient FAF for a predetermined period.

$$FAFAV\text{new}=q\cdot FAF+(1-q)\cdot FAFAV \quad (9)$$

Subsequently, the CPU proceeds to steps following step 995 to update (renew, obtain, calculate) the main FB learning value KG. That is, the CPU obtains, based on the correction coefficient average FAFAV, the main FB learning value KG for having the main feedback coefficient FAF come closer to a standard value (base value) "1".

More specifically, the CPU proceeds to step 955 to determine whether or not a learning condition is satisfied. For example, the learning condition is satisfied every time a "time period obtained by multiplying the time duration (predetermined time ta) for a single execution of the routine shown in FIG. 9 by a natural number" elapses.

When the learning condition is not satisfied, the CPU makes a "No" determination at step 955 to directly proceed to step 995 to end the present routine tentatively. Consequently, the update of the main FB learning value is not carried out.

In contrast, when the learning condition is satisfied at present, the CPU makes a "Yes" determination at step 955 to proceed to step 960, at which the CPU determines whether or not the correction coefficient average FAFAV is equal to or larger than a value (1+dα). The value dα is a predetermined positive value, and for example, is equal to 0.02.

When the correction coefficient average FAFAV is equal to or larger than the value (1+dα), the CPU proceeds to step 965, at which the CPU increases the main FB learning value KG by a positive predetermined value ΔKG. Thereafter, the CPU proceeds to step 995 to end the present routine tentatively. It should be noted that the main FB learning value KG is stored in the backup RAM, as described before.

To the contrary, when the CPU proceeds to step 960, and if the correction coefficient average FAFAV is smaller than the value (1+dα), the CPU proceeds to step 970, at which the CPU determines whether or not the correction coefficient average FAFAV is equal to or smaller than a value (1−dα). When the correction coefficient average FAFAV is equal to or smaller than the value (1−dα), the CPU proceeds to step 975 to decrease the main FB learning value KG by the positive predetermined value ΔKG. Thereafter, the CPU proceeds to step 995 to end the present routine tentatively.

When the CPU proceeds to step 970, and if the correction coefficient average FAFAV is larger than the value (1−dα), the CPU directly proceeds to step 995 from step 970, to end the present routine tentatively. That is, when the correction coefficient average FAFAV is between the value (1−dα) and the value (1+dα), the main FB learning value KG is not updated/renewed.

Meanwhile, when the main feedback control condition is not satisfied upon the determination of step 905, the CPU makes a "No" determination at step 905 to perform processes from step 980 to step 992 described below in order.

Step 980: The CPU sets the value of the main feedback control amount DFi at "0."

Step 985: The CPU sets the value of the main feedback coefficient FAF at "1."

Step 990: The CPU sets the value of the integrated value SDFc of the error of the cylinder fuel supply amount at "0."

Step 992: The CPU sets the value of the correction coefficient average FAFAV at "1."

Thereafter, the CPU proceeds to step 995 to end the present routine tentatively.

As described above, when the main feedback control condition is not satisfied, the value of the main feedback control amount DFi is set at "0", and the value of the main feedback coefficient FAF is set at "1." Accordingly, the base fuel injection amount Fb is not corrected with the main feedback coefficient FAF. It should be noted that, even in such a case, the base fuel injection amount Fb is corrected with the main FB learning value KG.

<Sub Feedback Control>

Figure 10:
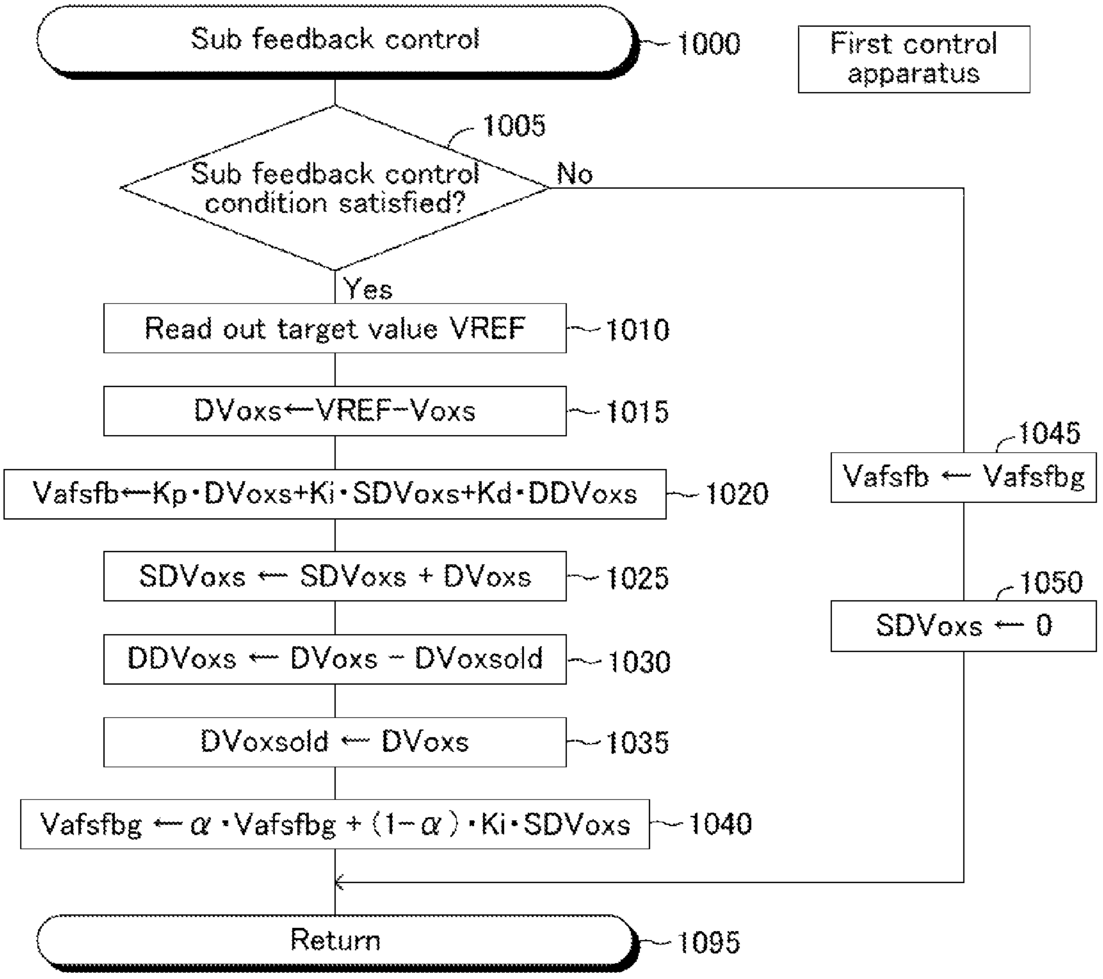
FIG. 10 is a flowchart showing a routine executed by the CPU of the first control apparatus.

The CPU executes a "sub feedback control routine" shown by a flowchart in FIG. 10, every time a predetermined time period elapses, in order to calculate the sub feedback control amount Vafsfb.

Accordingly, at an appropriate point in time, the CPU starts processes from step 1000 to proceed to step 1005, at which CPU determines whether or not a sub feedback control condition is satisfied.

The sub feedback control condition is satisfied when all of the following conditions are satisfied.

(B1) The main feedback control condition is satisfied.

(B2) The downstream-side air-fuel ratio sensor 56 has been activated.

The description continues assuming that the sub feedback control condition is satisfied. Under this assumption, the CPU makes a "Yes" determination at step 1005 to execute processes from steps 1010 to 1040 described below in order, and thereafter, it proceeds to step 1095 to end the present routine tentatively.

Step 1010: The CPU read out the target value VREF (target value for the output value Voxs of the downstream-side air-fuel ratio sensor). The target value VREF is determined by a routine described later.

Step 1015: The CPU obtains an "error amount of output DVoxs" which is a difference between the "target value VREF" and the "output value Voxs of the downstream air-fuel ratio sensor 56", according to a formula (10) described below. That is, the CPU obtains the error amount of output DVoxs by subtracting the output value Voxs from the target value VREF.

$$DVoxs=VREF-Voxs \quad (10)$$

Step 1020: The CPU obtains the sub feedback control amount Vafsfb according to a formula (11) described below. In the formula (11) below, Kp is a predetermined proportion gain (proportional constant), Ki is a predetermined integration gain (integration constant), and Kd is a predetermined differential gain (differential constant). The SDVoxs is an integrated value of the error amount of output DVoxs, and the DDVoxs is a differential value of the error amount of output DVoxs.

$$Vafsfb=Kp\cdot DVoxs+Ki\cdot SDVoxs+Kd\cdot DDVoxs \quad (11)$$

Step 1025: The CPU obtains a new integrated value SDVoxs of the error amount of output DVoxs by adding the "error amount of output DVoxs obtained at the step 1015" to the "current integrated value SDVoxs of the error amount of output."

Step 1030: The CPU obtains a new differential value DDVoxs by subtracting a "previous error amount of the output DVoxsold calculated when the present routine was executed at a previous time" from the "error amount of output DVoxs calculated at the step 1015."

Step 1035: The CPU stores the "error amount of output DVoxs calculated at the step 1015" as the "previous error amount of output DVoxsold."

In this manner, the CPU calculates the "sub feedback control amount Vafsfb" according to a proportional-integral-differential (PID) control to have the output value Voxs of the downstream-side air-fuel ratio sensor 56 coincide with the target value VREF. As shown in the formula (2) described above, the sub feedback control amount Vafsfb is used to calculate the output value Vabyfc for a feedback control.

Step 1040: The CPU updates/renews the sub FB learning value Vafsfbg according to a formula (12) described below. The Vafsfbg(k+1) which is the left-hand side of the formula (12) is an updated sub FB learning value Vafsfbg. The Value a is a value equal to or larger than 0 and smaller than 1.

$$Vafsfbg(k+1)=\alpha\cdot Vafsfbg+(1-\alpha)\cdot Ki\cdot SDVoxs \quad (12)$$

As is clear from the formula (12), the sub FB learning value Vafsfbg is a value obtained by performing a "filtering process to eliminate noises" on the "integral term Ki·SDVoxs of the sub feedback control amount Vafsfb." In other words, the sub FB learning value Vafsfbg is a value corresponding (according) to the steady-state component (integral term) of the sub feedback control amount Vafsfb. The updated sub FB learning value Vafsfbg (=Vafsfbg(k+1)) is stored in the backup RAM.

When the CPU performs the process of step 1005, and if the sub feedback control condition is not satisfied, the CPU makes a "No" determination at step 1005 to perform processes from step 1045 to 1050 described below in order. Thereafter, the CPU proceeds to step 1095 to end the present routine tentatively.

Step 1045: The CPU adopts, as the value of the sub feedback control amount Vafsfb, the sub FB learning value Vafsfbg.

Step 1050: The CPU sets the value of the integrated value SDVoxs of the error amount of output at (to) "0."

As described above, the sub feedback control amount Vafsfb is obtained so as to have the output value Voxs become equal to (coincide with) the target value VREF, and the sub feedback control amount Vafsfb is used to calculate the instructed fuel injection amount Fi (refer to step 910 in FIG. 9). Accordingly, the instructed fuel injection amount Fi is feedback-controlled in such a manner that the output value Voxs becomes equal to (coincides with) the target value VREF.

<Determination of the Target Value VREF>

The CPU executes a "target value determining routine" shown in FIG. 10, every time a predetermined time period elapses, in order to determine the "target value which is used for the sub feedback control." Accordingly, at an appropriate point in time, the CPU starts processes from step 1100 to proceed to step 1110, at which the CPU determines whether or not the "sub feedback control condition" described above is satisfied.

The description continues assuming that the sub feedback control condition is not satisfied. Under this assumption, the CPU makes a "No" determination at step 1110 to proceed to step 1120, at which a value of a target value converging control flag XVSFB to (at) "0." The target value converging control flag XVSFB indicates that a target value converging control (target value changing control) is being performed to have the target value VREF converge on the reference value Vf when the value of the flag XVSGB is "1", and indicates that the target value converging control is not being performed when the value of the flag XVSGB is "0." It should be noted that the value of the target value converging control flag XVSFB is set to (at) "0" through an initialization routine executed by the CPU when a position of the ignition key switch of the "unillustrated vehicle on which the engine 10 is mounted" is changed from the off position to the on position.

Subsequently, the CPU proceeds to step 1130 to set a value of a target value determination request flag XVREFreq to (at) "1", and proceeds to step 1195 to end the present routine tentatively. The target value determination request flag XVREFreq indicates that it is necessary to newly determine the target value VREF (request for renewing (updating) the target value VREF is occurring) when the value of the flag XVREFreq is "1." The target value determination request flag XVREFreq indicates that it is not necessary to newly determine the target value VREF when the value of the flag XVREFreq is "0." The value of the target value determination request flag XVREFreq is set to (at) "0" through the initialization routine described above. Thereafter, the CPU proceeds to step 1195 to end the present routine tentatively.

When the CPU proceeds to step 1110 via step 1100 in a case in which a state in which the sub feedback control condition is not satisfied has changed to a state in which the condition is satisfied, the CPU makes a "Yes" determination at step at step 1110 to proceed to step 1040. At step 1140, the CPU determines whether or not the value of the target value determination request flag XVREFreq is "1."

In this case, the value of the target value determination request flag XVREFreq has been set to (at) "1" in the initialization routine described above, or at step 1130 described above. Accordingly, the CPU makes a "Yes" determination at step 1140 to proceed to step 1050, at which the CPU determines the target value VREF according to the <determination method> described above.

Figure 12:
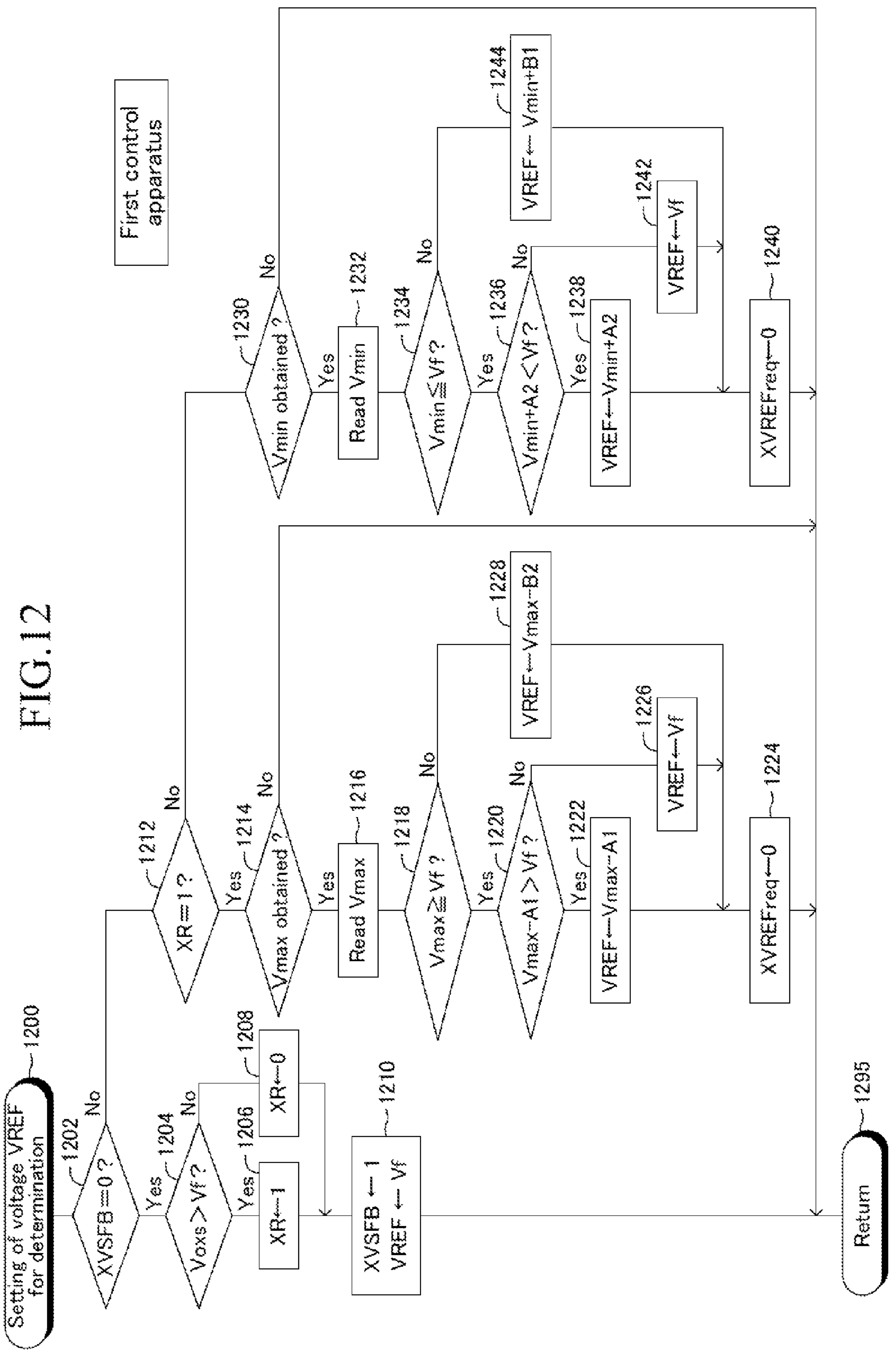
FIG. 12 is a flowchart showing a routine executed by the CPU of the first control apparatus.

More specifically, when the CPU proceeds to step 1150, the CPU proceeds to step 1202 through step 1200 shown in FIG. 12, and determines whether or not the value of the target value converging control flag XVSFB is "0."

The value of the target value converging control flag XVSFB has been set to (at) "0" in the initialization routine described above, or at step 1120 described above. Accordingly, the CPU makes a "Yes" determination at step 1202 to proceed to step 1204, at which the CPU determines whether or not the output value Voxs of the downstream-side air-fuel ratio sensor is larger than the reference value Vf.

When the output value Voxs is larger than the reference value Vf, the CPU makes a "Yes" determination at step 1204 to proceed to step 1206, at which the CPU sets a value of a rich determination flag XR to (at) "1." The rich determination flag XR indicates that it has been determined that the air-fuel ratio is "rich (rich air-fuel ratio)", and thus, the lean request is occurring, when the value of the rich determination flag XR is "1." It should be noted that the value of the rich determination flag XR is set at (to) "0" through the initialization routine described above.

In contrast, when the output value Voxs is equal to or smaller than the reference value Vf, the CPU makes a "No" determination at step 1204 to proceed to step 1208, at which the CPU sets the value of a rich determination flag XR to (at) "0." The rich determination flag XR indicates that it has been determined that the air-fuel ratio is "lean (lean air-fuel ratio)", and thus, the rich request is occurring, when the value of the rich determination flag XR is "0."

In this manner, when the sub feedback control starts to be performed (renewal of the sub feedback control amount Vafsfb is started) upon the satisfaction of the sub feedback control condition, it is tentatively determined which request is occurring, the rich request or the lean request (i.e., whether the air-fuel ratio is lean or rich), based on the comparison between the output value Voxs and the reference value Vf.

Subsequently, the CPU proceeds to step 1210, at which the CPU sets the value of the target value converging control flag XVSFB to (at) "1", and tentatively sets the reference value Vf as the target value VREF. Thereafter, the CPU proceeds, through step 1205, to step 1195 shown in FIG. 11 to end the target value determining routine tentatively.

Consequently, immediately after the start of performing the sub feedback control, the sub feedback control amount Vafsfb is calculated in such a manner that the output value Voxs becomes equal to the "target value VREF which is set at (to) the reference value Vf."

It is assumed that the sub feedback control condition continues to be satisfied. Under this assumption, when the CPU proceeds to step 1110 via step 1100 shown in FIG. 11 after the predetermined time period elapses, the CPU makes a "Yes" determination at step 1110 to proceed to step 1140. The value of the target value determination request flag XVREFreq is still "1." Accordingly, the CPU proceeds to step 1150 from step 1140, and proceeds to step 1202 through step 1200 shown in FIG. 12.

The value of the target value converging control flag XVSFB has been set at (to) "1" at previously executed step 1210 shown in FIG. 12. Accordingly, the CPU makes a "No" determination at step 1202 to proceed to step 1212. At step 1212, the CPU determines whether the value of the rich determination flag XR is "1."

The description continues assuming that the value of the rich determination flag XR is "1". Under this assumption, the CPU makes a "Yes" determination at step 1212 to proceed to step 1214, at which the CPU determines whether or not the "local maximum value Vmax of the output value Voxs" has been obtained after the value of the rich determination flag XR was changed to "1." The local maximum value Vmax is separately obtained through an unillustrated routine.

It should be noted that, as described later, the CPU is also configured so as to obtain the local minimum value Vmin of the output value Voxs. Here, methods for obtaining the local maximum value Vmax and the local minimum value Vmin is briefly described. The CPU obtains the output value Voxs of the downstream-side air-fuel ratio sensor every time a constant time period Tb elapses. Every time the CPU obtains the output value Voxs, the CPU obtains, as a "differential value dVoxs/dt", a "value (Voxs−Voxszen) obtained by subtracting the output value Voxs the constant time period Tb before (hereinafter, referred to as a "previous output value Voxszen") from the newly obtained output value Voxs." When the differential value dVoxs/dt the constant time period Tb before is equal to or larger than "0", and the newly obtained differential value dVoxs/dt is smaller than "0", the CPU obtains, as the local maximum value Vmax, the output value Voxs (Voxszen) the constant time period Tb before. Similarly, when the differential value dVoxs/dt the constant time period Tb before is equal to or smaller than "0", and the newly obtained differential value dVoxs/dt is larger than "0", the CPU obtains, as the local minimum value Vmin, the output value Voxs (Voxszen) the constant time period Tb before.

When the local maximum value Vmax has not been obtained yet since the value of the rich determination flag XR was set to (at) "1", the CPU makes a "No" determination at step 1214 to directly proceed to step 1195 via step 1295. Accordingly, until the local maximum value Vmax is obtained, the CPU repeatedly executes step 1100, step 1110, step 1140, and step 1150 (in actuality, step 1200, step 1202, step 1212, and step 1214), shown in FIG. 11.

Thereafter, when the local maximum value Vmax is obtained since the value of the rich determination flag XR was set to (at) "1", the CPU makes a "Yes" determination at step 1214 to proceed to step 1216 to read out the obtained local maximum value Vmax. Subsequently, the CPU determines (sets) the target value VREF according to the rule when the "determination on the air-fuel ratio is rich" shown in the table 1 described above.

More specifically, the CPU proceeds to step 1218, at which the CPU determines whether or not the local maximum value Vmax is equal to or larger than the reference value Vf. When the local maximum value Vmax is equal to or larger than the reference value Vf, the CPU proceeds to step 1220 to determine whether or not a value (Vmax−A1)

obtained by subtracting the "value A1 serving as the first threshold" from the local maximum value Vmax is larger than the reference value Vf. If the value (Vmax−A1) is larger than the reference value Vf, the CPU proceeds to step 1222, at which the CPU sets the target value VREF to (at) the value (Vmax−A1) obtained by subtracting the "value A1 serving as the first change value" from the local maximum value Vmax. In contrast, if the value (Vmax−A1) is equal to or smaller than the reference value Vf, the CPU proceeds to step 1226, at which the CPU sets the target value VREF to (at) the reference value Vf. In addition, when the CPU performs the process of step 1218, and if the local maximum value Vmax is smaller than the reference value Vf, the CPU proceeds to step 1228 to set the target value VREF to (at) a value (Vmax−B2) obtained by subtracting the "value B2 serving as the second change value B2" from the local maximum value Vmax.

Figure 11:
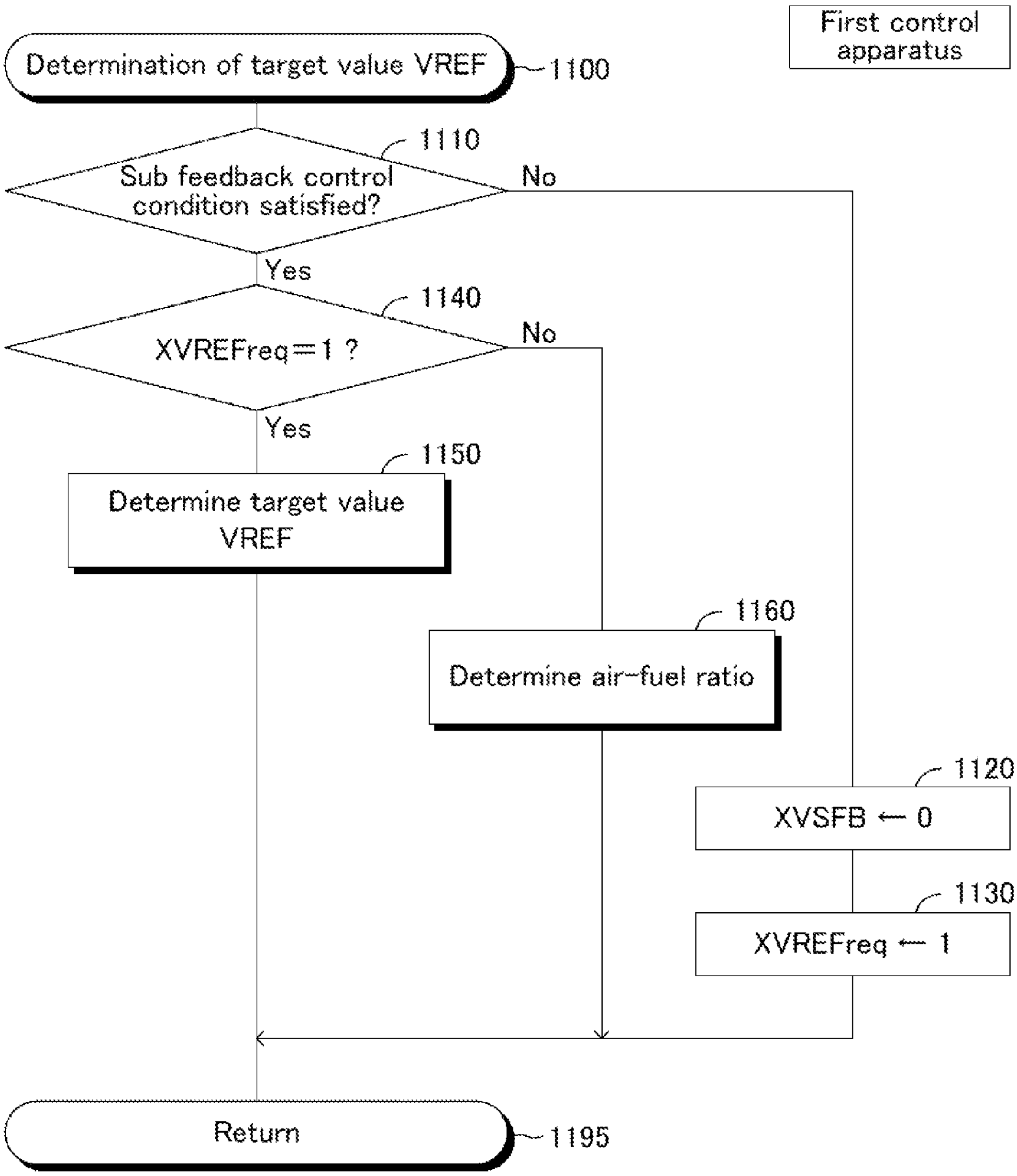
FIG. 11 is a flowchart showing a routine executed by the CPU of the first control apparatus.

After performing the process of any one of step 1222, step 1226, and step 1228, the CPU proceeds to step 1224 to set the value of the target value determination request flag XVREFreq to (at) "0." Thereafter, the CPU proceeds to step 1195 shown in FIG. 11 via step 1295 and step 1150, to end the target value determining routine tentatively.

Thereafter, when the certain time period elapses, and the CPU proceeds to step 1110 from step 1100 shown in FIG. 11, the CPU makes a "Yes" determination at step 1110 to proceed to step 1140. In this case, the value of the target value determination request flag XVREFreq has been set to "0" by the "process of step 1224 shown in FIG. 12" previously executed. Accordingly, the CPU makes a "No" determination at step 1140 to proceed to step 1160, at which the CPU makes a determination on (as to) the air-fuel ratio (and a determination on the air-fuel request).

Figure 13:
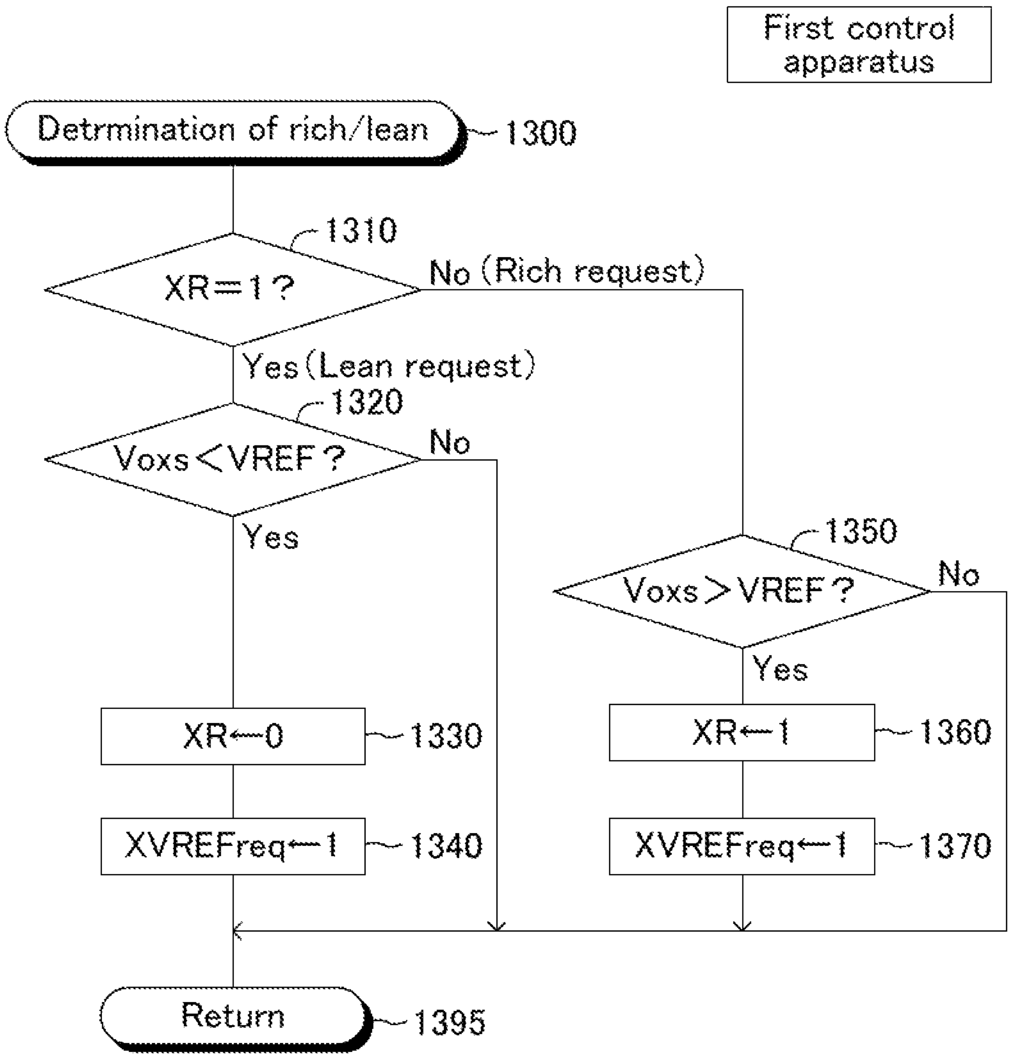
FIG. 13 is a flowchart showing a routine executed by a CPU of the first control apparatus.

More specifically, when the CPU proceeds to step 1160, it proceeds to step 1310 via step 1300 shown in FIG. 13, at which the CPU determines whether or not the value of the rich determination flag XR is "1."

According to the assumption described above, the value of the rich determination flag XR is still "1." Therefore, the CPU makes a "Yes" determination at step 1310 to proceed to step 1320, at which the CPU determines whether or not the output value Voxs of the downstream-side air-fuel ratio sensor is smaller than the target value VREF. When the output value Voxs of the downstream-side air-fuel ratio sensor is smaller than the target value VREF, the CPU makes a "Yes" determination at step 1320 (that is, the CPU determines that the air-fuel ratio is "lean") to perform processes of step 1330 and step 1340 described below in order.

Step 1330: The CPU sets the value of the rich determination flag XR to (at) "0."

Step 1340: The CPU sets the value of the target value determination request flag XVREFreq to (at) "1."

Thereafter, the CPU proceeds to step 1195 shown in FIG. 11 via step 1395 and step 1160, to end the target value determining routine tentatively.

To the contrary, when the CPU performs the process of step 1320, and if the output value Voxs of the downstream-side air-fuel ratio sensor is equal to or larger than the target value VREF, the CPU makes a "No" determination at step 1320 to directly proceed to step 1395. Thereafter, the CPU proceeds to step 1195 via step 1160 shown in FIG. 11, so as to end the target value determining routine tentatively. In this manner, in a case in which the value of the rich determination flag XR is "1", the value of the rich determination flag XR is set to (at) "0" only when the output value Voxs becomes smaller than the target value VREF.

When the CPU again proceeds to step 1140 shown in FIG. 11 after the value of the rich determination flag XR is set to (at) "0" at step 1330 shown in FIG. 13, and the value of the target value determination request flag XVREFreq is set to (at) "1" at step 1340, the CPU makes a "Yes" determination at step 1140 to proceed to step 1150. Accordingly, the CPU proceeds step 1202 shown in FIG. 12 via step 1200 to determine the value of the target value converging control flag XVSFB is "0." In this case, the value of the target value converging control flag XVSFB is "1" (refer to step 1340).

Accordingly, the CPU proceeds to step 1212 from step 1202. In this case, the value of the rich determination flag XR has been set to (at) "0" by the process of step 1330 shown in FIG. 13 previously executed. The CPU therefore makes a "No" determination at step 1212 to proceed to step 1230, at which the CPU determines whether or not the "local minimum value Vmin of the output value Voxs" has been obtained since the value of the rich determination flag XR was set to (at) "0." The local minimum value Vmin is separately obtained through the unillustrated routine, as described above.

When the local minimum value Vmin has not been obtained yet, the CPU makes a "No" determination at step 1230 to directly proceed to step 1195 via step 1295. Accordingly, until the local minimum value Vmin is obtained, the CPU repeatedly executes step 1100, step 1110, step 1140, and step 1150 (in actuality, step 1200, step 1202, step 1212, and step 1230), shown in FIG. 11.

Thereafter, when the local minimum value Vmin is obtained since the value of the rich determination flag XR was set to (at) "0", the CPU makes a "Yes" determination at step 1230 to proceed to step 1232 to read out the obtained local minimum value Vmin. Subsequently, the CPU determines (sets) the target value VREF according to the rule when the "determination on the air-fuel ratio is lean" shown in the table 1 described above.

More specifically, the CPU proceeds to step 1234, at which the CPU determines whether or not the local minimum value Vmin is equal to or smaller than the reference value Vf. When the local minimum value Vmin is equal to or smaller than the reference value Vf, the CPU proceeds to step 1236 to determine whether or not a value (Vmin+A2) obtained by adding the "value A2 serving as the first threshold" to the local minimum value Vmin is smaller than the reference value Vf. If the value (Vmin+A2) is smaller than the reference value Vf, the CPU proceeds to step 1238, at which the CPU sets the target value VREF to (at) the value (Vmin+A2) obtained by adding the "value A2 serving as the first change value" to the local minimum value Vmin. In contrast, if the value (Vmin+A2) is equal to or larger than the reference value Vf, the CPU proceeds to step 1242, at which the CPU sets the target value VREF to (at) the reference value Vf. In addition, when the CPU performs the process of step 1234, and if the local minimum value Vmin is larger than the reference value Vf, the CPU proceeds to step 1244 to set the target value VREF to (at) a value (Vmin+B1) obtained by adding the "value B1 serving as the second change value" to the local minimum value Vmin.

After performing the process of any one of step 1238, step 1242, and step 1244, the CPU proceeds to step 1240 to set the value of the target value determination request flag XVREFreq to (at) "0." Thereafter, the CPU proceeds to step 1195 shown in FIG. 11 via step 1295 and step 1150, to end the target value determining routine tentatively.

Thereafter, when the certain time period elapses, and the CPU proceeds to step 1110 from step 1100 shown in FIG. 11, the CPU makes a "Yes" determination at step 1110 to proceed to step 1140. In this case, the value of the target value determination request flag XVREFreq has been set to "0" by the "process of step 1240 shown in FIG. 12" previously executed. Accordingly, the CPU makes a "No" determination at step 1140 to proceed to step 1160, at which the CPU makes a determination on (as to) the air-fuel ratio.

More specifically, when the CPU proceeds to step 1160, it proceeds to step 1310 via step 1300 shown in FIG. 13, at which the CPU determines whether or not the value of the rich determination flag XR is "1."

In this case, the value of the rich determination flag XR is "0." Therefore, the CPU makes a "No" determination at step 1310 to proceed to step 1350, at which the CPU determines whether or not the output value Voxs of the downstream-side air-fuel ratio sensor is larger than the target value VREF. When the output value Voxs of the downstream-side air-fuel ratio sensor is larger than the target value VREF, the CPU makes a "Yes" determination at step 1350 (that is, the CPU determines that the air-fuel ratio is "rich") to perform processes of step 1360 and step 1370 described below in order.

Step 1360: The CPU sets the value of the rich determination flag XR to (at) "1."

Step 1340: The CPU sets the value of the target value determination request flag XVREFreq to (at) "1."

Thereafter, the CPU proceeds to step 1195 shown in FIG. 11 via step 1395 and step 1160, to end the target value determining routine tentatively.

To the contrary, when the CPU performs the process of step 1350, and if the output value Voxs of the downstream-side air-fuel ratio sensor is equal to or smaller than the target value VREF, the CPU makes a "No" determination at step 1350 to directly proceed to step 1395. Thereafter, the CPU proceeds to step 1195 via step 1160 shown in FIG. 11, so as to end the target value determining routine tentatively. In this manner, in a case in which the value of the rich determination flag XR is "0", the value of the rich determination flag XR is set to (at) "1" only when the output value Voxs becomes larger than the target value VREF.

When CPU again proceeds to step 1140 shown in FIG. 11 after the value of the rich determination flag XR is set to (at) "1" at step 1360 shown in FIG. 13, and the value of the target value determination request flag XVREFreq is set to (at) "1" at step 1370, the CPU makes a "Yes" determination at step 1140 to proceed to step 1150. Accordingly, the CPU proceeds step 1202, step 1212, and step 1214 shown in FIG. 12 via step 1200. After that, the similar processes are repeatedly carried out.

It should be noted that, when the value of the rich determination flag XR is set to (at) "0" (refer to step 1208 shown in FIG. 12) after the value of the target value converging control flag XVSFB is changed from "0" to "1" (refer to step 1140 shown in FIG. 11) upon the satisfaction of the sub feedback control condition, the CPU monitors "whether the local minimum value Vmin has been obtained since the value of the target value converging control flag XVSFB was changed from "0" to "1" at step 1230.

As described above, the first control apparatus carries out the target value converging control to have the target value VREF gradually approach (come closer to) the reference value Vf.

More specifically, the first control apparatus comprises an air-fuel ratio control section (determining means) which determine whether the lean request is occurring or the rich request is occurring, based on the output value Voxs of the downstream-side air-fuel ratio sensor and the target value VREF (refer to FIG. 13, and the rich determination flag XR). The lean request is a request which increases the air-fuel ratio of the engine so as to have the output value Voxs come closer to the target value VREF. The rich request is a request which decreases the air-fuel ratio of the engine so as to have the output value Voxs come closer to the target value VREF.

It should be noted that, in the first control apparatus, the lean request and the rich request are used to determine the target value VREF, however, they are not directly used for the actual air-fuel ratio control of the engine. The air-fuel ratio of the engine is controlled by the sub feedback control amount Vafsfb which is calculated in such a manner that the output value Voxs becomes equal to the target value VREF.

As shown in FIG. 10, the sub feedback control amount Vafsfb is changed/controlled in such a manner that the sub feedback control amount Vafsfb increases the air-fuel ratio of the engine (the instructed fuel injection amount is decreased) in the period in which the lean request is occurring (i.e., in the period in which the output value Voxs is larger than the target value VREF).

As shown in FIG. 10, the sub feedback control amount Vafsfb is changed/controlled in such a manner that the sub feedback control amount Vafsfb decreases the air-fuel ratio of the engine (the instructed fuel injection amount is increased) in the period in which the rich request is occurring (i.e., in the period in which the output value Voxs is smaller than the target value VREF).

That is, the first control apparatus comprises the air-fuel ratio control section, which increases the air-fuel ratio of the engine in the period in which (while) the lean request is occurring, and which decreases the air-fuel ratio of the engine in the period in which (while) the rich request is occurring (refer to the routine shown in FIG. 10, and so on).

In addition, the first control apparatus comprises an extreme value obtaining section which obtains the local maximum value Vmax and the local minimum value Vmin (refer to step 1214, step 1216, step 1230, and step 1232, shown in FIG. 12).

The local maximum value Vmax equal to or larger than the reference value Vf and the local minimum value Vmin equal to or smaller than the reference value Vf can be said to be "output values Voxs, which is obtained when a state in which the output value Voxs of the downstream-side air-fuel ratio sensor is deviating more greatly from the reference value Vf changes to a state in which the output value Voxs is approaching (coming closer to) the reference value Vf. Those extreme values (the local maximum value Vmax equal to or larger than the reference value Vf and the local minimum value Vmin equal to or smaller than the reference value Vf) can be referred to as a "first extreme value", for convenience.

The local maximum value Vmax smaller than the reference value Vf and the local minimum value Vmin larger than the reference value Vf can be said to be "output values Voxs, which is obtained when a state in which the output value Voxs of the downstream-side air-fuel ratio sensor is approaching (coming closer to) the reference value Vf changes to a state in which the output value Voxs is deviating more greatly from the reference value Vf. Those extreme values (the local maximum value Vmax smaller than the reference value Vf and the local minimum value Vmin larger than the reference value Vf) can be referred to as a "second extreme value", for convenience.

Accordingly, the first control apparatus comprises the extreme value obtaining section which obtains the first extreme value and the second extreme value.

Further, when the first extreme value (the local maximum value Vmax equal to or larger than the reference value Vf, or the local minimum value Vmin equal to or smaller than the reference value Vf) is obtained by the extreme value obtaining section, the air-fuel ratio control section of the first control apparatus sets, as the target value VREF, a first value (Vmax−A1, or Vmin+A2) which is between the obtained first extreme value and the reference value Vf (refer to the table 1, (A) of FIG. 4, (C) of FIG. 4, (A) of FIG. 5, (C) of FIG. 5, step 1222 in FIG. 12, step 1238 in FIG. 12, etc.).

After that (after the first value (Vmax−A1) is set as the target value VREF), the air-fuel ratio control section of the first control apparatus determines that the rich request has occurred at the point in time at which the output value Voxs becomes smaller than the "target value which has been set to (at) the first value (Vmax−A1)" in the case in which the lean request is occurring (refer to steps from step 1310 to step 1330 shown in FIG. 13). This point in time is a point in time at which the absolute value of the difference between the output value Voxs and the reference value Vf becomes smaller than the absolute value of the difference between the "target value VREF which was set to (at) the first value (Vmax−A1)" and the reference value Vf. This point in time is also referred to as a "first point in time", for convenience.

Similarly, the air-fuel ratio control section of the first control apparatus determines that the lean request has occurred at the point in time at which the output value Voxs becomes larger than the "target value which has been set to (at) the first value (Vmin+A2)" in the case in which the rich request is occurring (refer to step 1310, and steps from step 1350 to step 1360 shown in FIG. 13). This point in time is a point in time at which the absolute value of the difference between the output value Voxs and the reference value Vf becomes smaller than the absolute value of the difference between the "target value VREF which was set to (at) the first value (Vmin+A2)" and the reference value Vf (and therefore, is the first point in time).

In this manner, the air-fuel ratio control section of the first control apparatus determines that, when the "absolute value of the difference between the output value Voxs and the reference value Vf" becomes smaller than the "absolute value of the difference between the target value VREF which was set to (at) the first value and the reference value Vf, i.e. at the first point in time, a request which is different from (other than) one of the rich request and the lean request that has been determined to be occurring till (up to) the first point in time.

After that (after the "other (different) request" is determined to have occurred), the air-fuel ratio control section of the first control apparatus sets, as the target value VREF, the second value (Vmin+B1, or Vmax−B2), when the second extreme value (the local minimum value Vmin larger than the reference value Vf, and the local maximum value Vmax smaller than the reference value Vf) is obtained, the second value being a value between the "obtained second extreme value" and the "first extreme value obtained by the extreme value obtaining section (the local maximum value Vmax larger than the reference value Vf, or the local minimum value Vmin smaller than the reference value Vf) (refer to the table 1, (C) of FIG. 4, (C) of FIG. 5, step 1228 shown in FIG. 12, and step 1244 shown in FIG. 12, etc.). In other words, the air-fuel ratio control section of the first control apparatus sets the values B1 and B2 in such a manner that the second value is between the latest first extreme value and the latest second extreme value.

After that (after the reference value VREF is set to (at) the second value), the air-fuel ratio control section of the first control apparatus determines that the lean request has occurred at the point in time at which the output value Voxs becomes larger than the "target value which has been set to (at) the second value (Vmin+B1)" in the case in which the rich request is occurring (refer to step 1310, steps from step 1350 to step 1360 shown in FIG. 13). This point in time is a point in time at which the absolute value of the difference between the output value Voxs and the reference value Vf becomes larger than the absolute value of the difference between the "target value VREF which was set to (at) the second value (Vmin+B1)" and the reference value Vf. This point in time is also referred to as a "second point in time", for convenience.

Similarly, the air-fuel ratio control section of the first control apparatus determines that the rich request has occurred at the point in time at which the output value Voxs becomes smaller than the "target value which has been set to (at) the second value (Vmax−B2)" in the case in which the lean request is occurring (refer to steps from step 1310 to step 1330 shown in FIG. 13). This point in time is a point in time at which the absolute value of the difference between the output value Voxs and the reference value Vf becomes larger than the absolute value of the difference between the "target value VREF which was set to (at) the second value (Vmax−B2)" and the reference value Vf (and therefore, is the second point in time).

In this manner, the air-fuel ratio control section of the first control apparatus determines that, when the "absolute value of the difference between the output value Voxs and the reference value Vf" becomes larger than the "absolute value of the difference between the target value VREF which was set to (at) the second value and the reference value Vf", i.e. at the second point in time, a request which is different from (other than) one of the rich request and the lean request that has been determined to be occurring till (up to) the second point in time.

The first control apparatus repeats setting the target value VREF and determining the air-fuel ratio (determining which request is occurring, the rich request and the lean request) as described above, and thus, makes the target value VREF approach (come closer to) the reference value Vf. That is, the first control apparatus includes a target value changing section configured so as to have the target value VREF (target value used in the sub feedback control) gradually come closer to the reference value Vf from a certain initial value with time, when the local maximum value Vmax of the output value Voxs of the downstream-side air-fuel ratio sensor is larger than the "value obtained by adding the first threshold (A1) to the reference value Vfr, or when the local minimum value Vmin of the output value Voxs of the downstream-side air-fuel ratio sensor is smaller than the "value obtained by subtracting the first threshold (A2) from the reference value Vf." That is, the target value changing section performs the target value converging control.

In this case, one of the certain initial values (initial values of the target value converging control) is the value (Vmax−A1=Vmax(1)−A1). This value (Vmax−A1=Vmax(1)−A1) is a value belonging to a range which is one of ranges of "a range at larger side with respect to (larger than) the reference value and a range at smaller side with respect to (smaller than) the reference value" and in which the output value Voxs (current output value Voxs) of the downstream-side air-fuel ratio sensor is present (found/belongs to) (in the present example, the range larger than the reference value Vf). Further, the other of the certain initial values (initial values of the target value converging control) is the value (Vmin+A2=Vmin(1)+A2). This value (Vmin+A2=Vmin (1)+A2) is a value belonging to a range which is one of ranges of "the range at larger side with respect to (larger than) the reference value and the range at smaller side with respect to (smaller than) the reference value" and in which the output value Voxs (current output value Voxs) of the downstream-side air-fuel ratio sensor is present (found/belongs to) (in the present example, the range smaller than the reference value Vf).

Accordingly, the first control apparatus can change (switches over) the air-fuel ratio of the engine much earlier (in other words, with shorter period) from "the lean air-fuel ratio to the rich air-fuel ratio, or vice versa", compared to the conventional apparatus which uses a fixed reference value as the target value VREF. Consequently, the first control apparatus can have the output value Voxs come closer to the reference value Vf, while avoiding a state in which the magnitude of fluctuation of the output value Voxs becomes large, and thus, can maintain the emission at a low level.

It should be noted that the second change value (the value B1 and the value B2) is preferably set to a value which is smaller than the first change value (the value A1 and the value A2) by a "(sufficiently large) positive predetermined value" or more. According to this configuration, the first control apparatus can set the value serving as the second value (e.g., Vmin+B1) to a value between the obtained second extreme value (Vmin) and the first value (Vmax−A1). Similarly, the first control apparatus can set the value serving as the second value (e.g., Vmax−B2) to a value between the obtained second extreme value (Vmax) and the first value (Vmin+A2). Consequently, the first control apparatus can have the target value VREF converge on the reference value Vf.

Further, when the first extreme value is the local maximum value Vmax(1), it is preferable that the first control apparatus set the value A1 and the value B1 in such a manner that the first extreme value (i.e., the local maximum value Vmax(2)) obtained after the "second extreme value obtaining point in time at which the local minimum value Vmin(1) serving as the second extreme value" becomes smaller than the local maximum value Vmax(1) which was obtained before the second extreme value obtaining point in time (refer to FIG. 6).

Further, when the first extreme value is the local minimum value Vmin(1), it is preferable that the first control apparatus set the value A2 and the value B2 in such a manner that the first extreme value (i.e., the local minimum value Vmin(2)) obtained after the "second extreme value obtaining point in time at which the local maximum value Vmax(1) serving as the second extreme value" becomes smaller than the local minimum value Vmin(1) which was obtained before the second extreme value obtaining point in time (refer to FIG. 7).

That is, it can be said that it is preferable that the air-fuel control section of the first control apparatus be configured so as to set the first value (Vmax(1)−A1) and the second value (Vmin(1)+B1) in such a manner that the absolute value |Vmax(2)−Vf| of the difference between "the first extreme value (e.g., local maximum value Vmax(2)) obtained by the extreme value obtaining section after the second extreme value obtaining point in time (e.g., time t3 shown in FIG. 6)" and the reference value Vf becomes smaller than the absolute value |Vmax(1)−Vf| of the difference between "the first extreme value (local maximum value Vmax(1)) which was obtained by the extreme value obtaining section before the second extreme value obtaining point in time (time t3 shown in FIG. 6)" and the reference value Vf.

Alternatively, it can be said that it is preferable that the air-fuel control section of the first control apparatus be configured so as to set the first value (Vmin(1)+A2) and the second value (Vmax(1)−B2) in such a manner that the absolute value |Vmin(2)−Vf| of the difference between "the first extreme value (e.g., local minimum value Vmin(2)) obtained by the extreme value obtaining section after the second extreme value obtaining point in time (e.g., time t3 shown in FIG. 7)" and the reference value Vf becomes smaller than the absolute value |Vmin(1)−Vf| of the difference between "the first extreme value (local minimum value Vmin(1)) which was obtained by the extreme value obtaining section before the second extreme value obtaining point in time (time t3 shown in FIG. 7)" and the reference value Vf.

According to this configuration, the target value VREF can be surely converged on the reference value Vf.

Further, the air-fuel ratio control section of the first control apparatus is configured, in the case in which the first extreme value is obtained by the extreme value obtaining section, so as to:

(1) set the first value as the target value VREF (step 1222 or step 1238 shown in FIG. 12) when the absolute value of the difference between the obtained first extreme value and the reference value is larger than the positive first threshold (the value A1 or the value A2) (refer to the "Yes" determination at step 1220 or the "Yes" determination at step 1236 shown in FIG. 12); and (2) set the reference value as the target value VREF (step 1226 or step 1242 shown in FIG. 12) when the absolute value of the difference between the obtained first extreme value and the reference value is equal to or smaller than the first threshold (refer to the "No" determination at step 1220 or the "No" determination at step 1236 shown in FIG. 12). It should be noted that, in this case, a determining section of the first control apparatus is configured so as to determine that, at the third point in time at which the output value Voxs passes through (crosses) the "target value set to (at) the reference value Vf", a request has occurred, the request being different from (other than) one of the rich request and the lean request that has been determined to be occurring till (up to) the third point in time (refer to the routine shown in FIG. 13, period after time t8 shown in FIG. 6, and period after time t8 shown in FIG. 7, etc.).

Further, as shown in (C) of FIG. 5 and FIG. 6, the air-fuel ratio control section of the first control apparatus is configured so as to set, as the first value, the value (Vmax(1)−A1) which is closer to the reference value by the positive first change value (A1) compared to the first extreme value (e.g., local maximum value Vmax(1)), and so as to set, as the second value, the value (Vmin(1)+B1) which is more away from the reference value by a positive second change value (A2) compared to said second extreme value (local minimum value Vmin(1)). In this case, the first change value (A1) is equal to or smaller than the first threshold (A1), and the second change value (B1) is preferably smaller than the first change value (A1).

Similarly, as shown in (C) of FIG. 4 and FIG. 7, the air-fuel ratio control section of the first control apparatus is configured so as to set, as the first value, the value (Vmin(1)+A2) which is closer to the reference value by the positive first change value (A2) compared to the first extreme value (e.g., local minimum value Vmin(1)), and so as to set, as the second value, the value (Vmax(1)−B2) which is more away from the reference value by the positive second change value (B2) compared to the second extreme value (local maximum value Vmax(1)). In this case, the first change value (A2) is equal to or smaller than the first threshold (A2), and the second change value (B2) is preferably smaller than the first change value (A2).

Second Embodiment

A control apparatus (hereinafter, simply referred to as a "second control apparatus") according to a second embodiment of the present invention will next be described. The second control apparatus is different from the first control apparatus only in that the second control apparatus makes the first change value (value A1 and value A2) and the second change value (value B1 and value B2) smaller as a temperature (element temperature) of the downstream-side air-fuel ratio sensor 56 becomes lower.

More specifically, as shown by a solid line C1 and a broken line C2 in FIG. 3, the maximum value and the minimum value of the output value Voxs of the downstream-side air-fuel ratio sensor come closer to the maximum output value Max and the minimum output value Min, respectively, as the temperature of the downstream-side air-fuel ratio sensor 56 becomes lower. In other words, the output value Voxs of the downstream-side air-fuel ratio sensor changes more drastically as the temperature Trear of the downstream-side air-fuel ratio sensor 56 becomes lower.

Figure 14:
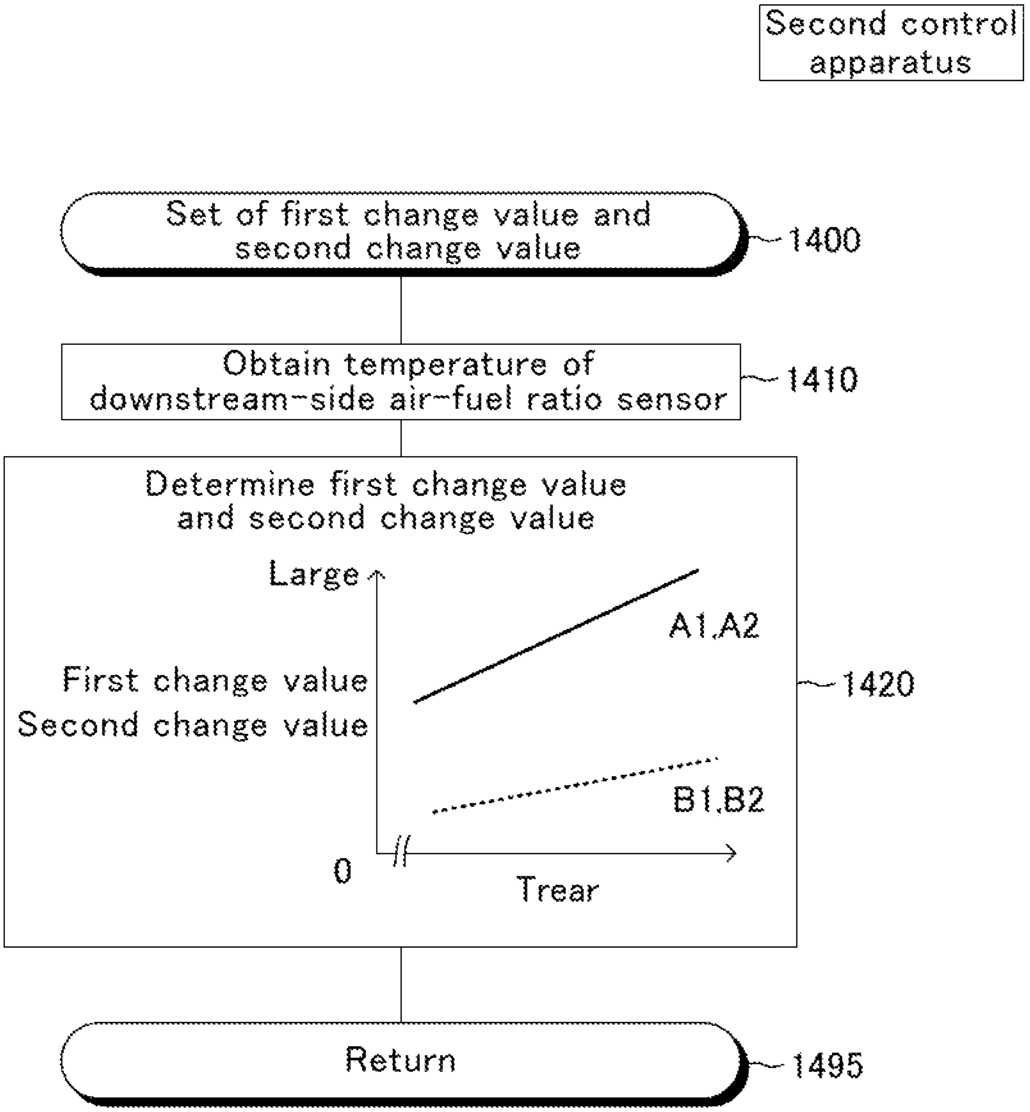
FIG. 14 is a flowchart showing a routine executed by a CPU of an air-fuel ratio control apparatus (second control apparatus) according to a second embodiment of the present invention.

In view of the above, a CPU of the second control apparatus executes a routine shown in FIG. 14 every time a predetermined time period elapses, in addition to the routines shown in FIGS. 8-13. Accordingly, at an appropriate point in time, the CPU starts processes from step 1400 shown in FIG. 14 to proceed to step 1410, at which CPU obtains the temperature Trear of the downstream-side air-fuel ratio sensor 56. More specifically, the CPU obtains an impedance (or an admittance) of the downstream-side air-fuel ratio sensor 56, and obtains the temperature Trear based on the impedance. It should be noted that the CPU may obtain the temperature Trear by estimating a temperature of the exhaust gas based on the load KL and the engine rotational speed NE, and by performing a first-order lag filtering on the estimated temperature of the exhaust gas.

Subsequently, the CPU proceeds to step 1420, at which the CPU determines the first change value (value A1 and value A2) and the second change value (value B1 and value B2) by applying the obtained temperature Trear to a table MapAB(Trear) shown in a block of step 1420. According to the table MapAB(Trear), the first change value and the second change value are determined in such a manner that they become smaller as the temperature Trear becomes lower. In the present example, the value A1 and the value A2 are equal to each other, however, they may be different from each other. Further, in the present example, the value B1 and the value B2 are equal to each other, however, they may be different from each other. Thereafter, the CPU proceeds to step 1495 to end the present routine tentatively. The CPU determines the target value VREF using the thus determined "first change value and second change value" (refer to the routine shown in FIG. 12).

As described above, the output value Voxs of the downstream-side air-fuel ratio sensor 56 changes more drastically (i.e., a change amount in the output value Voxs when the air-fuel ratio of the catalyst outflow gas passes through the stoichiometric air-fuel ratio becomes larger) as the temperature Trear of the downstream-side air-fuel ratio sensor 56 becomes lower. Accordingly, the second control apparatus makes the first change value and the second change value smaller as the temperature Trear becomes lower. This makes it possible to determine that the rich request has occurred before the output value Voxs becomes excessively small, and to determine that the lean request has occurred before the output value Voxs becomes excessively large. Consequently, the second control apparatus can maintain the output value Voxs in the vicinity of the "target value VREF which comes closer to the reference value Vf with time", while maintaining the magnitude of fluctuation of the output value Voxs at a small level. Accordingly, the second control apparatus can maintain the emission at a low level regardless of the temperature Trear.

It should be noted that the second control apparatus may change the value A1 and the value A2 based on the temperature Trear, but maintain the value B1 and the value B2 at a constant value. Further, the second control apparatus may set at least one of values A1, A2, B1, and B2 to (at) a value which becomes smaller as the temperature Trear becomes lower. Furthermore, the second control apparatus may change the values serving as the first threshold (A1, A2) in response to the temperature Trear similarly to the first change value, or may keep the first threshold at a constant value.

Third Embodiment

A control apparatus (hereinafter, simply referred to as a "third control apparatus") according to a third embodiment of the present invention will next be described. The third control apparatus is different from the first control apparatus only in that the third control apparatus makes the first change value (value A1 and value A2) and the second change value (value B1 and value B2) smaller as an amount of the exhaust gas passing through the catalyst 43 (i.e., intake air amount Ga) becomes smaller.

More specifically, a "change amount per unit time in the output value Voxs" when the air-fuel ratio of the catalyst outflow gas passes through the stoichiometric air-fuel ratio becomes larger when the amount of the exhaust gas passing through the catalyst is small than when the amount of the exhaust gas passing through the catalyst is large. It is inferred that the reason for this is that oxygen is hard to flow out to the downstream of the catalyst 43 until the oxygen storage amount OSA reaches the maximum oxygen storage amount Cmax, and oxygen drastically flows out to the downstream of the catalyst 43 when the oxygen storage amount OSA reaches the maximum oxygen storage amount Cmax, when the amount of the exhaust gas is small, as compared to when the amount of the exhaust gas is large. Similarly, it is inferred that the unburnt substances are hard to flow out to the downstream of the catalyst 43 until the oxygen storage amount OSA reaches a value in the vicinity of "0", and the unburnt substances drastically flow out to the downstream of the catalyst 43 when the oxygen storage amount OSA reaches the value in the vicinity of "O", when the amount of the exhaust gas is small, as compared to when the amount of the exhaust gas is large.

Figure 15:
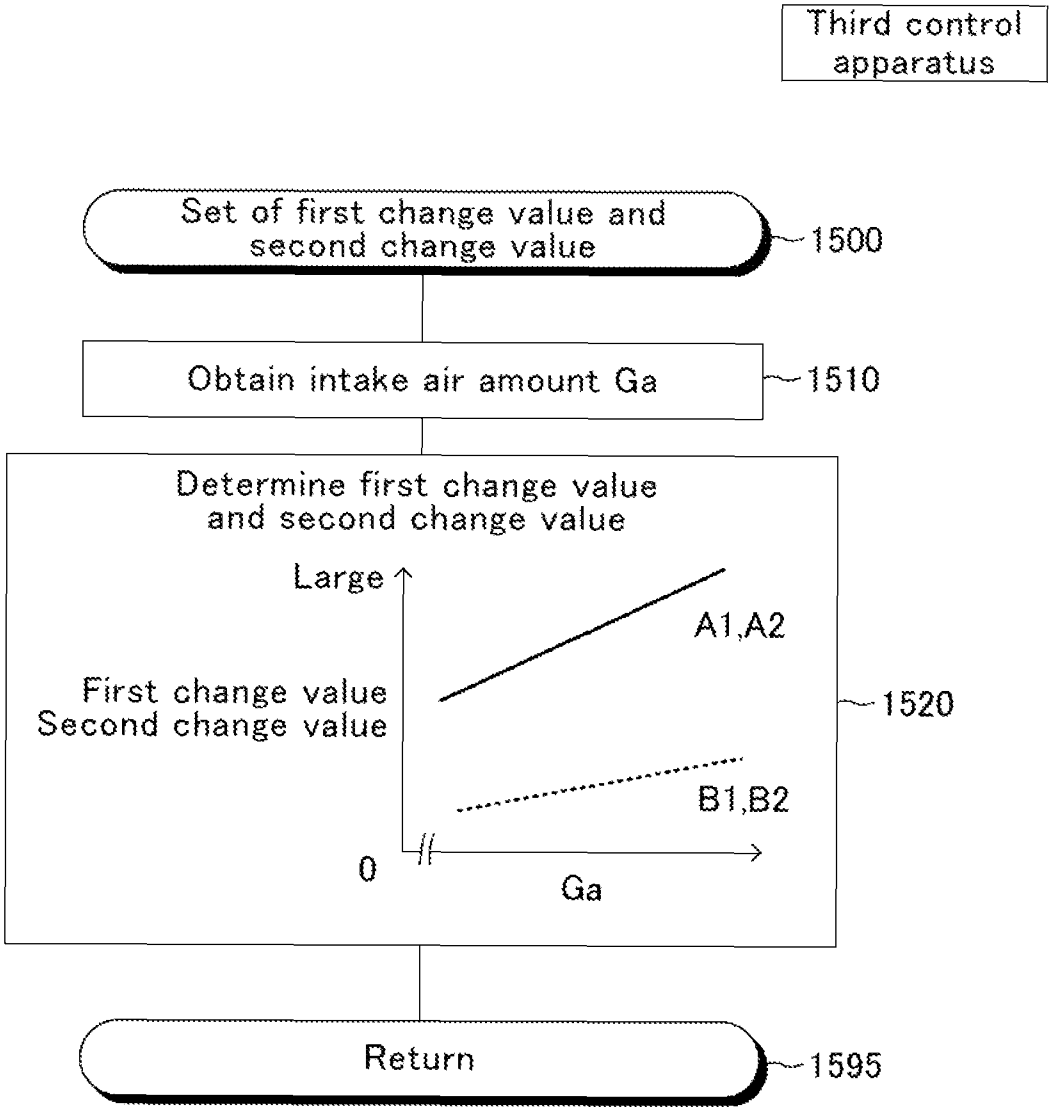
FIG. 15 is a flowchart showing a routine executed by a CPU of an air-fuel ratio control apparatus (third control apparatus) according to a third embodiment of the present invention.

In view of the above, a CPU of the third control apparatus executes a routine shown in FIG. 15 every time a predetermined time period elapses, in addition to the routines shown in FIGS. 8-13. Accordingly, at an appropriate point in time, the CPU starts processes from step 1500 shown in FIG. 15 to proceed to step 1510, at which CPU obtains the intake air amount (the amount of the intake air) Ga. The intake air amount Ga represents an amount of the exhaust gas passing through the catalyst 43.

Subsequently, the CPU proceeds to step 1520, at which the CPU determines the first change value (value A1 and value A2) and the second change value (value B1 and value B2) by applying the obtained intake air amount Ga to a table MapAB(Ga) shown in a block of step 1520. According to the table MapAB(Ga), the first change value and the second change value are determined in such a manner that they become smaller as the intake air amount Ga becomes smaller. In the present example, the value A1 and the value A2 are equal to each other, however, they may be different from each other. Further, in the present example, the value B 1 and the value B2 are equal to each other, however, they may be different from each other. Thereafter, the CPU proceeds to step 1595 to end the present routine tentatively. The CPU determines the target value VREF using the thus determined "first change value and second change value" (refer to the routine shown in FIG. 12).

According to this configuration, the first change value and the second change value become smaller, when the output value Voxs of the downstream-side air-fuel ratio sensor drastically changes due to a small flow rate of the exhaust gas. Therefore, this makes it possible to determine that the rich request has occurred before the output value Voxs becomes excessively small, and to determine that the lean request has occurred before the output value Voxs becomes excessively large. Consequently, the third control apparatus can maintain the output value Voxs in the vicinity of the "target value VREF which comes closer to the reference value Vf with time", while maintaining the magnitude of fluctuation of the output value Voxs at a small level. Accordingly, the third control apparatus can maintain the emission at a low level regardless of the flow rate of the exhaust gas.

It should be noted that the third control apparatus may change the value A1 and the value A2 based on the intake air amount Ga, but maintain the value B1 and the value B2 at a constant value. Further, the third control apparatus may set at least one of values A1, A2, B1, and B2 to (at) a value which becomes smaller as the intake air amount Ga becomes smaller. Furthermore, the third control apparatus may change the values serving as the first threshold (A1, A2) in response to the intake air amount Ga similarly to the first change value, or may keep the first threshold at a constant value.

Fourth Embodiment

A control apparatus (hereinafter, simply referred to as a "fourth control apparatus") according to a fourth embodiment of the present invention will next be described. The fourth control apparatus is different from the first control apparatus only in that the fourth control apparatus makes the first change value (value A1 and value A2) smaller as the first extreme value (the local maximum value Vmax larger than the reference value Vf, and the local minimum value Vmin smaller than the reference value Vf) becomes larger.

Figure 16:
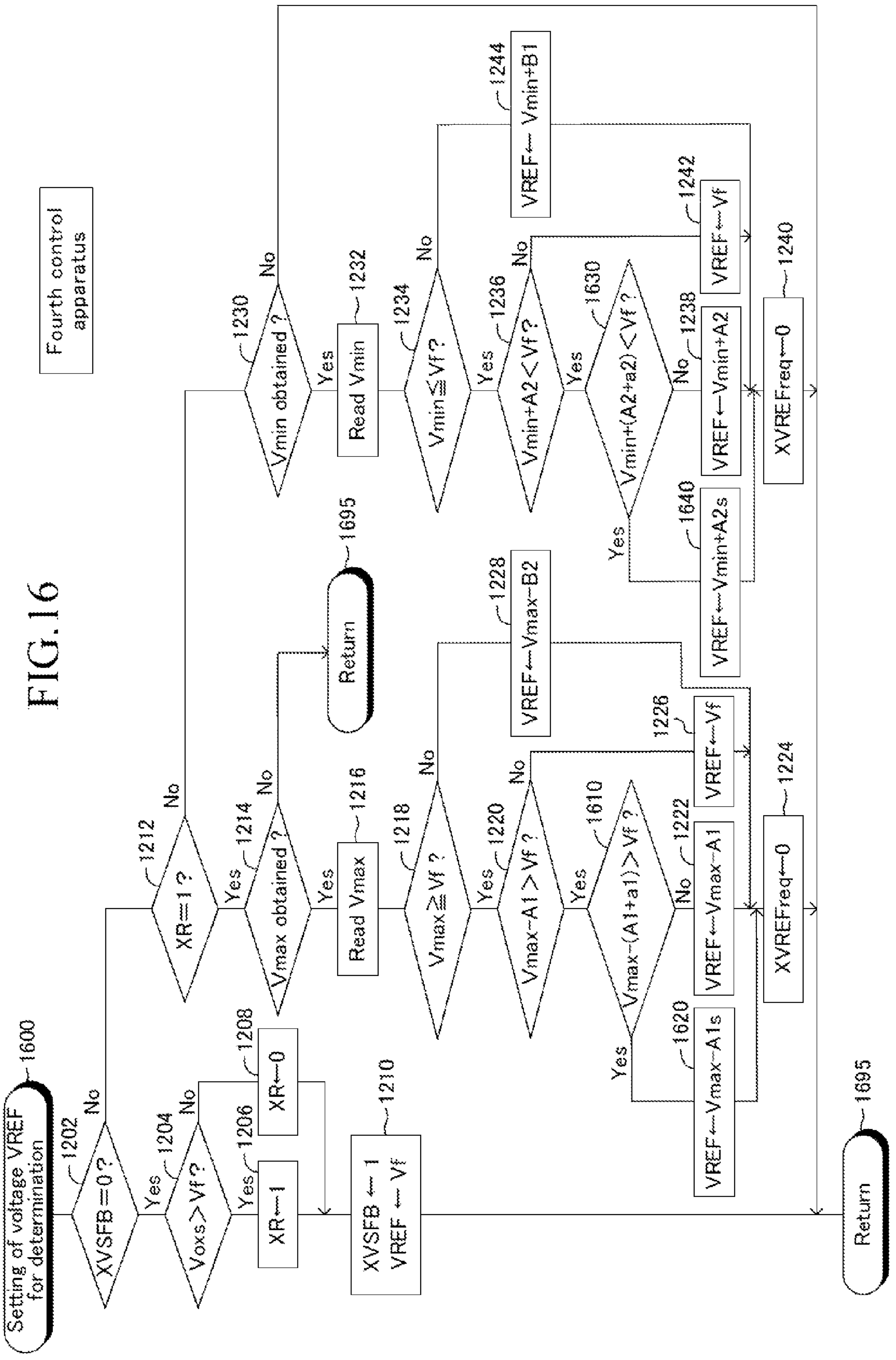
FIG. 16 is a flowchart showing a routine executed by a CPU of an air-fuel ratio control apparatus (fourth control apparatus) according to a fourth embodiment of the present invention.

A CPU of the fourth control apparatus executes a routine shown in FIG. 16 in place of the routine shown in FIG. 12, in addition to the routines shown in FIGS. 8-11, and 13. Accordingly, when the CPU proceeds to step 1150 shown in FIG. 11, it proceeds to step 1600 shown in FIG. 16. Further, when the CPU proceeds to step 1695 shown in FIG. 16, it proceeds to step 1195 via step 1150 shown in FIG. 11.

The routine shown in FIG. 16 is different from the routine shown in FIG. 12 only in that "steps from step 1610 to step 1640" are added to the routine shown in FIG. 12. Accordingly, those different points will mainly be described.

When the CPU makes a "Yes" determination at step 1220, the CPU proceeds to step 1610, at which the CPU determines whether or not a value (Vmax−(A1+a1)) obtained by subtracting a value (A1+a1) from the local maximum value Vmax is larger than the reference value Vf. The value a1 is a positive predetermined value, and the value (A1+a1) is smaller than an absolute value of the difference between the maximum output value Max and the reference value Vf.

When the value (Vmax−(A1+a1)) is larger than the reference value Vf, the CPU proceeds to step 1620 from step 1610 to set the target value VREF to (at) the value (Vmax−A1s). The value A1s is a positive predetermined value smaller than the value A1. Thereafter, the CPU proceeds to step 1224. In contrast, when the value (Vmax−(A1+a1)) is equal to or smaller than the reference value Vf, the CPU proceeds to step 1222 from step 1610 to set the target value VREF to (at) the value (Vmax−A1). Thereafter, the CPU proceeds to step 1224.

That is, the CPU sets the target value VREF at (to) the value (Vmax−A1s) when an absolute value of a difference between the local maximum value Vmax and the reference value Vf is larger than the value (A1+a1), and sets the target value VREF at (to) the value (Vmax−A1) when the absolute value of the difference between the local maximum value Vmax and the reference value Vf is larger than the value A1 and smaller than or equal to the value (A1+a1). In other words, the first value is set to (at) a larger value when the local maximum value Vmax is larger than a predetermined value (Vf+A1+a1), compared to when the local maximum value Vmax is smaller than the predetermined value (Vf+A1+a1).

Further, when the CPU makes a "Yes" determination at step 1236, the CPU proceeds to step 1630, at which the CPU determines whether or not a value (Vmin+(A2+a2)) obtained by adding a value (A2+a2) to the local minimum value Vmin is smaller than the reference value Vf. The value a2 is a positive predetermined value, and the value (A2+a2) is smaller than an absolute value of a difference between the minimum output value Min and the reference value Vf.

When the value (Vmin+(A2+a2)) is smaller than the reference value Vf, the CPU proceeds to step 1640 from step 1630 to set the target value VREF to (at) the value (Vmin+A2s). The value A2s is a positive predetermined value smaller than the value A2. Thereafter, the CPU proceeds to step 1240. In contrast, when the value (Vmin+(A2+a2)) is equal to or larger than the reference value Vf, the CPU proceeds to step 1238 from step 1630 to set the target value VREF to (at) the value (Vmin+A2). Thereafter, the CPU proceeds to step 1240.

That is, the CPU sets the target value VREF at (to) the value (Vmin+A2s) when an absolute value of a difference between the local minimum value Vmin and the reference value Vf is larger than the value (A2+a2), and sets the target value VREF at (to) the value (Vmin+A2) when the absolute value of the difference between the local minimum value Vmin and the reference value Vf is larger than the value A2 and smaller than or equal to the value (A2+a2). In other words, the first value is set to (at) a smaller value when the local minimum value Vmin is smaller than a predetermined value (Vf−(A2+a2)), compared to when the local minimum value Vmin is larger than a predetermined value (Vf−(A2+a2)).

For example, when the fuel cut control is performed, a large amount of oxygen is contained in the catalyst outflow gas. Accordingly, the output value Voxs of the downstream-side air-fuel ratio sensor becomes a value very close to the minimum output value Min. In this case, a large amount of oxygen remains in the diffusion resistance layer of the downstream-side air-fuel ratio sensor 56, and thus, the output value Voxs of the downstream-side air-fuel ratio sensor does not increase immediately even when the air-fuel ratio of the catalyst outflow gas changes to the rich air-fuel ratio after the fuel cut control is completed. That is, a change in the output value Voxs delays with respect to a change in the air-fuel ratio of the catalyst outflow gas.

Further, when the air-fuel ratio of the engine is controlled so as to be the rich air-fuel ratio after the completion of the fuel cut control (i.e., when an fuel increasing control after fuel cut completion is carried out), a large amount of unburnt substances are contained in the catalyst outflow gas. Accordingly, the output value Voxs of the downstream-side air-fuel ratio sensor becomes a value very close to the maximum output value Max. In this case, a large amount of the unburnt substances remain in the diffusion resistance layer of the downstream-side air-fuel ratio sensor 56, and thus, the output value Voxs of the downstream-side air-fuel ratio sensor does not decrease immediately even when the air-fuel ratio of the catalyst outflow gas changes to the lean air-fuel ratio after the fuel increasing control after fuel cut completion. That is, the change in the output value Voxs delays with respect to the change in the air-fuel ratio of the catalyst outflow gas.

As described above, a state of the downstream-side air-fuel ratio sensor 56 becomes a state which is so-called a "first order poisoning state", and the responsivity of the sensor deteriorates, when a large amount of oxygen or a large amount of the unburnt substances reach the downstream-side air-fuel ratio sensor 56.

In view of the above, the fourth control apparatus sets the target value VREF at (to) the "value (Vmax−A1s) which is much closer to the local maximum value Vmax", when the local maximum value Vmax becomes extremely large (i.e., when the absolute value of the difference between the local maximum value Vmax and the reference value Vf becomes larger than the value (A1+a1)). Similarly, the fourth control apparatus sets the target value VREF at (to) the "value (Vmin+A2s) which is much closer to the local maximum value Vmin", when the local maximum value Vmin becomes extremely small (i.e., when the absolute value of the difference between the local maximum value Vmin and the reference value Vf becomes larger than the value (A2+a2)). Consequently, even when the responsivity of the downstream-side air-fuel ratio sensor is deteriorated, the air-fuel ratio of the engine can be changed/switched over from the lean air-fuel ratio to the rich air-fuel ratio, or vice versa, without delay, since the lean request or the rich request can be found without delay. Accordingly, the fourth control apparatus can have the output value Voxs come closer to the reference value Vf, while avoiding a state in which the magnitude of fluctuation of the output value Voxs becomes large, and thus, can maintain the emission at a low level.

As described above, the fourth control apparatus can be said to be an apparatus which is configured so as to set the first change value when the absolute value of the difference between the first extreme value (e.g., local maximum value Vmax) and the reference value Vf is larger than the positive second threshold (A1+a1) to (at) the value (A1s) which is smaller than the first change value (A1) used when the absolute value of the difference between the first extreme value and the reference value is equal to or smaller than the second threshold.

Similarly, the fourth control apparatus can be said to be an apparatus which is configured so as to set the first change value when the absolute value of the difference between the first extreme value (e.g., local minimum value Vmin) and the reference value Vf is larger than the positive second threshold (A2+a2) to (at) the value (A2s) which is smaller than the first change value (A2) used when the absolute value of the difference between the first extreme value and the reference value is equal to or smaller than the second threshold.

It should be noted that the fourth control apparatus may be configured so as to set the second change value when the absolute value of the difference between the first extreme value (e.g., local maximum value Vmax) and the reference value Vf is larger than the positive second threshold (A1+a1) to (at) the value (B1s) which is smaller than the second change value (B1) used when the absolute value of the difference between the first extreme value and the reference value is equal to or smaller than the second threshold.

Similarly, the fourth control apparatus may be configured so as to set the second change value when the absolute value of the difference between the first extreme value (e.g., local maximum value Vmin) and the reference value Vf is larger than the positive second threshold (A2+a2) to (at) the value (B2s) which is smaller than the second change value (B2) used when the absolute value of the difference between the first extreme value and the reference value is equal to or smaller than the second threshold.

Further, the fourth control apparatus may be configured so as to set at least one of the first change value A1 and the second change value B1 to (at) a value which continuously becomes smaller as the local maximum value Vmax larger than the reference value becomes larger. Similarly, the fourth control apparatus may be configured so as to set at least one of the first change value A2 and the second change value B2 to (at) a value which continuously becomes smaller as the local minimum value Vmin smaller than the reference value becomes smaller.

Fifth Embodiment

A control apparatus (hereinafter, simply referred to as a "fifth control apparatus") according to a fifth embodiment of the present invention will next be described. The fifth control apparatus is different from the first control apparatus only in that the fifth control apparatus makes the first change value (at least one of the value A1 and the value A2) smaller for a period (period after fuel cut control completion) until a predetermined/certain time period elapses after a point in time at which the fuel cut control is terminated/completed than (compared to) for a period other than the period after fuel cut control completion.

Figure 17:
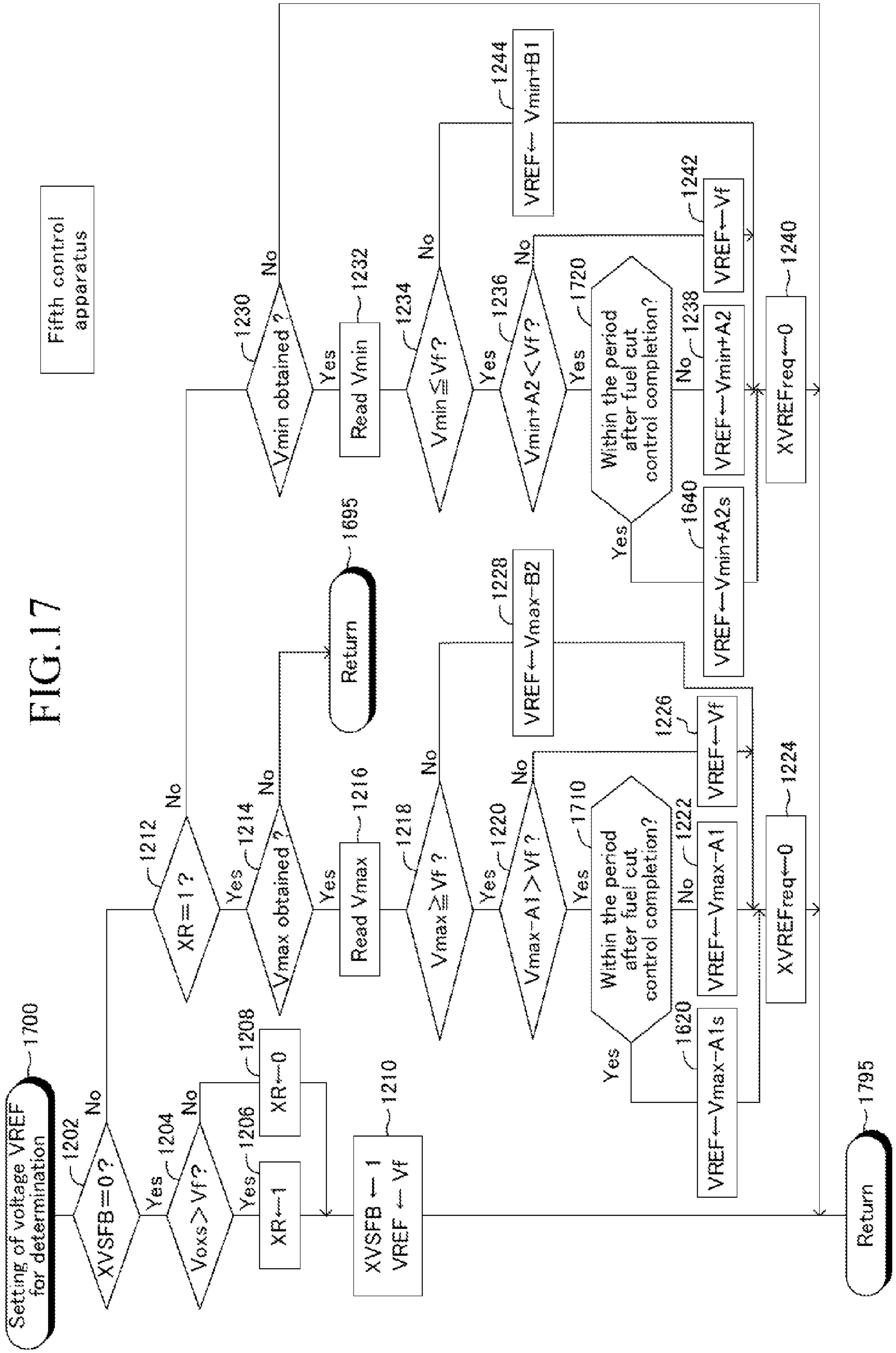
FIG. 17 is a flowchart showing a routine executed by a CPU of an air-fuel ratio control apparatus (fifth control apparatus) according to a fifth embodiment of the present invention.

A CPU of the fifth control apparatus is different from the CPU of the fourth control apparatus only in that the CPU of the fifth control apparatus executes a routine shown in FIG. 17 in place of the routine shown in FIG. 16. Accordingly, the difference will be mainly described.

The routine shown in FIG. 17 is different from the routine shown in FIG. 16 only in that "step 1610, and step 1630" are replaced with "step 1710, and step 1720", respectively, At step 1710, the CPU determines whether or not the present time is within the period after fuel cut control completion. When the present time is within the period after fuel cut control completion, the CPU proceeds to step 1620 from step 1710. When the present time is not within the period after fuel cut control completion, the CPU proceeds to step 1222 from step 1710.

At step 1720, the CPU determines whether or not the present time is within the period after fuel cut control completion. When the present time is within the period after fuel cut control completion, the CPU proceeds to step 1640 from step 1720. When the present time is not within the period after fuel cut control completion, the CPU proceeds to step 1238 from step 1720.

It is likely that the state of the downstream-side air-fuel ratio sensor 56 is the first order poisoning state described above, in the period after fuel cut control completion.

Accordingly, the fifth control apparatus makes the first change value smaller within the period after fuel cut control completion (i.e., the target value VREF is set to (at) the value (Vmax−A1s) in place of the value (Vmax−A1), or to (at) the value (Vmin+A2s) in place of the value (Vmin+A2)). That is, the fifth control apparatus sets the "first change value within the period after fuel cut control completion" to (at) a smaller value than the "first change value within the period other than the period after fuel cut control completion."

Consequently, even when the responsivity of the downstream-side air-fuel ratio sensor 56 is deteriorated, the air-fuel ratio of the engine can be changed/switched over from the lean air-fuel ratio to the rich air-fuel ratio, or vice versa, without delay, since the lean request or the rich request can be found without delay. Accordingly, the fifth control apparatus can have the output value Voxs come closer to the reference value Vf, while avoiding a state in which the magnitude of fluctuation of the output value Voxs becomes large, and thus, can maintain the emission at a low level.

It should be noted that the fifth control apparatus may set the "second change value within the period after fuel cut control completion" to (at) a smaller value than the "second change value within the period other than the period after fuel cut control completion."

It should also be noted that the "period after fuel cut control completion" may be a period formed (including) a "period in which the control (fuel increasing control after fuel cut completion) to set the air-fuel ratio of the engine to (at) the rich air-fuel ratio for a predetermined/certain time period after the fuel cut control is completed" and a "period until a predetermined/certain time period elapses since the fuel increasing control after fuel cut completion is completed."

Further, the fifth control apparatus may be configured in such a manner that step 1710 is replaced with step at which the CPU determines whether or not the present time is within a period until a predetermined/certain time period elapses since a point in time at which the fuel increasing control after fuel cut completion is completed. Furthermore, the fifth control apparatus may be configured in such a manner that step 1720 is replaced with step at which the CPU determines whether or not the present time is within a period until a predetermined/certain time period elapses since a point in time at which the fuel increasing control after fuel cut completion is completed. In addition, it is preferable that the fifth control apparatus maintain the value (A1, A2) serving as the first threshold at a constant value.

Sixth Embodiment

A control apparatus (hereinafter, simply referred to as a "sixth control apparatus") according to a sixth embodiment of the present invention will next be described. The sixth control apparatus is different from the first control apparatus only in that the sixth control apparatus makes the first change value (value A1 and value A2) smaller when the engine is in an accelerating condition than when the engine is not in the accelerating condition.

Figure 18:
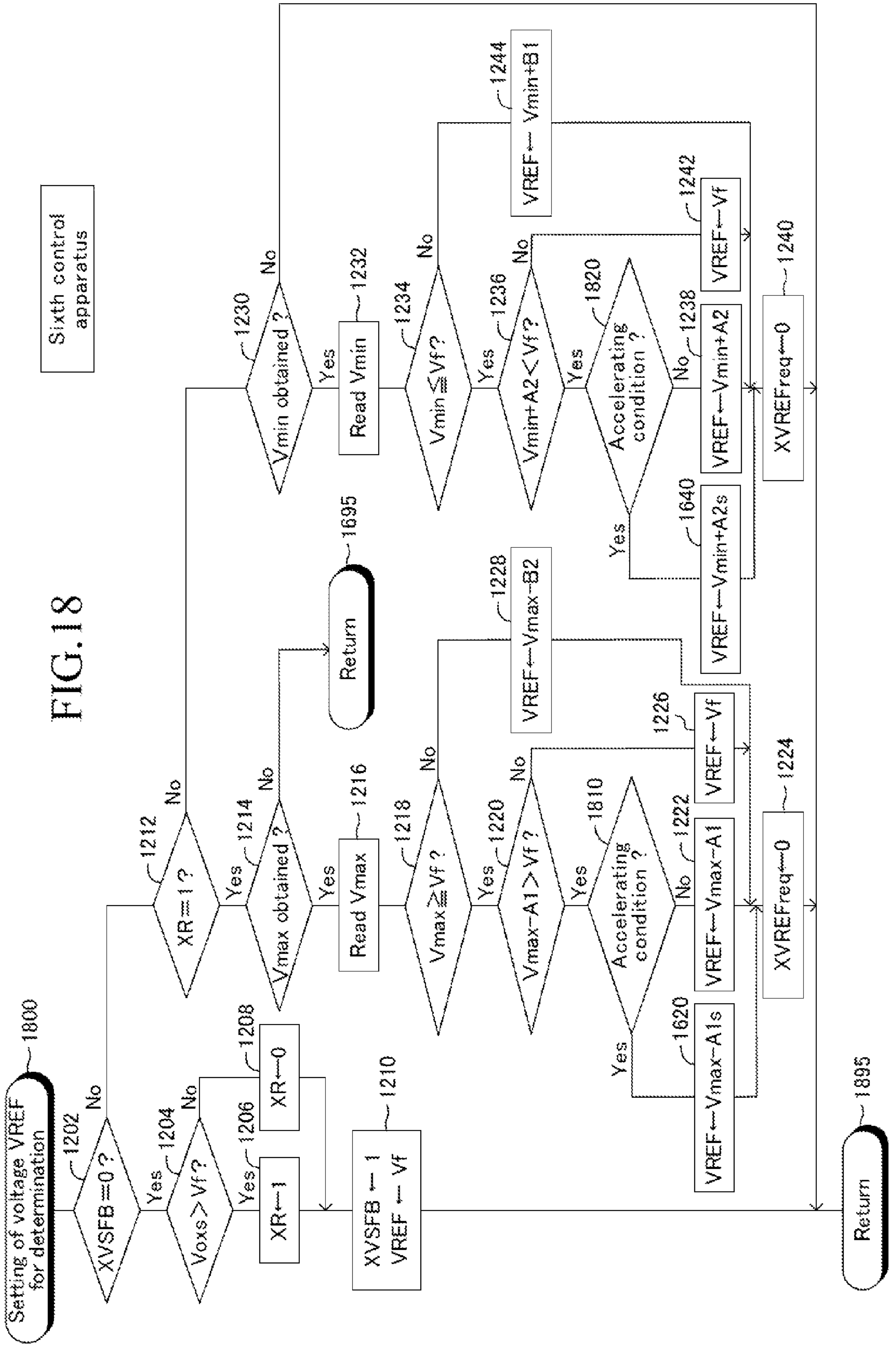
FIG. 18 is a flowchart showing a routine executed by a CPU of an air-fuel ratio control apparatus (sixth control apparatus) according to a sixth embodiment of the present invention.

A CPU of the sixth control apparatus is different from the CPU of the fourth control apparatus only in that the CPU of the sixth control apparatus executes a routine shown in FIG. 18 in place of the routine shown in FIG. 16. Accordingly, the difference will be mainly described.

The routine shown in FIG. 18 is different from the routine shown in FIG. 16 only in that "step 1610, and step 1630" are replaced with "step 1810, and step 1820", respectively.

At step 1810, the CPU determines whether or not a present condition of the engine 10 is the accelerating condition. More specifically, the CPU determines that the present condition of the engine 10 is the accelerating condition, when the present time is within a "period (accelerating period) until a predetermined time period elapses since a point in time at which a change amount ΔTA which is a change amount of the throttle valve opening TA per unit time becomes equal to or larger than a transient determination threshold ΔTAth." It should be noted that the parameter for determining whether or not the condition of the engine 10 is the accelerating condition may any one of a change amount ΔAccp of the accelerator pedal operation amount Accp per unit time, a change amount ΔGa of the intake air amount Ga per unit time, a change amount ΔKL of the load KL per unit time, a change amount ASPD of a speed of the vehicle on which the engine 10 is mounted, and the like, in addition to (in place of) the change amount ΔTA of the throttle valve opening TA per unit time.

When the present time is within the accelerating period, the CPU proceeds to step 1620 from step 1810. When the present time is not within the accelerating period, the CPU proceeds to step 1222 from step 1810.

At step 1820, the CPU determines whether or not the present time is within the accelerating period. When the present time is within the accelerating period, the CPU proceeds to step 1640 from step 1820. When the present time is not within the accelerating period, the CPU proceeds to step 1238 from step 1820.

Within the accelerating period, it is likely that the oxygen storage amount OSA of the catalyst 43 reaches a "value in the vicinity of the maximum oxygen storage amount Cmax, or in the vicinity of "0"", and further, a large amount of "Nox and unburnt substances" flow into the catalyst 43 in those state.

In view of the above, the sixth control apparatus makes the first change value smaller within the accelerating period (i.e., the target value VREF is set to (at) the value (Vmax−A1s) in place of the value (Vmax−A1), or to (at) the value (Vmin+A2s) in place of the value (Vmin+A2)). That is, the sixth control apparatus sets the "first change value within the accelerating period" to (at) a smaller value than the "first change value within the period other than the accelerating period."

Consequently, the lean request or the rich request can be found more earlier. In other words, the sixth control apparatus can change/switch over the air-fuel ratio of the engine from the lean air-fuel ratio to the rich air-fuel ratio, or vice versa, without delay. Accordingly, the sixth control apparatus can maintain the emission at a low level.

It should be noted that the sixth control apparatus may set the "second change value within the accelerating period" to (at) a smaller value than the "second change value within the period other than the accelerating period."

Seventh Embodiment

A control apparatus (hereinafter, simply referred to as a "seventh control apparatus") according to a seventh embodiment of the present invention will next be described. The seventh control apparatus is different from the first control apparatus only in that a learning condition for the main FB learning value is different from the learning condition for the main FB learning value used in the first control apparatus. Accordingly, the difference will be mainly described.

More specifically, a CPU of the seventh control apparatus executes the routines shown in FIGS. 8-13, similarly to the CPU of the first control apparatus. However, the CPU of the seventh control apparatus determines that the learning condition is satisfied when all of the following conditions are satisfied, at step 955 shown in FIG. 9.

(Condition 1) A time period, obtained by multiplying the time duration (predetermined time ta) for the single execution of the routine shown in FIG. 9 by a natural number, elapses.

(Condition 2) A state in which the target value VREF is equal to the reference value Vf continues over a predetermined time period t.

That is, the seventh control apparatus is configured so as to perform a "learning control to update/renew the main FB learning value KG" when the target value VREF is set to (at) the reference value Vf, and so as not to perform (or so as to prohibit) the learning control when the target value VREF is not set to (at) the reference value Vf.

That is, it is likely that a temporal average of the air-fuel ratio of the engine does not coincide with the stoichiometric air-fuel ratio in a state in which the target value VREF is varying toward the reference value. Accordingly, when the main FB learning value KG is updated/renewed in the state in which the target value VREF is varying toward the reference value, it is likely that the main FB learning value KG becomes inaccurate.

The seventh control apparatus updates/renews the main FB learning value KG (performs the learning control) only when the target value VREF coincide with (is equal to) the reference value Vf. Accordingly, the likelihood that the main FB learning value KG becomes inaccurate can be reduced. Consequently, the seventh control apparatus can maintain the emission at a low level.

It should be noted that the seventh control apparatus may preferably be configured so as to perform the update of the correction coefficient average FAFAV at step 950 shown in FIG. 9 only when the state in which the target value VREF coincide with (is equal to) the reference value Vf continues over the predetermined time period t.

It should be also noted that the seventh control apparatus or each of the control apparatuses according to the other embodiments of the present invention is an air-fuel ratio control apparatus which comprises:

a base fuel injection amount calculation section configured so as to obtain an intake amount (cylinder intake air amount Mc(k)) of air introduced into the engine 10 (step 830), and calculate the base fuel injection amount Fb to have the air-fuel ratio of the "mixture supplied to the engine 10" coincide with the stoichiometric air-fuel ratio based on the obtained amount of intake air (cylinder intake air amount Mc(k)) (step 840);

the upstream-side air-fuel ratio sensor 55, which is disposed in the exhaust passage and upstream of the catalyst 43, and which outputs the output value varying in response to the air-fuel ratio of the exhaust gas flowing into the catalyst 43;

a main feedback control amount calculation section (steps from step 905 to step 945) configured so as to calculate the main feedback control amount (DFi) which corrects the base fuel injection amount Fb in such a manner that the upstream-side air-fuel ratio (abyfs) represented by the output Vabyfs of the upstream-side air-fuel ratio sensor 55 coincides with the stoichiometric air-fuel ratio;

a sub feedback control amount calculation section (steps from step 1005 to step 1035, shown in FIG. 10) configured so as to calculate the sub feedback control amount (Vafsfb) which corrects the base fuel injection amount in such a manner that the base fuel injection amount is decreased during a period in which it is determined that the lean request is occurring, and the base fuel injection amount is increased during a period in which it is determined that the rich request is occurring; and a fuel injection amount control section configured so as to calculate the instructed fuel injection amount Fi by correcting the base fuel injection amount Fb with the air-fuel ratio correction amount (FAF) which is obtained based on the main feedback control amount and the sub feedback control amount (refer to step 910 shown in FIG. 9, and step 850 shown in FIG. 8, etc.), and so as to perform the feedback control by supplying a fuel whose amount is equal to the calculated instructed fuel injection amount Fi to the engine 10 (step 860 shown in FIG. 8, etc.).

Further, the air-fuel ratio control section of the seventh control apparatus comprises a learning section configured so as to perform a learning control which obtain, as an air-fuel ratio learning value (main FB learning value KG), a value correlating with an average of said main feedback control amount (e.g., FAFAV, or a value which is increased when FAFAV is large and is decreased when FAFAV is small) (steps from step 950 to step 975, shown in FIG. 9);

fuel injection amount control section is configured so as to calculate the instructed fuel injection amount by correcting the base fuel injection amount Fb with the air-fuel ratio learning value KG (step 850 shown in FIG. 8); and the learning section of the seventh control apparatus is configured so as to perform the learning control when the target value is set at the reference value, and so as not to perform the learning control when the target value is not set at the reference value (refer to step 955 shown in FIG. 9, and the (condition 2) described above).

Eighth Embodiment

A control apparatus (hereinafter, simply referred to as an "eighth control apparatus") according to an eighth embodiment of the present invention will next be described. The eighth control apparatus is different from the seventh control apparatus only in that the eighth control apparatus modifies an air-fuel ratio learning value (main FB learning value KG) based on a value correlating with the target value VREF when the target value does not converge on the reference value Vf. Accordingly, the difference will mainly be described.

More specifically, the CPU of the eighth control apparatus executes the routines that the CPU of the seventh control apparatus executes. Further, the CPU of the eighth control apparatus executes a routine shown in FIG. 19 every time a predetermined time period elapses.

Accordingly, at an appropriate point in time, the CPU starts processes from step 1900 to proceed to step 1910, at which CPU determines whether or not the main feedback control condition is satisfied. At this point in time, if the main feedback control condition is not satisfied, the CPU directly proceeds to step 1995 from step 1910 to end the present routine tentatively.

In contrast, if the main feedback control condition is satisfied when the CPU performs the process of step 1910, the CPU makes a "Yes" determination at step 1910 to proceed to step 1920, at which the CPU determines whether or not a "state (hereinafter, referred to as a "target value convergence state") in which the target value VREF coincides with reference value Vf over first duration time" does not occur over (for a last) second duration time thref.

When the "target value convergence state" has occurred between a "point in time which is before the second duration time thref from the present time" and the "present time", the CPU makes a "No" determination at step 1920 to directly proceed to step 1995 to end the present routine tentatively. In contrast, the "target value convergence state" has not occurred for the last second duration time thref or more (over the second duration time thref), the CPU makes a "Yes" determination at step 1920 to proceed to step 1930, at which the CPU determines whether or not the target value VREF alternately fluctuates between the value (Vmax−A1) and the value (Vmin+A2).

When the target value VREF alternately fluctuates between the value (Vmax−A1) and the value (Vmin+A2), the CPU makes a "Yes" determination at step 1930 to directly proceed to step 1995 so as to end the present routine tentatively.

When the target value VREF does not alternately fluctuate between the value (Vmax−A1) and the value (Vmin+A2), the CPU makes a "No" determination at step 1930 to proceed to step 1940, at which the CPU determines whether or not an average of the target value VREF (an average of the target value VREF from a certain point in time in the past up to the present time, or a value correlating with the average of the target value VREF) is larger than the reference value Vf.

When the average of the target value VREF is larger than the reference value Vf, the CPU makes a "Yes" determination at step 1940 to proceed to step 1950, at which the CPU decreases the main FB learning value KG by a positive predetermined value dKG1. That is, the main FB learning value KG is modified/changed to a value which decreases the "base fuel injection amount Fb" compared to the main FB learning value KG at that point in time. Thereafter, the CPU proceeds to step 1995 so as to end the present routine tentatively.

If the average of the target value VREF is smaller than the reference value Vf when the CPU performs the process of step 1940, the CPU makes a "No" determination at step 1940 to proceed to step 1960, at which the CPU increases the main FB learning value KG by a positive predetermined value dKG2. That is, the main FB learning value KG is modified/changed to a value which increases the "base fuel injection amount Fb" compared to the main FB learning value KG at that point in time. Thereafter, the CPU proceeds to step 1995 so as to end the present routine tentatively.

Figure 20:
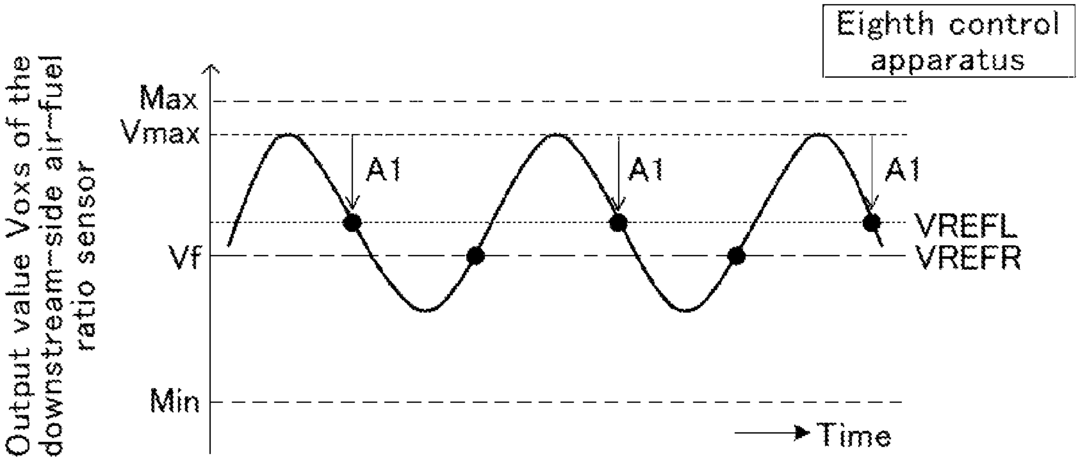
FIG. 20 is a timing chart for describing an operation of the eighth control apparatus.

For example, when the main FB learning value KG has been erroneously learned, and thus, the main FB learning value KG becomes a "value which excessively increase the base fuel injection amount Fb", a center of the air-fuel ratio of the engine becomes smaller than the stoichiometric air-fuel ratio. Accordingly, an average of the air-fuel ratio of the catalyst outflow gas becomes the rich air-fuel ratio. In this case, if the error of the main FB learning value KG from an appropriate (proper) value is excessively large, the output value Voxs of the downstream-side air-fuel ratio sensor fluctuates around a value larger than the reference value VF, as shown in FIG. 20. That is, the local maximum value Vmax continues to be a value in the vicinity of the maximum output value Max. Consequently, the target value VREF alternately becomes the value (Vmax−A1) which is the target value for lean determination VREFL and the value Vf which is the target value for rich determination VREFR. In other words, the target value VREF does not converge on the reference value Vf, and thus, the target value convergence state does not occur for the second duration time thref or longer.

In view of the above, when the state shown in FIG. 20 occurs, the eighth control apparatus decreases the main FB learning value KF by the positive predetermined value dKG1, as described above. This enables the center of the air-fuel ratio of the engine to come closer to the stoichiometric air-fuel ratio, and therefore, the target value VREF can be converged on the reference value Vf.

Figure 21:
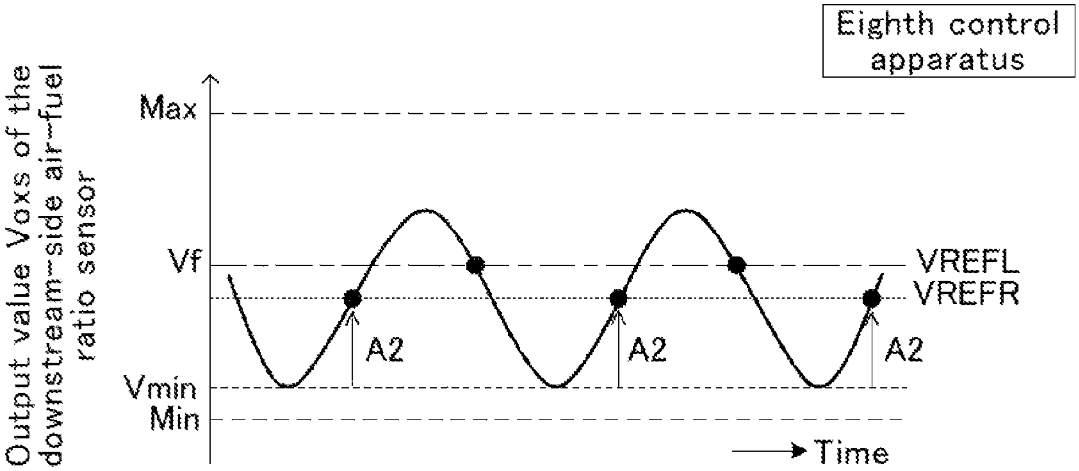
FIG. 21 is a timing chart for describing an operation of the eighth control apparatus.

Similarly, when the main FB learning value KG has been erroneously learned, and thus, the main FB learning value KG becomes a "value which excessively decrease the base fuel injection amount Fb", the center of the air-fuel ratio of the engine becomes larger than the stoichiometric air-fuel ratio. Accordingly, the average of the air-fuel ratio of the catalyst outflow gas becomes the lean air-fuel ratio. In this case, if the error of the main FB learning value KG from the appropriate (proper) value is excessively large, the output value Voxs of the downstream-side air-fuel ratio sensor fluctuates around a value smaller than the reference value VF, as shown in FIG. 21. That is, the local minimum value Vmin continues to be a value in the vicinity of the minimum output value Min. Consequently, the target value VREF alternately becomes the value (Vmin+A2) which is the target value for rich determination VREFR and the value Vf which is the target value for lean determination VREFL. In other words, the target value VREF does not converge on the reference value Vf, and thus, the target value convergence state does not occur for the second duration time thref or longer.

In view of the above, when the state shown in FIG. 21 occurs, the eighth control apparatus increases the main FB learning value KF by the positive predetermined value dKG2, as described above. This enables the center of the air-fuel ratio of the engine to come closer to the stoichiometric air-fuel ratio, and therefore, the target value VREF can be converged on the reference value Vf.

Figure 19:
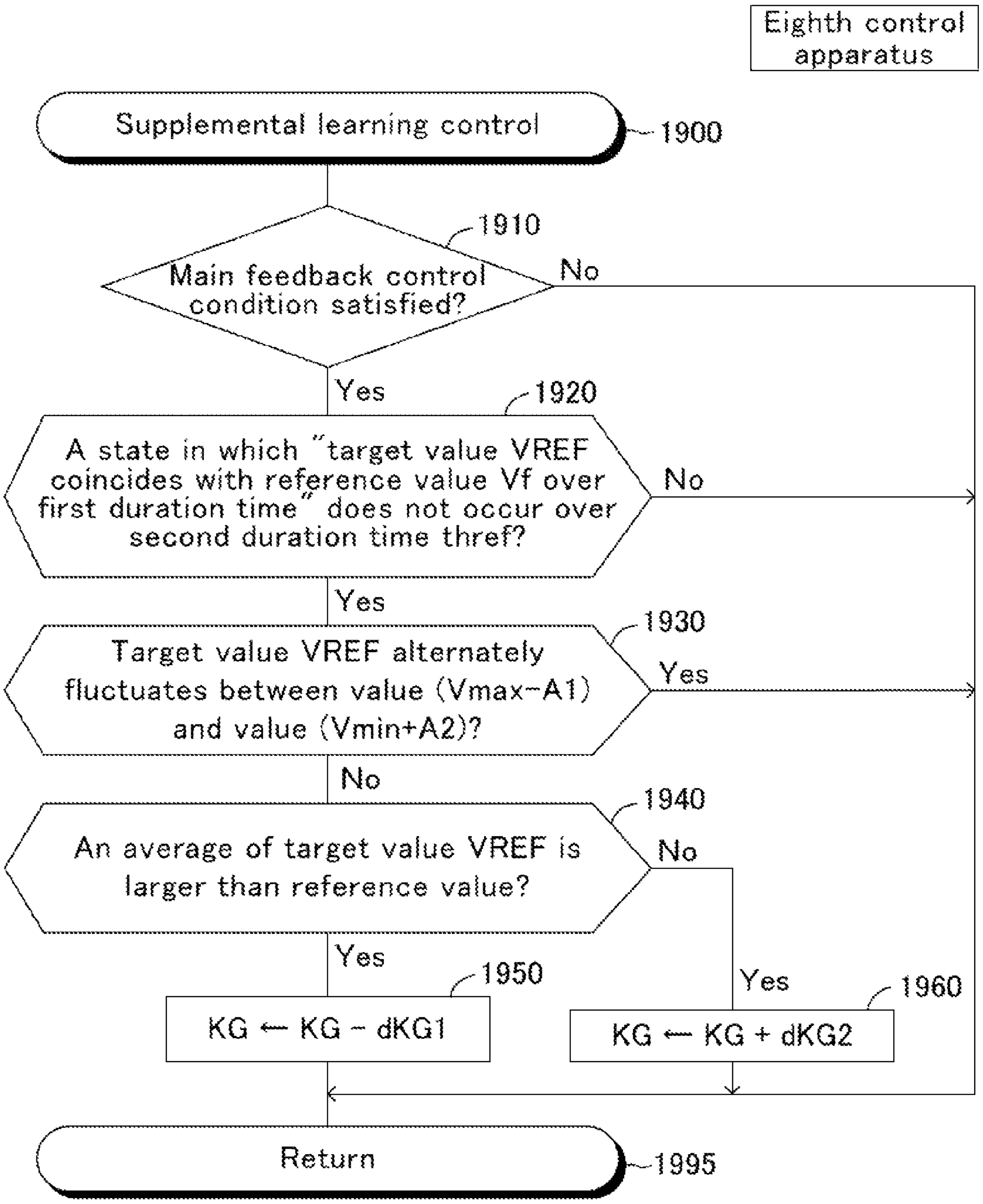
FIG. 19 is a flowchart showing a routine executed by a CPU of an air-fuel ratio control apparatus (eighth control apparatus) according to an eighth embodiment of the present invention.
Figure 22:
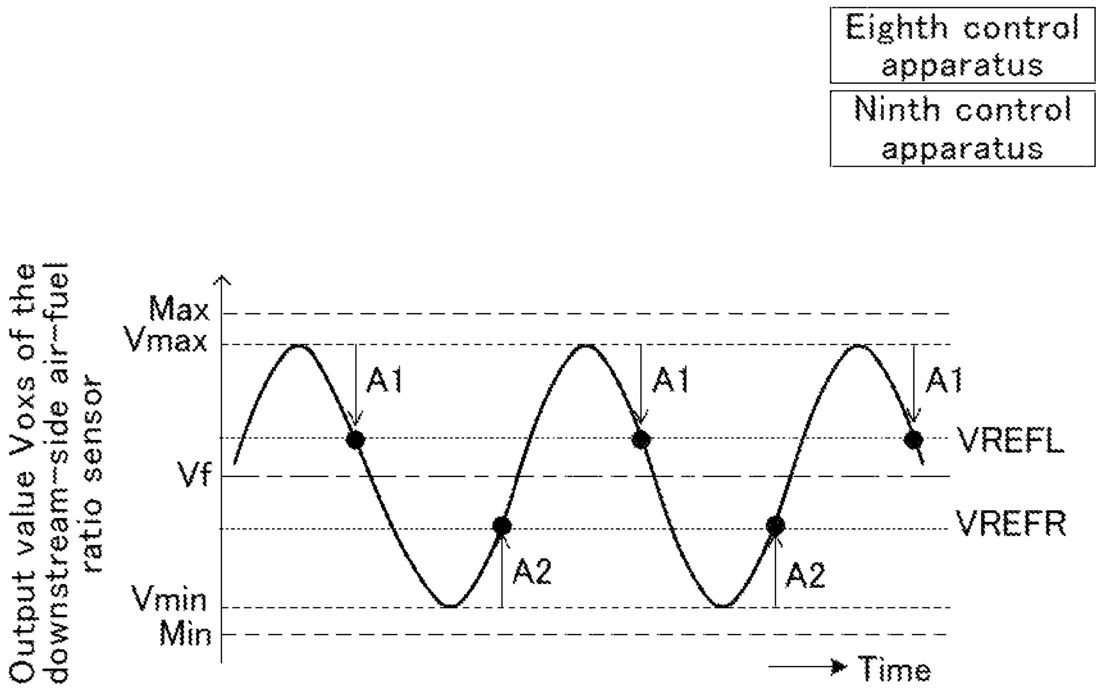
FIG. 22 is a timing chart for describing an operation of an air-fuel ratio control apparatus (ninth control apparatus) according to a ninth embodiment of the present invention.

It should be noted that, as shown in FIG. 22, when a state in which the target value VREF alternately fluctuates between "the value (Vmax−A1) and the value (Vmin+A2)" continues for (over) a predetermined time period (third duration time) or longer, the eighth control apparatus does not modify the main FB learning value KG (refer to the determination of "No" at step 1930 shown in FIG. 19). That is, the eighth control apparatus does not change the main FB learning value KG when a "state (hereinafter, also referred to as a "target value fluctuation state") in which the target value for lean determination VREFL is equal to the value (Vmax−A1), and the target value for rich determination VREFR is equal to the value (Vmin+A2)" continues for the predetermined time duration or longer.

It should be noted that the first duration time may be set to a time duration in which the number of change times (the number of reversal) from the lean request to the rich request, or vice versa becomes equal to or large than a first predetermined number of times. Similarly, the second duration time may be set to a time duration in which the number of reversal becomes equal to or large than a second predetermined number of times. The third duration time may be set to a time duration in which the number of reversal becomes equal to or large than a third predetermined number of times.

Ninth Embodiment

A control apparatus (hereinafter, simply referred to as a "ninth control apparatus") according to a ninth embodiment of the present invention will next be described. The ninth control apparatus is different from the eighth control apparatus only in that the ninth control apparatus makes the first change value (value A1 and value A2) smaller when the target value VREF does not converge on the reference value Vf, and thus, the target value fluctuation state shown in FIG. 22 is occurring, than when the target value fluctuation state is not occurring. Accordingly, the difference will mainly be described.

More specifically, a CPU of the ninth control apparatus executes the routines that the CPU of the eighth control apparatus executes. Further, the CPU of the ninth control apparatus executes a routine shown in FIG. 23 every time a predetermined time period elapses.

Figure 23:
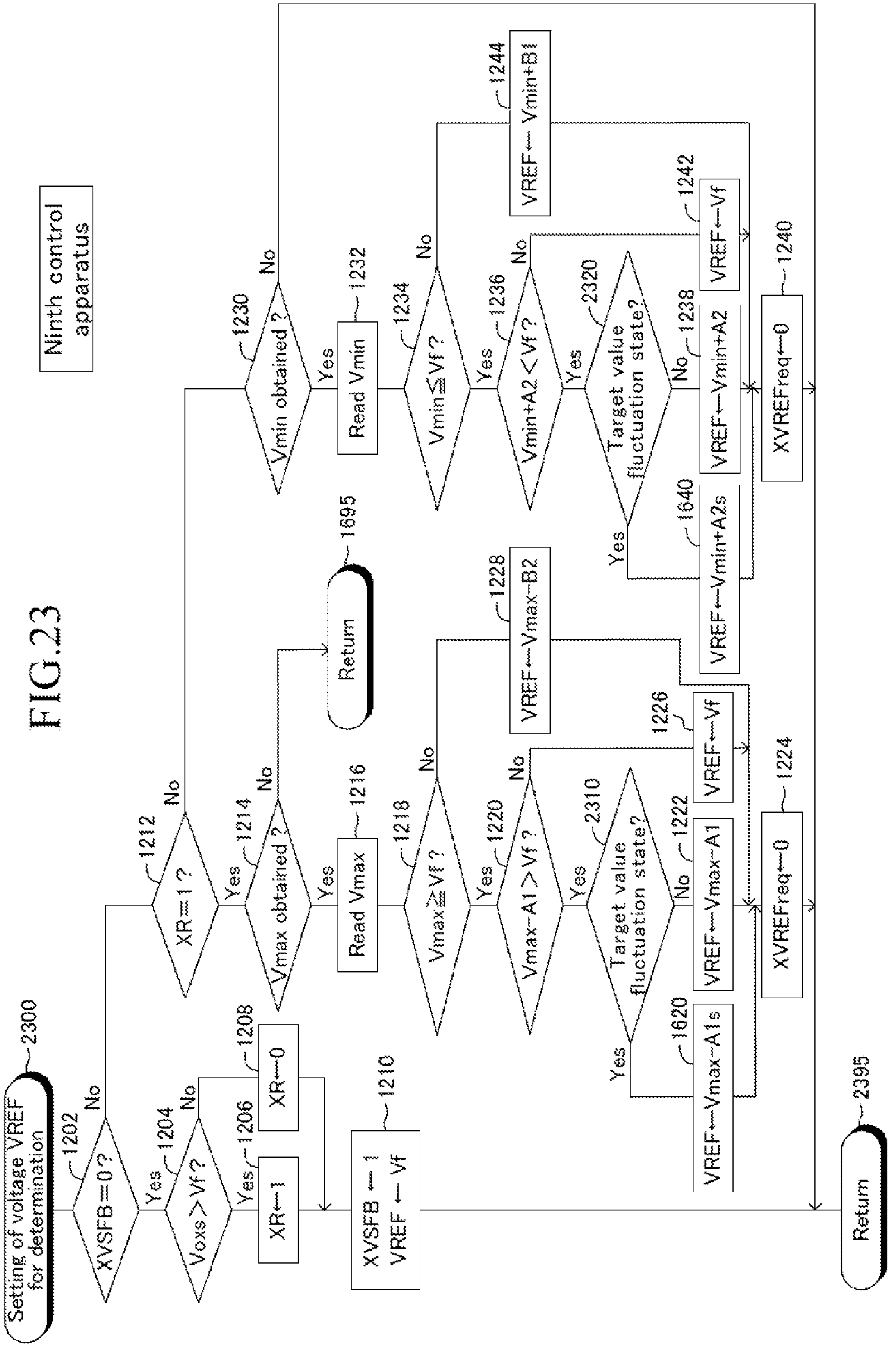
FIG. 23 is a flowchart showing a routine executed by a CPU of the ninth control apparatus.

The routine shown in FIG. 23 is different from the routine shown in FIG. 16 only in that "step 1610, and step 1630" are replaced with "step 2310, and step 2320", respectively, At step 2310, the CPU determines whether or not the present time is in the target value fluctuation state described above. When the current state is in the target value fluctuation state, the CPU proceeds to step 1620 from step 2310. When the current state is not in the target value fluctuation state, the CPU proceeds to step 1222 from step 2310.

At step 2320, the CPU determines whether or not the present time is in the target value fluctuation state described above. When the current state is in the target value fluctuation state, the CPU proceeds to step 1640 from step 2320. When the current state is not in the target value fluctuation state, the CPU proceeds to step 1238 from step 2320.

That is, the ninth control apparatus makes the first change value smaller when the current state is in the target value fluctuation state, than when the current state is not in the target value fluctuation state (i.e., the target value VREF is set to (at) the value (Vmax−A1s) in place of the value (Vmax−A1), or to (at) the value (Vmin+A2s) in place of the value (Vmin+A2)). That is, the ninth control apparatus sets the "first change value when the target value fluctuation state is occurring" to (at) a smaller value than the "first change value when the target value fluctuation state is not occurring."

Accordingly, when the target value fluctuation state is occurring, the ninth control apparatus can change/switch over the air-fuel ratio of the engine from the lean air-fuel ratio to the rich air-fuel ratio, or vice versa, much earlier. Consequently, the ninth control apparatus can avoid a state in which the local maximum value Vmax continues to be a value in the vicinity of the maximum output value Max, and the local minimum value Vmin continues to be a value in the vicinity of the minimum output value Min (i.e., a state in which the target value fluctuation state continues). As a result, the ninth control apparatus can improve the emission when the target value fluctuation state occurs.

As described above, the ninth control apparatus includes a learning section which is configured so as to make the first change value (A1, A2) smaller when the state (target value fluctuation state) occurs, in which a state where the target value VREF alternately fluctuates between a "value (e.g., Vmax−A1) larger than the reference value Vf" and a "value (e.g., Vmin+A2) smaller than the reference value Vf" continues for a predetermined time duration or longer.

It should be noted that the ninth control apparatus may set the "second change value during the target value fluctuation state" to (at) a value smaller than "the second change value when the target value fluctuation state is not occurring."

Tenth Embodiment

A control apparatus (hereinafter, simply referred to as a "tenth control apparatus") according to a tenth embodiment of the present invention will next be described. The tenth control apparatus is different from the first control apparatus only in that the tenth control apparatus forcibly make the target value VREF come closer to the reference value Vf with time. Accordingly, the difference will be mainly described.

Figure 24:
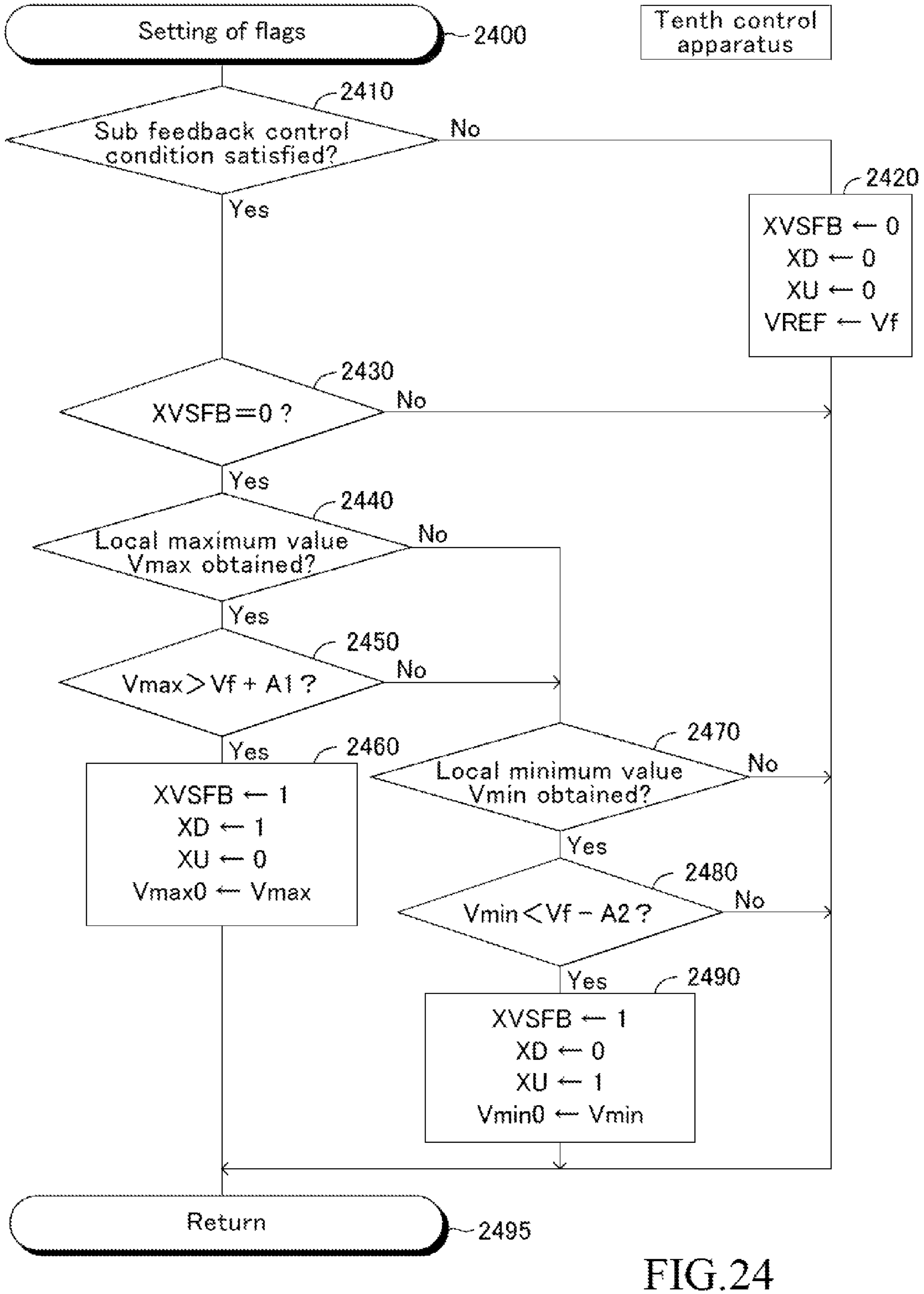
FIG. 24 is a flowchart showing a routine executed by a CPU of an air-fuel ratio control apparatus (tenth control apparatus) according to a tenth embodiment of the present invention.
Figure 25:
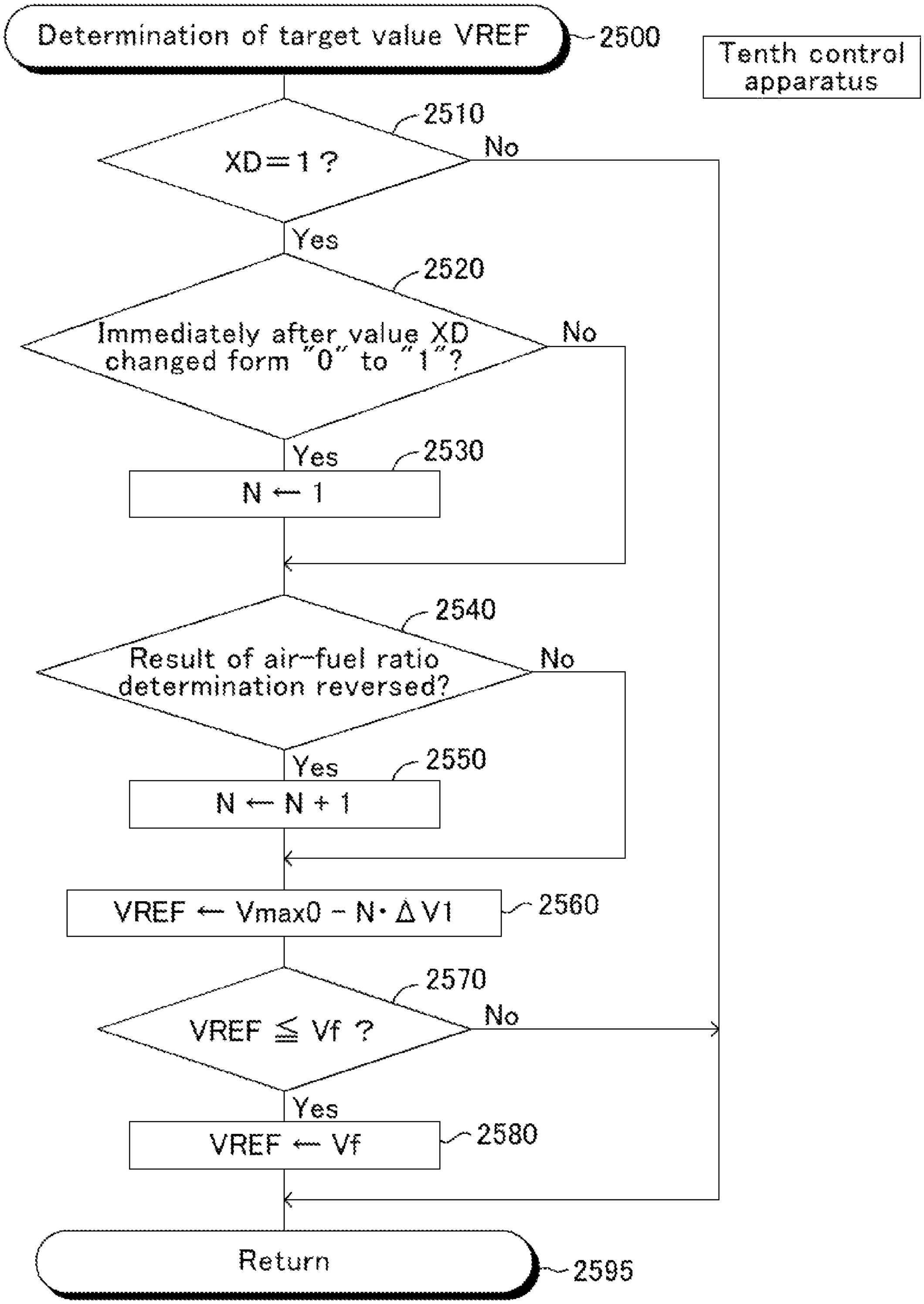
FIG. 25 is a flowchart showing a routine executed by the CPU of the tenth control apparatus.
Figure 26:
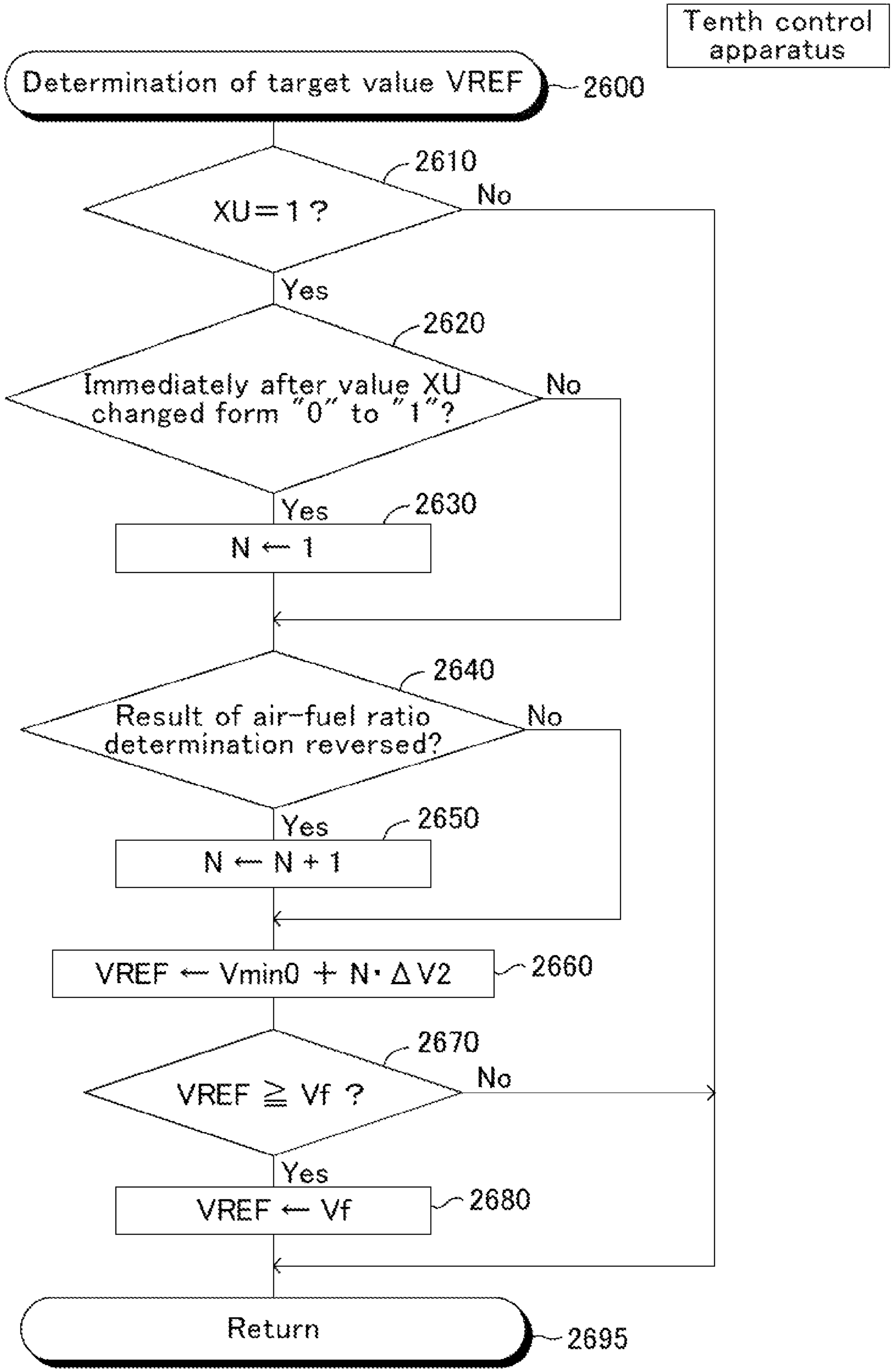
FIG. 26 is a flowchart showing a routine executed by the CPU of the tenth control apparatus.

More specifically, a CPU of the tenth control apparatus executes the routines shown in FIGS. 8-10, and FIGS. 24-26. The routines shown in FIGS. 8-10 have been already described. Thus, the routines shown in FIGS. 24-26 will be described. The CPU of the tenth control apparatus executes each of the routines shown in FIGS. 24-26, every time a predetermined time period elapses. The routines shown in FIGS. 24-26 are routines for forcibly having/making the target value VREF approach (come closer to) the reference value Vf.

At an appropriate point in time, the CPU starts processes from step 2400 shown in FIG. 24 to proceed to step 2410, at which CPU determines whether or not the sub feedback control condition is satisfied. When the sub feedback control condition is not satisfied, the CPU makes a "No" determination at step 2410 to proceed to step 2420, at which it performs processes described below. Thereafter, the CPU proceeds to step 2495 to end the present routine tentatively.

The CPU sets the value of the target value converging control flag XVSFB to (at) "0." It should be noted that the value of the target value converging control flag XVSFB is set to (at) "0" in the initialization routine described above.

The CPU sets a value of a target value decreasing flag XD to (at) "0."

The CPU sets a value of a target value increasing flag XU to (at) "0."

The CPU sets reference value Vf, as the target value VREF.

To the contrary, when the CPU performs the process of step 2410, and if the sub feedback control condition is satisfied, the CPU makes a "Yes" determination at step 2410 to proceed to step 2430, at which the CPU determines whether or not the value of the target value converging control flag XVSFB is "0." When the value of the target value converging control flag XVSFB is not "0", the CPU makes a "No" determination at step 2430, and then, proceeds to step 2495 to end the present routine tentatively.

When the CPU performs the process of step 2430, and if the target value converging control flag XVSFB is "0", the CPU makes a "Yes" determination at step 2430 to proceed to spte 2440, at which the CPU determines whether or not the local maximum value Vmax has been obtained during a period from a point in time at which the sub feedback control condition was satisfied to the present time.

When the local maximum value Vmax has been obtained during the period from the point in time at which the sub feedback control condition was satisfied to the present time, the CPU makes a "Yes" determination at step 2440 to proceed to step 2450, at which the CPU determines whether or not an absolute value of a difference between the local maximum value Vmax and the reference value Vf is larger than a positive first threshold (in this case, the value A1) (i.e., whether or not the local maximum value Vmax is larger than the value (Vf+A1)).

When the absolute value of the difference between the local maximum value Vmax and the reference value Vf is larger than the positive first threshold A1, the CPU makes a "Yes" determination at step 2450 to proceed to step 2460, at which the CPU performs processes described below. Thereafter, the CPU proceeds to step 2495 to end the present routine tentatively.

The CPU sets the value of the target value converging control flag XVSFB to (at) "1."

The CPU sets the value of the target value decreasing flag XD to (at) "1."

The CPU sets the value of the target value increasing flag XU to (at) "0."

The CPU stores the local maximum value Vmax as an initial local maximum value Vmax0.

In contrast, if the local maximum value Vmax has not been obtained when the CPU performs the process of step 2440, and if the absolute value of the difference between the local maximum value Vmax and the reference value Vf is equal to or smaller than the positive first threshold A1 when the CPU performs the process of step 2450, the CPU proceeds to step 2470.

At step 2470, the CPU determines whether or not the local minimum value Vmin has been obtained during the period from the point in time at which the sub feedback control condition was satisfied to the present time.

When the local minimum value Vmin has been obtained during the period from the point in time at which the sub feedback control condition was satisfied to the present time, the CPU makes a "Yes" determination at step 2470 to proceed to step 2480, at which the CPU determines whether or not an absolute value of a difference between the local minimum value Vmin and the reference value Vf is larger than a positive first threshold (in this case, the value A2) (i.e., whether or not the local minimum value Vmin is smaller than the value (Vf−A2)).

When the absolute value of the difference between the local minimum value Vmin and the reference value Vf is larger than the positive first threshold A2, the CPU makes a "Yes" determination at step 2480 to proceed to step 2490, at which the CPU performs processes described below. Thereafter, the CPU proceeds to step 2495 to end the present routine tentatively.

The CPU sets the value of the target value converging control flag XVSFB to (at) "1."

The CPU sets the value of the target value decreasing flag XD to (at) "0."

The CPU sets the value of the target value increasing flag XU to (at) "1."

The CPU stores the local minimum value Vmin as an initial local minimum value Vmin0.

In contrast, if the local minimum value Vmin has not been obtained when the CPU performs the process of step 2470, and if the absolute value of the difference between the local minimum value Vmin and the reference value Vf is equal to or smaller than the positive first threshold A2 when the CPU performs the process of step 2480, the CPU directly proceeds to step 2495 to end the present routine tentatively.

As described above, the CPU sets the value of the target value decreasing flag XD to (at) "1", when the value of the target value converging control flag XVSFB is "0" (i.e., the target value changing control is not being carried out), and when the "absolute value of the difference between the local maximum value Vmax and the reference value Vf" is larger than the first threshold, and after the sub feedback control condition is satisfied. Further the CPU sets the value of the target value increasing flag XU to (at) "1", when the value of the target value converging control flag XVSFB is "0" (i.e., the target value changing control is not being carried out), and when the "absolute value of the difference between the local minimum value Vmin and the reference value Vf" is larger than the first threshold, and after the sub feedback control condition is satisfied.

Meanwhile, at an appropriate point in time, the CPU starts processes from step 2500 shown in FIG. 25, and determines whether or not the value of the target value decreasing flag XD is "1" at step 2510. When the value of the target value decreasing flag XD is not "1", the CPU makes a "No" determination at step 2510 to directly proceed to step 2595 so as to end the present routine tentatively.

It is assumed that the present time is immediately after a point in time at which the value of the target value decreasing flag XD was set to (at) "1" at step 2460 shown in FIG. 24. Under this assumption, when the CPU proceeds to step 2510 shown in FIG. 25, the CPU makes a "Yes" determination at step 2510 to proceed to step 2520. At step 2520, the CPU determines whether or not the present time is immediately after the point in time at which the value of the target value decreasing flag XD was changed from "0" to "1."

Under the assumption above, the present time is immediately after the point in time at which the value of the target value decreasing flag XD was changed from "0" to "1." The CPU, therefore, makes a "Yes" determination at step 2520 to proceed to step 2530, at which the CPU sets a value of a counter N to (at) "1" to proceed to step 2540. It should be noted that, when the point in time at which the CPU performs the process of step 2520 is not immediately after the point in time at which the value of the target value decreasing flag XD was changed from "0" to "1", the CPU makes a "No" determination at step 2520 to directly proceed to step 2540.

Subsequently, at step 2540, the CPU determines whether or not a result of the air-fuel ratio determination is reversed? More specifically, when the output value Voxs of the downstream-side air-fuel ratio sensor was smaller than the target value VREF at a predetermined time before, and the output value Voxs of the downstream-side air-fuel ratio sensor is larger than the target value VREF at present time, the CPU determines that the result of the air-fuel ratio determination is reversed. Further, when the output value Voxs of the downstream-side air-fuel ratio sensor was larger than the target value VREF at a predetermined time before, and the output value Voxs of the downstream-side air-fuel ratio sensor is smaller than the target value VREF at present time, the CPU determines that the result of the air-fuel ratio determination is reversed.

When the result of the air-fuel ratio determination indicates the reversal, the CPU makes a "Yes" determination at step 2540 to proceed to step 2550, at which the CPU increments the value of the counter N by "1" to proceed to step 2560. In contrast, when the result of the air-fuel ratio determination does not indicate the reversal, the CPU makes a "No" determination at step 2540 to directly proceed to step 2560.

Subsequently at step 2560, the CPU sets, as the target value VREF, a value ($Vmax0-N\cdot\Delta V1$) obtained by subtracting a "product of the value N and a positive constant value $\Delta V1$" from the initial local maximum value Vmax0 obtained at step 2460 shown in FIG. 24. It should be noted that the value $\Delta V1$ corresponds to the first change value, and is set to a value which is smaller than the absolute value of the difference between the maximum output value Max and the reference value Vf.

Subsequently at step 2570, the CPU determines whether or not the target value VREF is equal to or smaller than the reference value Vf. When the target value VREF is equal to or smaller than the reference value Vf, the CPU proceeds to step 2580 to set the reference value Vf as the target value VREF, and thereafter, the CPU proceeds to step 2595 so as to end the present routine tentatively. In contrast, when the target value VREF is larger than the reference value Vf, the CPU directly proceeds to step 2595 from step 2570 so as to end the present routine tentatively. It should be noted that the CPU may perform, at step 2580, the process which is the same as the process of step 2420 shown in FIG. 24.

After that, the routine is repeatedly executed, and thus, the target value VREF is decreased, from the value (Vmax0−ΔV1), by the value ΔV1 every time the result of the air-fuel ratio determination is reversed, and finally coincides with the reference value Vf.

Meanwhile, at an appropriate point in time, the CPU starts processes from step 2600 shown in FIG. 26, and determines whether or not the value of the target value increasing flag XU is "1" at step 2610. When the value of the target value increasing flag XU is not "1", the CPU makes a "No" determination at step 2610 to directly proceed to step 2695 so as to end the present routine tentatively.

It is assumed that the present time is immediately after a point in time at which the value of the target value increasing flag XU was set to (at) "1" at step 2490 shown in FIG. 24. Under this assumption, when the CPU proceeds to step 2610 shown in FIG. 26, the CPU makes a "Yes" determination at step 2610 to proceed to step 2620. At step 2620, the CPU determines whether or not the present time is immediately after the point in time at which the value of the target value increasing flag XU was changed from "0" to "1."

Under the assumption above, the present time is immediately after the point in time at which the value of the target value increasing flag XU was changed from "0" to "1." The CPU, therefore, makes a "Yes" determination at step 2620 to proceed to step 2630, at which the CPU sets a value of a counter N to (at) "1" to proceed to step 2640. It should be noted that, when the point in time at which the CPU performs the process of step 2620 is not immediately after the point in time at which the value of the target value increasing flag XU was changed from "0" to "1", the CPU makes a "No" determination at step 2620 to directly proceed to step 2640.

Subsequently, at step 2640, the CPU determines whether or not the result of the air-fuel ratio determination indicates the reversal? When the result of the air-fuel ratio determination has been reversed, the CPU makes a "Yes" determination at step 2640 to proceed to step 2650, at which the CPU increments the value of the counter N by "1" to proceed to step 2660. In contrast, when the result of the air-fuel ratio determination has not been reversed, the CPU makes a "No" determination at step 2640 to directly proceed to step 2660.

Subsequently at step 2660, the CPU sets, as the target value VREF, a value (Vmin0+N·ΔV2) obtained by adding a "product of the value N and a positive constant value ΔV2" to the initial local minimum value Vmin0 obtained at step 2490 shown in FIG. 24. It should be noted that the value ΔV2 corresponds to the first change value, and is set to a value which is smaller than the absolute value of the difference between the minimum output value Min and the reference value Vf.

Subsequently at step 2670, the CPU determines whether or not the target value VREF is equal to or larger than the reference value Vf. When the target value VREF is equal to or larger than the reference value Vf, the CPU proceeds to step 2680 to set the reference value Vf as the target value VREF, and thereafter, the CPU proceeds to step 2695 so as to end the present routine tentatively. In contrast, when the target value VREF is smaller than the reference value Vf, the CPU directly proceeds to step 2695 from step 2670 so as to end the present routine tentatively. It should be noted that the CPU may perform, at step 2680, the process which is the same as the process of step 2420 shown in FIG. 24.

After that, the routine is repeatedly executed, and thus, the target value VREF is increased, from the value (Vmin0+ΔV2), by the value ΔV2 every time the result of the air-fuel ratio determination is reversed, and finally coincides with the reference value Vf.

In this manner, when the local maximum value Vmax obtained, after the sub feedback control is started, and the like (in a case in which the value of the target value converging control flag XVSFB is "0"), is larger than the "value (Vf+A1) obtained by adding the first threshold A1 to the reference value Vf", the tenth control apparatus gradually decreases the target value VREF toward the reference value Vf from the "value (Vmax0−ΔV1) which is between the local maximum value Vmax and the reference value Vf." That is, the tenth control apparatus also carries out the target value converging control. In this case, the initial value of the target value converging control is the value (Vmax0−ΔV1). The value (Vmax0−ΔV1) is a value within a range (area), which is either one of ranges of "a range at larger side with respect to the reference value Vf and a range at smaller side with respect to the reference value Vf", and in which the current output value Voxs of the downstream-side air-fuel ratio sensor is present (found) (in the present example, the range being the range at larger side with respect to the reference value Vf).

Similarly, when the local minimum value Vmin obtained, after the sub feedback control is started, and the like (in a case in which the value of the target value converging control flag XVSFB is "0"), is smaller than the "value (Vf−A2), the tenth control apparatus gradually increases the target value VREF toward the reference value Vf from the value (Vmin0+ΔV2) which is between the local minimum value Vmin and the reference value Vf. That is, the tenth control apparatus also carries out the target value converging control. In this case, the initial value of the target value converging control is the value (Vmin0+ΔV2). The value (Vmin0+ΔV2) is a value within a range (area), which is either one of ranges of "the range at larger side with respect to the reference value Vf and the range at smaller side with respect to the reference value Vf", and in which the current output value Voxs of the downstream-side air-fuel ratio sensor is present (found) (in the present example, the range being the range at smaller side with respect to the reference value Vf). It should be noted that the value A1 and the value A2 may be equal to each other, or be different from each other. The value ΔV1 and the value ΔV2 may be equal to each other, or be different from each other.

Eleventh Embodiment

A control apparatus (hereinafter, simply referred to as a "eleventh control apparatus") according to an eleventh embodiment of the present invention will next be described. The eleventh control apparatus is different from the first control apparatus only in that the eleventh control apparatus changes the sub feedback control amount Vafsfb in the form of square wave, based on the rich request and the lean request. Accordingly, the difference will be mainly described.

More specifically, a CPU of the eleventh control apparatus executes the routines shown in FIGS. 8, 9, 11-13, and FIG. 27 in place of the routine shown in FIG. 10. The routines shown in FIGS. 8, 9, 11-13 have been already described. Thus, the routines shown in FIG. 27 will be described. The CPU of the eleventh control apparatus executes the routine shown in FIG. 27, every time a predetermined time period elapses.

Figure 27:
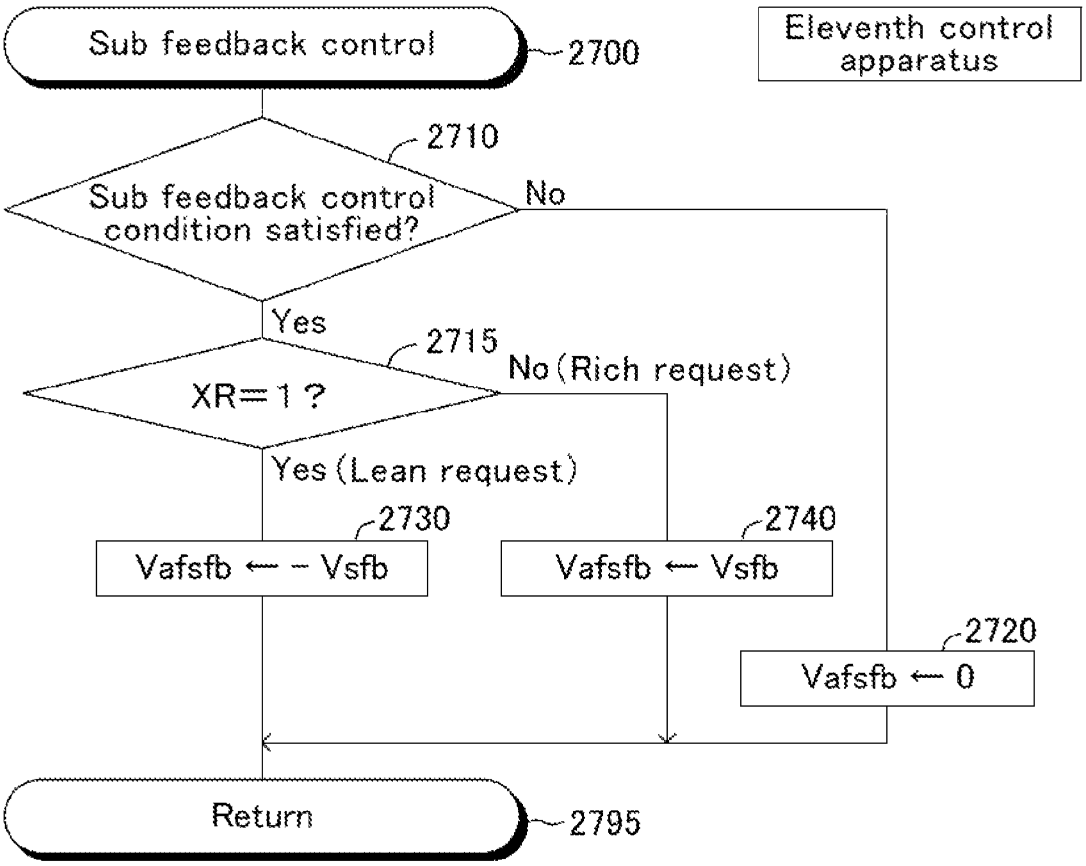
FIG. 27 is a flowchart showing a routine executed by a CPU of an air-fuel ratio control apparatus (eleventh control apparatus) according to an eleventh embodiment of the present invention.
Figure 28:
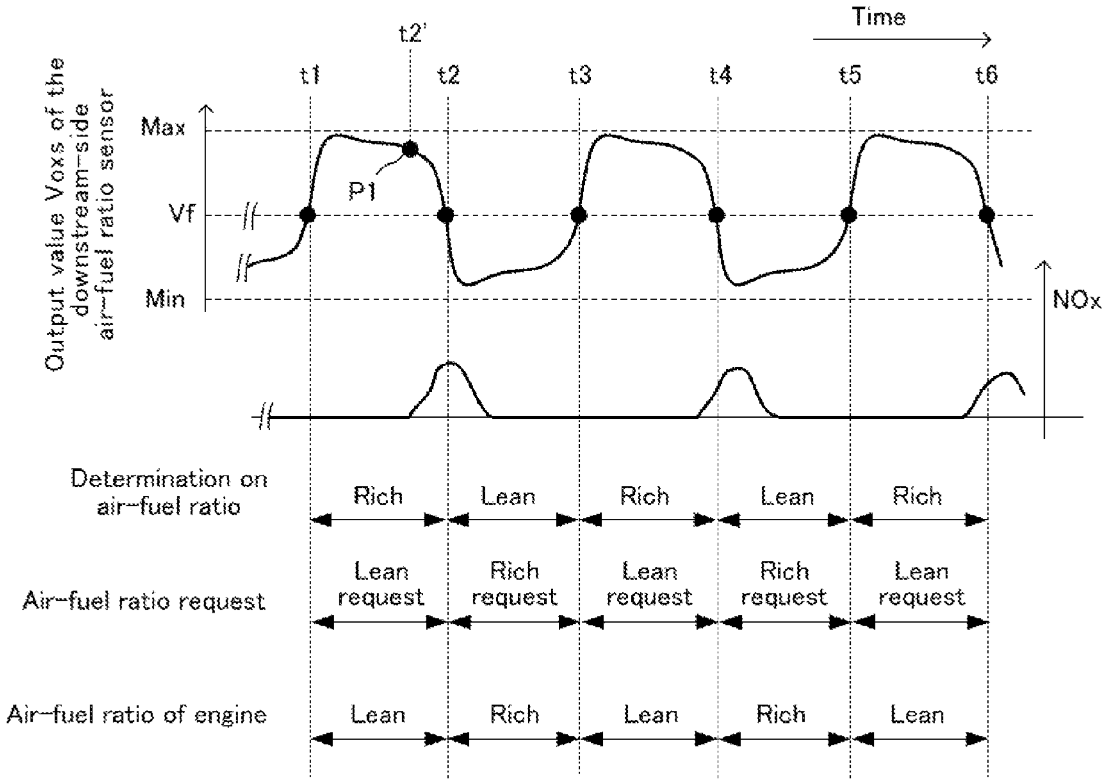
FIG. 28 is a timing chart for describing an operation of a conventional air-fuel ratio control apparatus.

Accordingly, at an appropriate point in time, the CPU starts processes from step 2700 shown in FIG. 27 to proceed to step 2710, at which CPU determines whether or not the sub feedback control condition is satisfied. When the sub feedback control condition is not satisfied, the CPU makes a "No" determination at step 2710 to proceed to step 2720, at which it sets the sub feedback control amount Vafsfb to (at) "0." Thereafter, the CPU proceeds to step 2795 to end the present routine tentatively.

To the contrary, when the CPU performs the process of step 2710, and if the sub feedback control condition is satisfied, the CPU makes a "Yes" determination at step 2710 to proceed to step 2715, at which the CPU determines whether or not the value of the rich determination flag XR is "1." That is, the CPU determines whether or not the lean request is occurring. The value of the rich determination flag XR is set by the routine shown in FIG. 13.

When the value of the rich determination flag XR is "1" (i.e., the lean request is occurring), the CPU makes a "Yes" determination at step 2710 to proceed to step 2730, at which the CPU sets the sub feedback control amount Vafsfb to (at) a negative constant value (−vsfb). The value Vsfb is a positive constant value. Thereafter, the CPU proceeds to step 2795.

Consequently, the output value Vabyfc for a feedback control obtained according to the formula (2) described above becomes smaller than the output value Vabyfs of the upstream-side air-fuel ratio sensor 55 by the value Vsfb. Accordingly, the output value Vabyfc for a feedback control is modified to a value corresponding to an air-fuel ratio richer than an air-fuel ratio represented by the output value Vabyfs of the upstream-side air-fuel ratio sensor 55. As a result, the instructed fuel injection amount Fi is decreased, and thus, the air-fuel ratio of the engine as well as the air-fuel ratio of the catalyst inflow gas become larger (air-fuel ratio at leaner side).

On the other side, if the value of the rich determination flag XR is "0" (i.e., the rich request is occurring) when the CPU performs the process of the step 2715, the CPU makes a "No" determination at step 2715 to proceed to step 2740, at which the CPU sets the sub feedback control amount Vafsfb to (at) the positive constant value (vsfb). Thereafter, the CPU proceeds to step 2795.

Consequently, the output value Vabyfc for a feedback control obtained according to the formula (2) described above becomes larger than the output value Vabyfs of the upstream-side air-fuel ratio sensor 55 by the value Vsfb. Accordingly, the output value Vabyfc for a feedback control is modified to a value corresponding to an air-fuel ratio leaner than an air-fuel ratio represented by the output value Vabyfs of the upstream-side air-fuel ratio sensor 55. As a result, the instructed fuel injection amount Fi is increased, and thus, the air-fuel ratio of the engine as well as the air-fuel ratio of the catalyst inflow gas become smaller (air-fuel ratio at richer side).

In this manner, the eleventh control apparatus sets the sub feedback control amount to (at) the negative constant value (−Vsfb) when it is determined that the lean request is occurring, and sets the sub feedback control amount to (at) the positive constant value (Vsfb) when it is determined that the rich request is occurring. Accordingly, the air-fuel ratio control can be simplified.

As described above, each of the air-fuel ratio control apparatuses according to the embodiment of the present invention has/makes the target value VREF gradually come closer to the "reference value Vf" from a "value different from the reference value Vf", when a deviation of the output value Voxs of the downstream-side air-fuel ratio sensor from the reference value Vf becomes large. As a result, the air-fuel ratio of the engine is switched over promptly, and thus, the air-fuel ratio of the catalyst inflow gas can be made closer to the air-fuel ratio appropriate for purifying the emission by the catalyst 43 with high efficiency. Accordingly, the emission can be maintained at a good level.

The present invention is not limited to the embodiments described above, but may adopt various modifications within the scope of the invention. For example, the downstream-side air-fuel ratio sensor 56 is the concentration-cell-type $O_2$ sensor comprising the zirconia element, however, may be the wide range air-fuel ratio sensor of a limiting current type. Further, the downstream-side air-fuel ratio sensor may be an $O_2$ concentration sensor using a titania as the element. The upstream-side air-fuel ratio sensor 55 is the wide range air-fuel ratio sensor of a limiting current type, however, may be the concentration-cell-type $O_2$ sensor.

The invention claimed is:

1. An air-fuel ratio control apparatus for an internal combustion engine, said air-fuel control apparatus comprising:

a catalyst disposed in an exhaust passage of said internal combustion engine;

a downstream-side air-fuel ratio sensor disposed in said exhaust passage and downstream of said catalyst, said downstream-side air-fuel ratio sensor including an element outputting an output value varying in response to an oxygen partial pressure; and a controller configured to:

perform a feedback control to: (i) increase an air-fuel ratio of said engine, said air-fuel ratio of said engine being a mixture supplied to said engine in a period in which a lean request is occurring to require said air-fuel ratio of said engine to be increased so that an output value of said downstream-side air-fuel ratio sensor changes to be closer to a predetermined target value, and (ii) decrease said air-fuel ratio of said engine in a period in which a rich request is occurring to require said air-fuel ratio of said engine to be decreased so that said output value of said downstream-side air-fuel ratio sensor changes to be closer to said target value;

obtain, as a first extreme value, said output value of said downstream-side air-fuel ratio sensor when a state in which said output value deviates a greatest amount from a predetermined reference value changes to a state in which said output value changes to be closer to said predetermined reference value;

obtain, as a second extreme value, said output value of said downstream-side air-fuel ratio sensor when a state in which said output value changes to be closer to said predetermined reference value changes to a state in which said output value deviates a greatest amount from said predetermined reference value;

set a first value as said target value when said first extreme value is obtained, said first value being a value between said obtained first extreme value and said reference value, and thereafter, determine and set, as a function of the first extreme value and the second extreme value, a second value as said target value when said second extreme value is obtained, said second value being a value between said obtained second extreme value and said obtained first extreme value; and change said target value to gradually change to be closer to said predetermined reference value over a time period, from a certain value within either one of: (i) a range at a larger side of said reference value, and (ii) a range at a smaller side of said reference value, and in which said output value of the downstream-side air-fuel ratio sensor is present, said predetermined reference value being a value within a certain range including a value which is equal to said output value of said downstream-side air-fuel ratio sensor when an oxygen partial pressure of a gas reaching an element of said downstream-side air-fuel ratio sensor is equal to an oxygen partial pressure obtained when an air-fuel ratio of said gas is equal to a stoichiometric air-fuel ratio.

2. The air-fuel ratio control apparatus according to claim 1, wherein said controller is configured to set said second value at a value between said obtained second extreme value and said first value.

3. The air-fuel ratio control apparatus according to claim 2, wherein said controller is configured to set said second value in such a manner that an absolute value of a difference between said first extreme value obtained after a second extreme value obtaining time which is a point in time at which said second extreme value is obtained and said reference value becomes smaller than an absolute value of a difference between said first extreme value obtained before said second extreme value obtaining time and said reference value.

4. The air-fuel ratio control apparatus according to claim 1, wherein said controller is configured to, when said first extreme value is obtained by said extreme value obtaining section;

set said first value as said target value when an absolute value of a difference between said obtained first extreme value and said reference value is larger than a positive first threshold; and set said reference value as said target value when said absolute value of said difference between said obtained first extreme value and said reference value is equal to or smaller than said first threshold.

5. The air-fuel ratio control apparatus according to claim 4, wherein said controller is configured to set, as said first value, a value which is closer to said reference value by a positive first change value compared to said first extreme value, and to set, as said second value, a value which is more away from said reference value by a positive second change value compared to said second extreme value, wherein said first change value is equal to or smaller than said first threshold, and said second change value is smaller than said first change value.

6. The air-fuel ratio control apparatus according to claim 5, wherein said controller is configured to change said first change value to be smaller as a temperature of said downstream-side air-fuel ratio sensor becomes lower.

7. The air-fuel ratio control apparatus according to claim 5, wherein said controller is configured to change said first change value to be smaller as a flow rate of an exhaust gas passing through said catalyst becomes larger.

8. The air-fuel ratio control apparatus according to claim 5, wherein said controller is configured to change said first change value when an absolute value of a difference between said first extreme value and said reference value is larger than a positive second threshold to be smaller than said first change value when said absolute value of said difference between said first extreme value and said reference value is equal to or smaller than said second threshold.

9. The air-fuel ratio control apparatus according to claim 5, wherein said controller is configured to change said first change value for a period after fuel cut control completion, said period being from a point in time at which a fuel cut state where a fuel supply to said engine is stopped is changed to a state where said fuel supply to said engine is performed to a point in time at which a certain time period elapses, to be smaller than said first change value for a period other than said period after fuel cut control completion.

10. The air-fuel ratio control apparatus according to claim 5, wherein said controller is configured to determine whether or not said engine is in a predetermined acceleration condition, and to change said first change value when it is determined that said engine is in said predetermined acceleration condition to be smaller than said first change value when it is determined that said engine is not in said acceleration condition.

11. The air-fuel ratio control apparatus according to claim 5, further comprising:

an upstream-side air-fuel ratio sensor, which is disposed in the exhaust passage and upstream of said catalyst, and which outputs an output value varying in response to an air-fuel ratio of an exhaust gas flowing into said catalyst, wherein said controller is configured to:

obtain an amount of intake air introduced into said engine, and calculate a base fuel injection amount to have said air-fuel ratio of said mixture supplied to said engine coincide with the stoichiometric air-fuel ratio, based on said obtained amount of intake air;

calculate a main feedback control amount which corrects said base fuel injection amount in such a manner that an upstream-side air-fuel ratio represented by said output of said upstream-side air-fuel ratio sensor coincides with the stoichiometric air-fuel ratio;

calculate a sub feedback control amount which corrects said base fuel injection amount in such a manner that said base fuel injection amount is decreased during a period in which it is determined that said lean request is occurring, and said base fuel injection amount is increased during a period in which it is determined that said rich request is occurring; and calculate an instructed fuel injection amount by correcting said base fuel injection amount with an air-fuel ratio correction amount based on said main feedback control amount and said sub feedback control amount, and so as to perform said feedback control by supplying to said engine a fuel whose amount is equal to said calculated instructed fuel injection amount.

12. The air-fuel ratio control apparatus according to claim 11, wherein said controller is configured to:

perform a learning control which obtains, as an air-fuel ratio learning value, a value correlating with an average of said main feedback control amount;

calculate said instructed fuel injection amount by correcting said base fuel injection amount with said air-fuel ratio learning value; and perform said learning control when said target value is set at said reference value, and not perform said learning control when said target value is not set at said reference value.

13. The air-fuel ratio control apparatus according to claim 12, wherein:

said downstream-side air-fuel ratio sensor is a concentration-cell-type oxygen sensor which outputs, as said output value of said downstream-side air-fuel ratio sensor, a voltage according to a concentration of oxygen included in an exhaust gas flowing out from said catalyst; and said controller is configured to change said air-fuel ratio learning value to a value which corrects said base fuel injection amount in such a manner that said base fuel injection amount is more decreased, when a state in which said target value coincides with said reference value over a first duration time does not occur over second duration time, and a value correlating with an average of said target value is larger than said reference value.

14. The air-fuel ratio control apparatus according to claim 12, wherein:

said downstream-side air-fuel ratio sensor is a concentration-cell-type oxygen sensor which outputs, as said output value of said downstream-side air-fuel ratio sensor, a voltage according to a concentration of oxygen included in an exhaust gas flowing out from said catalyst; and said controller is configured to change said air-fuel ratio learning value to a value which corrects said base fuel injection amount in such a manner that said base fuel injection amount is more increased, when a state in which said target value coincides with said reference value over a first duration time does not occur over second duration time, and a value correlating with an average of said target value is smaller than said reference value.

15. The air-fuel ratio control apparatus according to claim 12, wherein:

said downstream-side air-fuel ratio sensor is a concentration-cell-type oxygen sensor which outputs, as said output value of said downstream-side air-fuel ratio sensor, a voltage according to a concentration of oxygen included in an exhaust gas flowing out from said catalyst; and said controller is configured to change said first change value when a target value fluctuation state occurs, said target value fluctuation state being a state in which said target value alternately fluctuates between a value larger than said reference value and a value smaller than said reference value continues for a predetermined time duration or longer, to be smaller than a value which is equal to said first value when said target value fluctuation state is not occurring.

* * * * *